(12) United States Patent
Adachi et al.

(10) Patent No.: US 9,426,363 B2
(45) Date of Patent: Aug. 23, 2016

(54) IMAGE FORMING APPARATUS IMAGE FORMING METHOD AND IMAGE SENSOR

(71) Applicant: Panasonic Intellectual Property Management Co., Ltd., Osaka (JP)

(72) Inventors: Yasuhiko Adachi, Hyogo (JP); Yoshikuni Sato, Fukui (JP); Hideto Motomura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/628,191

(22) Filed: Feb. 20, 2015

(65) Prior Publication Data

US 2015/0172575 A1    Jun. 18, 2015

Related U.S. Application Data

(63) Continuation of application No. PCT/JP2014/002987, filed on Jun. 5, 2014.

(30) Foreign Application Priority Data

Jun. 6, 2013   (JP) ................................. 2013-119692
Jun. 7, 2013   (JP) ................................. 2013-121123

(51) Int. Cl.
*H04N 5/235* (2006.01)
*H04N 5/265* (2006.01)
(Continued)

(52) U.S. Cl.
CPC ......... *H04N 5/23232* (2013.01); *H04N 5/2256* (2013.01); *H04N 5/2354* (2013.01); *H04N 5/265* (2013.01); *H04N 5/349* (2013.01); *H04N 5/369* (2013.01)

(58) Field of Classification Search
CPC .............. H04N 1/3935; H04N 3/1587; H04N 5/23232; H04N 5/23248; H04N 5/439; H04N 2201/0414; H04N 2201/0426; G06K 2009/2045
USPC ........................................ 348/218.1; 382/318
See application file for complete search history.

(56) References Cited

U.S. PATENT DOCUMENTS

2004/0247081 A1* 12/2004 Halsmer .................. A61B 6/00
                                                           378/108
2007/0035621 A1*  2/2007 Shimizu ................ G06T 3/4069
                                                           348/135
(Continued)

FOREIGN PATENT DOCUMENTS

EP           0630040 A1   12/1994
EP           0 889 644 A1  1/1999
(Continued)

OTHER PUBLICATIONS

Co-pending U.S. Appl. No. 14/628,035, filed February 20, 2015.
(Continued)

*Primary Examiner* — Nelson D. Hernández Hernández
(74) *Attorney, Agent, or Firm* — McDermott Will & Emery LLP

(57) ABSTRACT

An exemplary image forming apparatus according to the present disclosure includes: a light source which irradiates an object with light and of which the orientation and position are fixed; a tilting mechanism which tilts the object at multiple tilt angles; an image sensor which is arranged at a position where the light that has been transmitted through the object is incident, gets tilted along with the object by the tilting mechanism, and captures a plurality of images at the multiple tilt angles; and an image processing section which forms a high-resolution image of the object, having a higher resolution than any of the plurality of images, by synthesizing the plurality of images together.

12 Claims, 55 Drawing Sheets

(51) Int. Cl.
*H04N 5/349* (2011.01)
*H04N 5/225* (2006.01)
*H04N 5/232* (2006.01)
*H04N 5/369* (2011.01)

(56) References Cited

U.S. PATENT DOCUMENTS

| | | |
|---|---|---|
| 2011/0285838 A1 | 11/2011 | Kishima et al. |
| 2012/0082364 A1* | 4/2012 | Tani ................ G06T 7/408 382/133 |
| 2012/0092480 A1* | 4/2012 | Putman ............. H04N 5/349 348/79 |
| 2012/0176489 A1* | 7/2012 | Oshiro ............. G02B 21/002 348/80 |
| 2012/0248292 A1 | 10/2012 | Ozcan et al. |
| 2013/0271593 A1* | 10/2013 | Tsujimoto .......... G09G 5/02 348/79 |

FOREIGN PATENT DOCUMENTS

| | | |
|---|---|---|
| JP | 62-137037 A | 6/1987 |
| JP | 05-002033 A | 1/1993 |
| JP | 5-316434 A | 11/1993 |
| JP | 2000-295639 A | 10/2000 |
| JP | 2004-085287 A | 3/2004 |
| JP | 2011-075454 A | 4/2011 |
| JP | 2012-185384 A | 9/2012 |
| WO | 98/30022 A1 | 7/1998 |

OTHER PUBLICATIONS

International Search Report issued in International Application No. PCT/JP2014/002987 with Date of mailing Aug. 26, 2014, with English Translation.

European Search Report issued in European Application No. 148077560.3 dated Apr. 8, 2016.

* cited by examiner

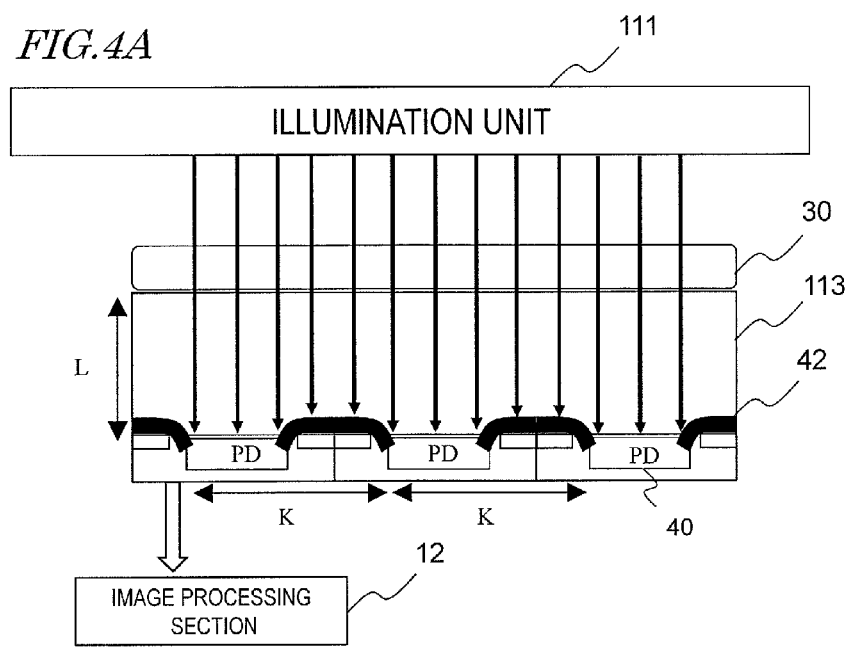
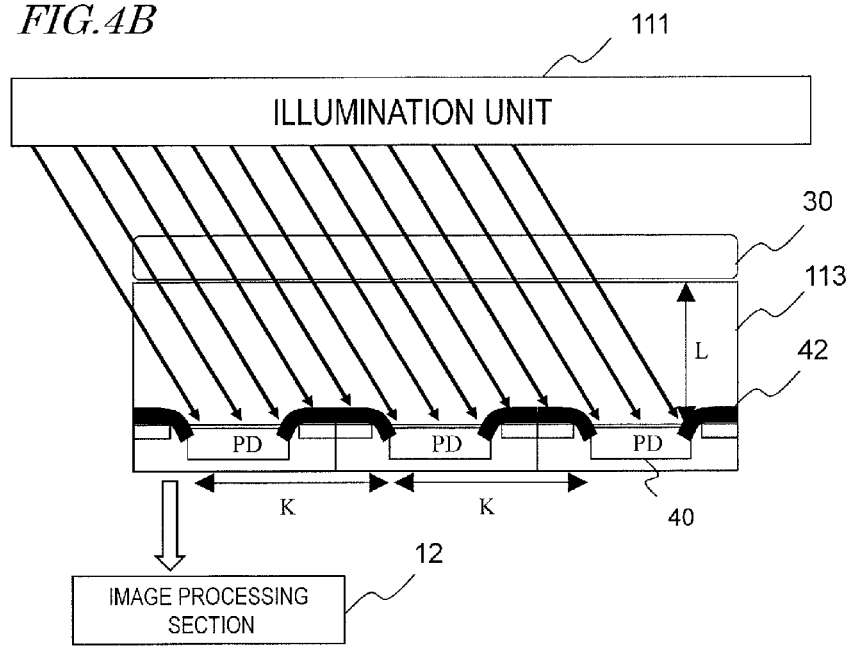

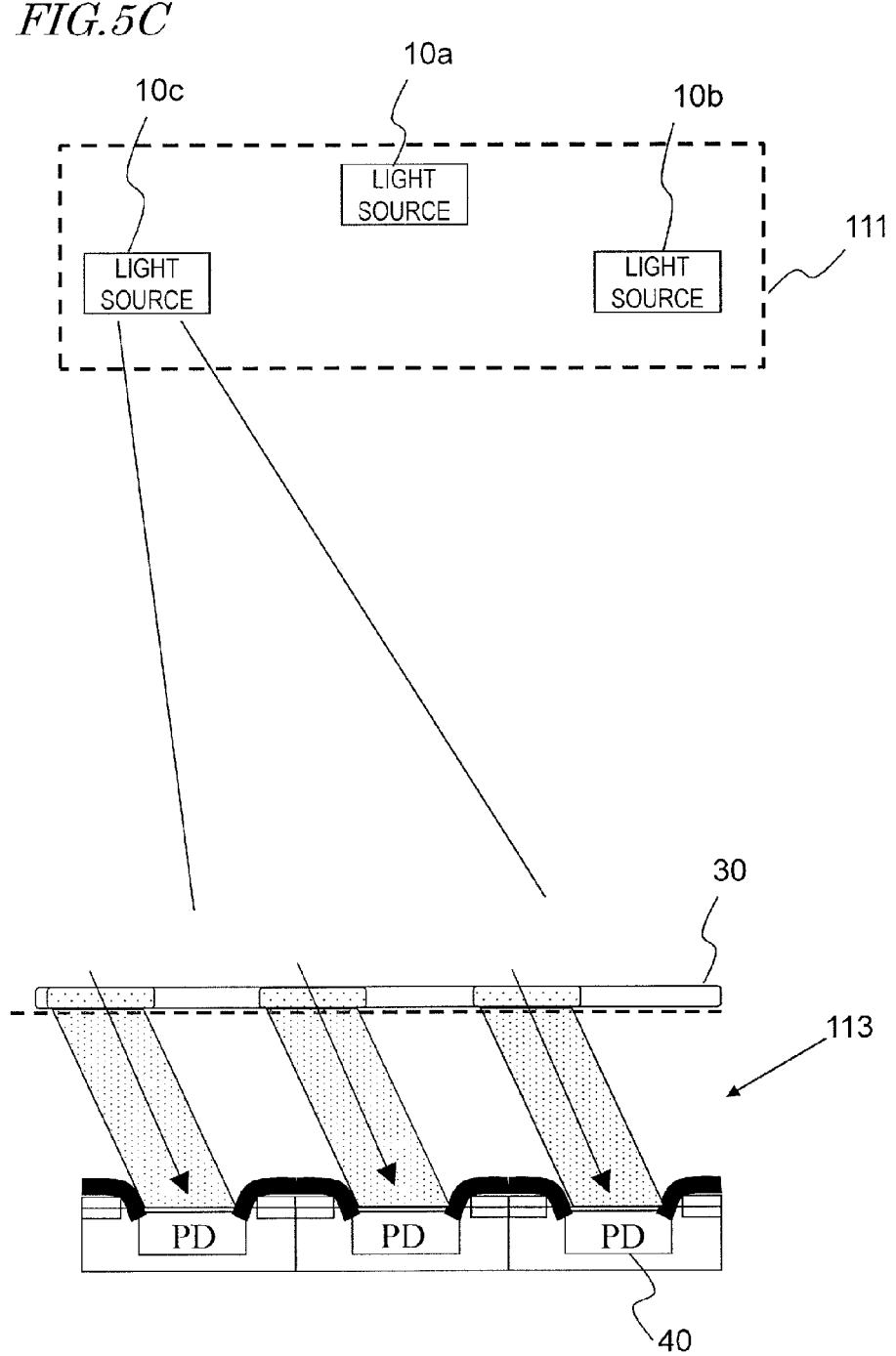

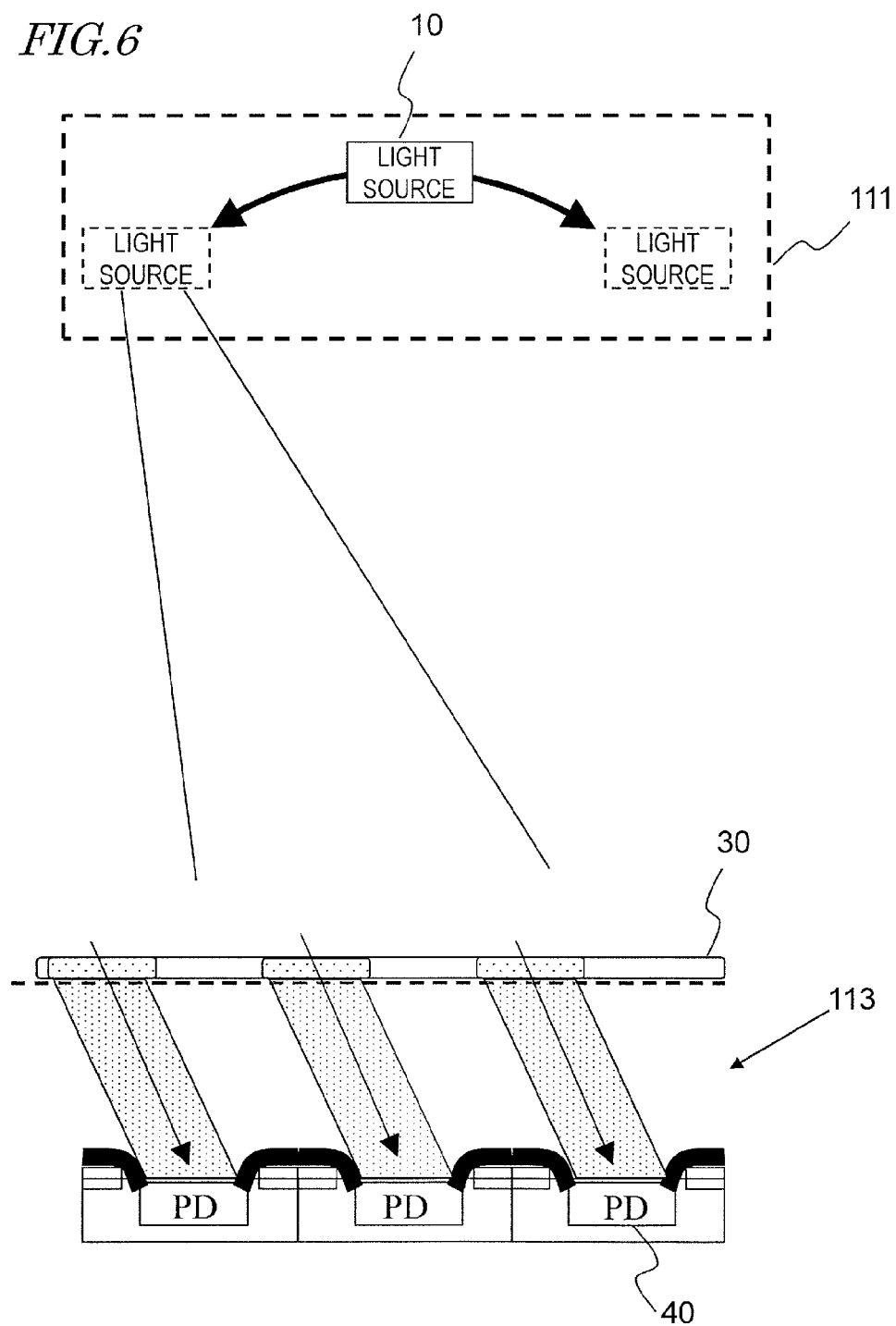

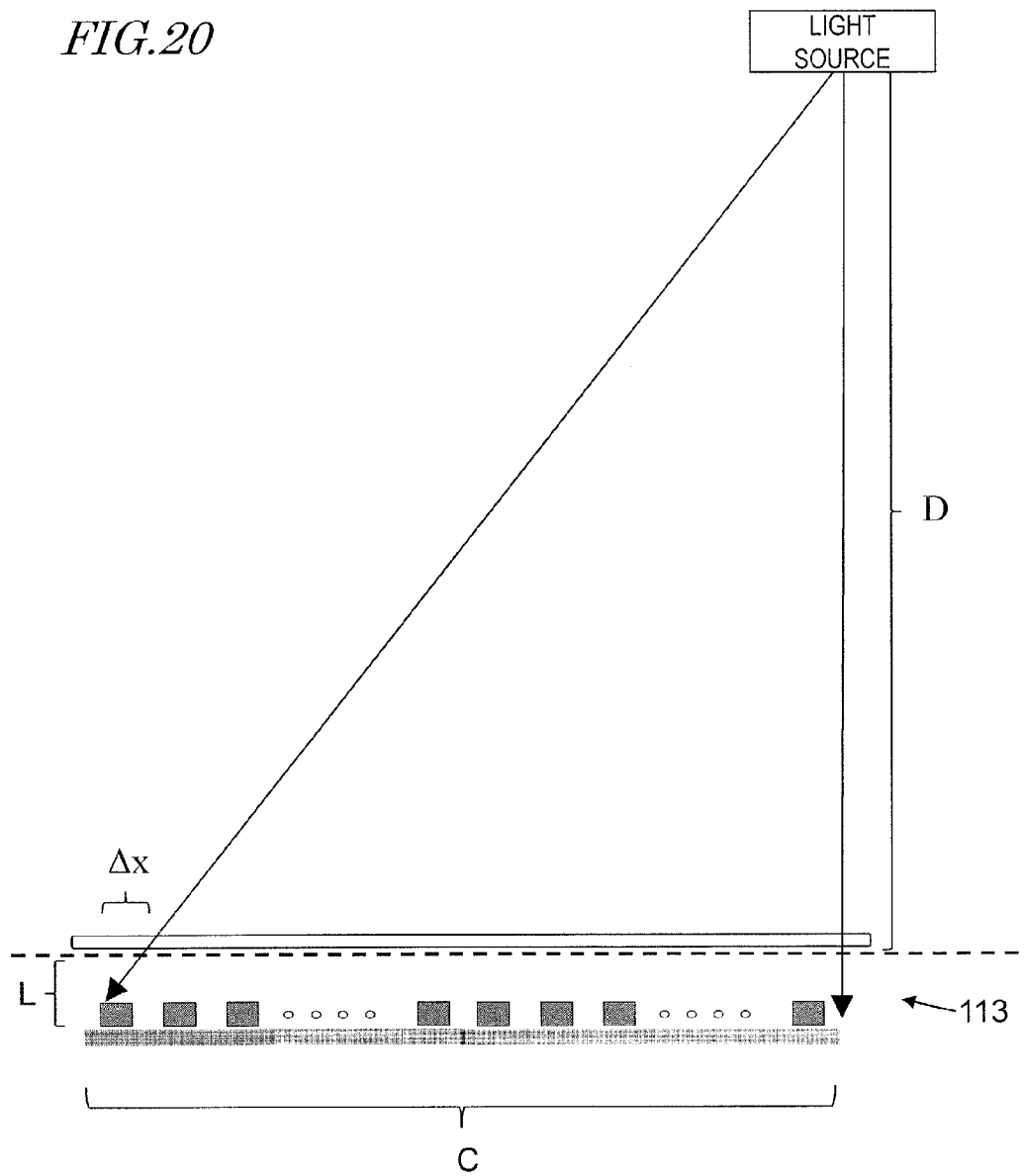

FIG.52A

TO GET 4x IMAGE

| ILLUMINATING DIRECTION | S1 | S2 | S3 | S4 |
|---|---|---|---|---|
| DIRECTION 1 | 0 | 1 | 1 | 0 |
| DIRECTION 2 | 0 | ½ | 1 | ½ |
| DIRECTION 3 | 0 | 0 | ½ | 1 |
| DIRECTION 4 | ½ | 1 | ½ | 0 |

FIG.52B

TO GET 8x IMAGE

| ILLUMINATING DIRECTION | S1 | S2 | S3 | S4 | S5 | S6 | S7 | S8 |
|---|---|---|---|---|---|---|---|---|
| DIRECTION 1 | ½ | 1 | 1 | 1 | ½ | 0 | 0 | 0 |
| DIRECTION 2 | 0 | ½ | 1 | 1 | 1 | ½ | 0 | 0 |
| DIRECTION 3 | 0 | 0 | ½ | 1 | 1 | 1 | ½ | 0 |
| DIRECTION 4 | 0 | 0 | 0 | ½ | 1 | 1 | 1 | ½ |
| DIRECTION 5 | 0 | 0 | 0 | 0 | ½ | 1 | 1 | 1 |
| DIRECTION 6 | 1 | 1 | 1 | ½ | 0 | 0 | 0 | 0 |
| DIRECTION 7 | 1 | 1 | ½ | 0 | 0 | 0 | 0 | 0 |
| DIRECTION 8 | 1 | ½ | 0 | 0 | 0 | 0 | 0 | 0 |

FIG.55

| SPEC-IMEN NO. | ZOOM POWER | IMAGE FEATURE QUANTITY | | | | PATIENT INFORMATION |
|---|---|---|---|---|---|---|
| | | FEATURE 1 | FEATURE 2 | FEATURE 3 | ... | |
| 1 | 1 | 48 | 55 | 95 | ... | NAME A, DISEASE X, FINDINGS |
| 2 | 1 | 6 | 84 | 17 | ... | NAME B, DISEASE Y, FINDINGS |
| 3 | 1 | 19 | 27 | 79 | ... | NAME C, DISEASE Z, FINDINGS |
| | 2 | 81 | 14 | 76 | ... | |
| 4 | 1 | 19 | 27 | 79 | ... | NAME D, DISEASE X, FINDINGS |
| | 2 | 50 | 34 | 94 | ... | |
| ⋮ | ⋮ | | ⋮ | | | ⋮ |

FIG.56

| SPEC-IMEN NO. | PA-TIENT ID | ZOOM POWER | IMAGE FEATURE QUANTITY | | | | PATIENT INFORMATION |
|---|---|---|---|---|---|---|---|
| | | | FEATURE 1 | FEATURE 2 | FEATURE 3 | ... | |
| 1 | 1 | 1 | 48 | 55 | 95 | ... | NAME A, DISEASE X, FINDINGS |
| 2 | 2 | 1 | 6 | 84 | 17 | ... | NAME B, DISEASE Y, FINDINGS |
| 3 | 3 | 1 | 19 | 27 | 79 | ... | NAME C, DISEASE Z, FINDINGS |
| | | 2 | 81 | 14 | 76 | ... | |
| 4 | | 1 | 19 | 27 | 79 | ... | NAME C, DISEASE X, FINDINGS |
| | | 2 | 50 | 34 | 94 | ... | |
| | ⋮ | ⋮ | | ⋮ | | | ⋮ |

IMAGE FORMING APPARATUS IMAGE FORMING METHOD AND IMAGE SENSOR

This is a continuation of International Application No. PCT/JP2014/002987, with an international filing date of Jun. 5, 2014, which claims priority of Japanese Patent Application No. 2013-119692, filed on Jun. 6, 2013 and Japanese Patent Application No. 2013-121123, filed on Jun. 7, 2013, the contents of which are hereby incorporated by reference.

BACKGROUND

1. Technical Field

The present application relates to an image forming apparatus, image forming method and image sensor.

2. Description of the Related Art

A two-dimensional image sensor in which a lot of photoelectric conversion sections are arranged in columns and rows within its imaging surface has been used as an image sensor for an image capture device. Each of those photoelectric conversion sections is typically a photodiode which has been formed on a semiconductor layer or on a semiconductor substrate, and generates electric charges based on the light incident thereon. The resolution of the two-dimensional image sensor depends on the arrangement pitch or density of the photoelectric conversion sections on the imaging surface. However, since the arrangement pitch of the photoelectric conversion sections has become almost as short as the wavelength of visible radiation, it is very difficult to further increase the resolution.

An image captured by the image sensor is comprised of a lot of pixels, each of which is defined by a unit region including a single photoelectric conversion section. Since there is an area to be occupied by wiring on the imaging surface, the photosensitive area $R2$ of a single photoelectric conversion section is smaller than the area $R1$ of a single pixel. The ratio ($R2/R1$) of the photosensitive area $R2$ to the area $R1$ of each pixel is called an "aperture ratio", which may be approximately 25%, for example. If the aperture ratio is low, the amount of light that can be used for photoelectric conversion decreases, and therefore, the quality of a pixel signal to be output by the image sensor declines. However, by adopting a configuration in which an array of micro lenses is arranged to face the imaging surface and in which each of those micro lenses faces, and converges light onto, its associated photoelectric conversion section, the photosensitive area $R2$ can be increased so effectively that the aperture ratio ($R2/R1$) can be raised to the vicinity of one. Nevertheless, even if the aperture ratio ($R2/R1$) is increased in this manner, the arrangement pitch and arrangement density of pixels do not increase, and therefore, the resolution does not change.

Japanese Patent Gazette for Opposition No. H5-2033 and Japanese Laid-Open Patent Publication No. S62-137037 disclose techniques for increasing the resolution of an image capture device using a plurality of image sensors.

SUMMARY

However, it is difficult to form a high-resolution image using a plurality of image sensors. There is a demand for a new technique for increasing the resolution.

In one general aspect, an image forming apparatus disclosed herein includes: a light source which irradiates an object with light and of which the orientation and position are fixed; a tilting mechanism which tilts the object at multiple tilt angles; an image sensor which is arranged at a position where the light that has been transmitted through the object is incident, gets tilted along with the object by the tilting mechanism, and captures a plurality of images at the multiple tilt angles; and an image processing section which forms a high-resolution image of the object, having a higher resolution than any of the plurality of images, by synthesizing the plurality of images together.

According to embodiments of the present disclosure, resolution enhancement can be achieved by synthesizing together a plurality of low-resolution images that have been captured by a single image sensor.

These general and specific aspects may be implemented using a system, a method, a computer program, a computer-readable recording medium, and an image sensor, and any combination of systems, methods, computer programs, computer-readable recording media, and image sensors.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 4A is a cross-sectional view schematically illustrating an exemplary configuration and operation of an image forming apparatus according to the present disclosure.

FIG. 4B is a cross-sectional view schematically illustrating an exemplary configuration and operation of an image forming apparatus according to the present disclosure.

FIG. 5C illustrates still another exemplary illumination unit for an image forming apparatus according to the present disclosure.

FIG. 6 illustrates yet another exemplary illumination unit for an image forming apparatus according to the present disclosure.

FIG. 20 is a cross-sectional view illustrating how the point of incidence of a light ray shifts due to the spread of a light beam which has been emitted from a point light source in an image forming apparatus according to the first embodiment.

FIG. 52A shows an exemplary matrix indicating the relation between the illuminating direction and the amount of light incident on a sensor according to the third embodiment of the present disclosure.

FIG. 52B shows an exemplary matrix indicating the relation between the illuminating direction and the amount of light incident on a sensor according to the third embodiment of the present disclosure.

FIG. 55 shows exemplary contents of a database according to the third embodiment of the present disclosure.

FIG. 56 shows an example in which by assigning an ID to each individual patient, pieces of sample information about the same patient in different stains are stored in association with each other according to the third embodiment of the present disclosure.

DETAILED DESCRIPTION

Before embodiments of an image forming apparatus according to the present disclosure are described, an exemplary basic configuration for an image sensor will be described.

Figure 1:
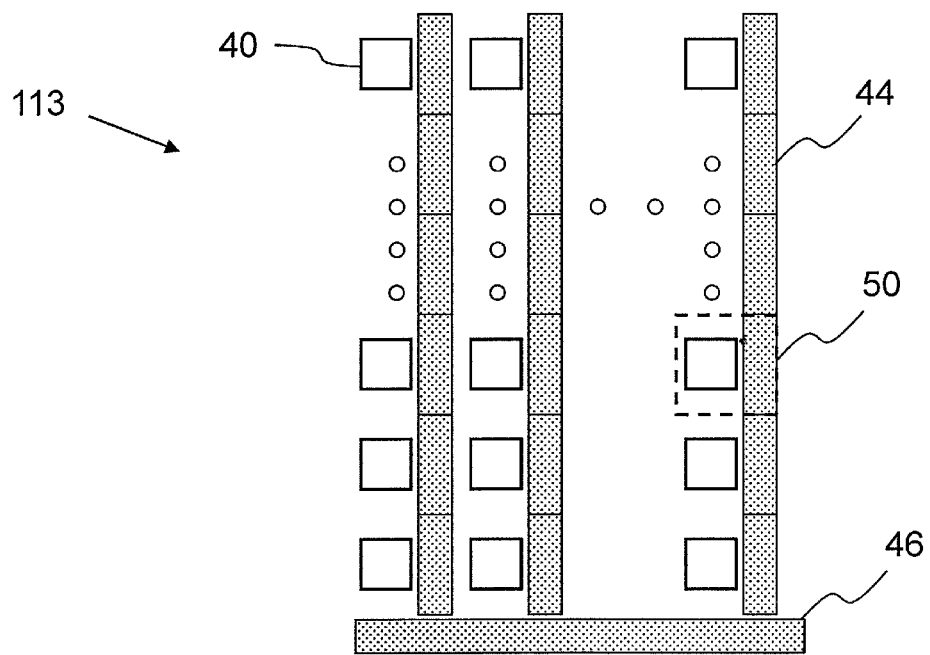
FIG. 1 is a plan view schematically illustrating an exemplary arrangement of photodiodes in an image sensor.

FIG. 1 is a plan view schematically illustrating a portion of the imaging surface of a CCD image sensor which is an exemplary image sensor 113. As shown in FIG. 1, a number of photodiodes (photoelectric conversion sections) 40 are arranged in columns and rows on the imaging surface. In FIG. 1, a single pixel 50 is indicated by the dotted rectangle. On the imaging surface, a lot of pixels 50 are densely arranged in columns and rows.

The light that has been incident on each photodiode 40 generates electric charges inside the photodiode 40. The amount of the electric charges generated varies according to the amount of the light that has been incident on that photodiode 40. The electric charges generated by each photodiode 40 move to, and are sequentially transferred through, a vertical charge transfer path 44 which runs vertically to enter a horizontal charge transfer path 46. Next, the electric charges are transferred through the horizontal charge transfer path 46 which runs horizontally and are output as a pixel signal to a device outside of this image sensor 113 through one end of the horizontal charge transfer path 46. Although not shown, transfer electrodes are arranged on these charge transfer paths 44 and 46. It should be noted that the image sensor 113 for use in an image forming apparatus according to the present disclosure does not have to have this configuration. For example, the CCD image sensor may be replaced with an MOS image sensor.

In the imaging surface, the vertical arrangement pitch of the photodiodes 40 does not have to agree with their horizontal arrangement pitch. In this description, however, the vertical and horizontal arrangement pitches of the photodiodes 40 are supposed to be equal to each other and are both supposed to be K [μm] for the sake of simplicity.

Figure 2:
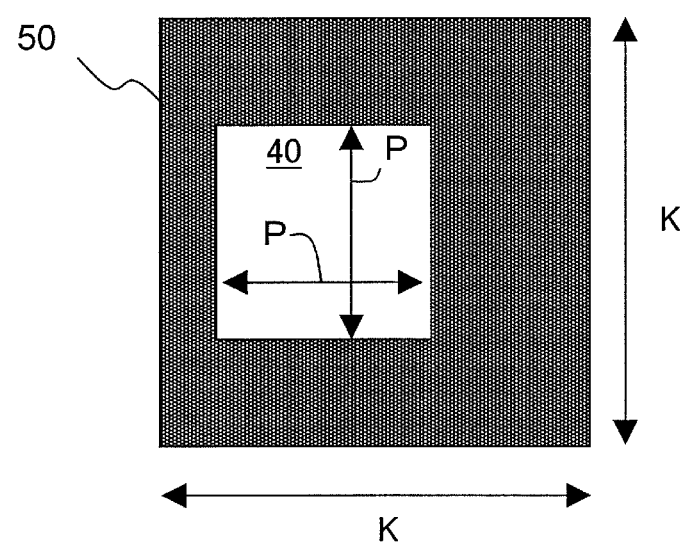
FIG. 2 is a plan view schematically illustrating the relation between a single pixel and an aperture area in an image sensor.

FIG. 2 is a plan view schematically illustrating a single pixel 50 and a photodiode 40 included in the pixel 50. In this example, the size of each pixel is K [μm]×K [μm], and the size of the photodiode 40 (i.e., the size of its photosensitive area) is P [μm]×P [μm]. Thus, the area of a single pixel is given by $R1=K \times K$ and the area of a single photodiode 40 is given by $R2=P \times P$ (where "×" denotes multiplication). It should be noted that the resolution is determined in this embodiment by the size of the photodiode 40 (i.e., the size of its photosensitive area), not by the pixel pitch. Considering the wavelength of visible radiation for use as illuminating light, however, the size P of the photodiode 40 according to this embodiment may be set to be equal to or greater than 0.1 μm.

In the image forming apparatus of the present disclosure, no micro lenses are provided for each photodiode 40. That is why the rest of each pixel 50 other than the photosensitive area (i.e., the area with the size P×P) of the photodiode 40 is an opaque area. The light incident on the opaque area is not converted into electric charge and does not generate any pixel signal, either. The photosensitive area indicated by P [μm]×P [μm] may be called an "aperture area". The location, shape and size of the photodiode 40 in each pixel 50 do not have to be the exemplary ones illustrated in FIG. 2.

The pixel region and photodiode typically have a rectangular shape on the imaging surface. In that case, supposing n and m are real numbers which are greater than one, the ratio of the photodiode's size to the pixel region's size as measured horizontally in the imaging surface can be represented by (1/n), and the ratio of the photodiode's size to the pixel region's size as measured vertically in the imaging surface can be represented by (1/m). Then, the aperture ratio can be represented by (1/n)×(1/m), where n and m may both be real numbers which are equal to or greater than two.

Figure 3:
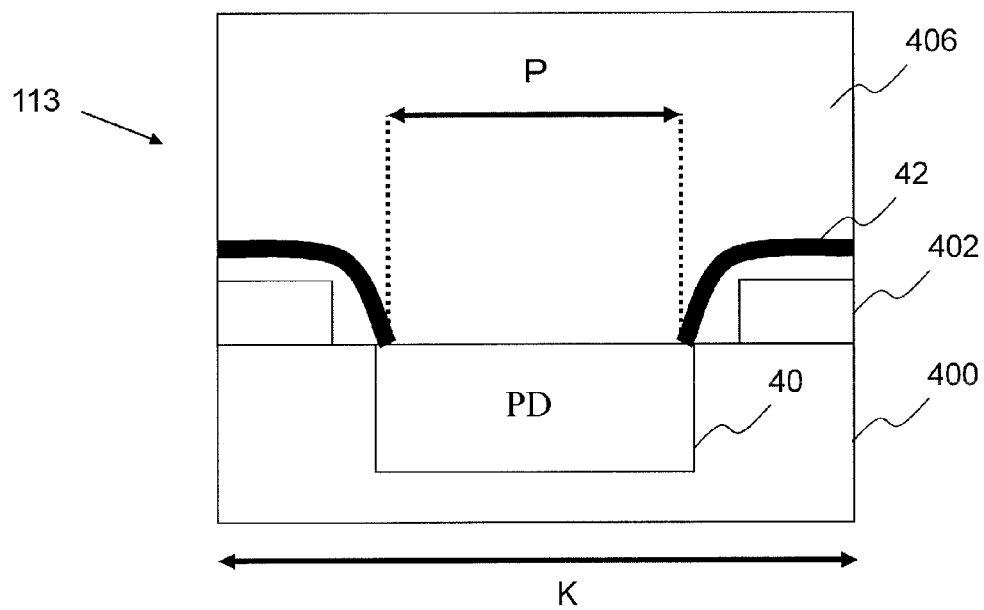
FIG. 3 is a cross-sectional view schematically illustrating the relation between a single pixel and an aperture area in an image sensor.

FIG. 3 is a cross-sectional view schematically illustrating an exemplary cross-sectional structure for a single pixel 50 included in the image sensor 113. As shown in FIG. 3, the image sensor includes a semiconductor substrate 400, a photodiode (PD) 40 which has been formed on the surface of the semiconductor substrate 400, an interconnect layer 402 supported on the semiconductor substrate 400, an opaque layer 42 which covers the interconnect layer 402, and a transparent layer 406 which covers the light incident side of the semiconductor substrate 400. Since FIG. 3 illustrates a cross section of a portion corresponding to a single pixel, only one photodiode 40 is shown in FIG. 3. Actually, however, a huge number of photodiodes 40 are arranged on the single semiconductor substrate 400. If the image sensor 113 is a CCD image sensor, a doped layer (not shown) functioning as a vertical or horizontal charge transfer path is provided under the interconnect layer 402 in the semiconductor substrate 400. The interconnect layer 402 is connected to an electrode (not shown) which is arranged on the charge transfer path. If the image sensor 113 is an MOS image sensor, MOS transistors (not shown) are arranged on a pixel-by-pixel basis on the semiconductor substrate 400. Each of those MOS transistors functions as a switching element to extract electric charges from its associated photodiode 40.

Every component of the image sensor 113 but the photodiode 40 is covered with the opaque layer 42. In the example illustrated in FIG. 3, the region covered with the opaque layer 42 is filled in black.

The image sensor for use in this embodiment does not have to have such a configuration but may also be a CCD or MOS image sensor of a backside illumination type, for example.

Next, an exemplary general configuration for an image forming apparatus according to the present disclosure will be described with reference to FIGS. 4A and 4B.

The image forming apparatus illustrated in FIGS. 4A and 4B includes an illumination unit 111 which sequentially emits illuminating light beams from multiple different light source directions (irradiation directions) with respect to an object (i.e., object of shooting) 30 and irradiates the object 30 with the illuminating light beams, and an image sensor 113 which is arranged at a position where the illuminating light beams that have been transmitted through the object 30 are incident and which captures a plurality of different images in the multiple different light source directions, respectively. This image forming apparatus further includes an image processing section 12 which synthesizes together the plurality of images that have been captured in the multiple different light source directions. This image processing section 12 can form a high-resolution image of the object which has a higher resolution than any of the plurality of images provided by the image sensor 113. The image processing section 12 may be implemented as either a general-purpose computer or a dedicated computer.

When the image sensor 113 is going to capture a first image (see FIG. 4A), the illuminating unit 111 makes an illuminating light beam incident on the object 30 from a first direction. On the other hand, when the image sensor 113 is going to capture a second image (see FIG. 4B), the illuminating unit 111 makes an illuminating light beam incident on the object 30 from a second direction. Among the light rays illustrated in FIGS. 4A and 4B, the ones incident on the opaque layer 42 are not used to capture any image. In other words, only the light rays that have been incident on the photodiode 40 are used to capture images among the light rays that have been emitted from the illuminating unit 111.

If the direction in which an incoming light beam is incident on the object 30 changes, the light beam may have been transmitted through different regions of the object 30 before being incident on the photodiode 40. According to the present disclosure, by adjusting the direction in which the illuminating light beam is incident on the object 30, images representing respectively different portions of the object 30 can be captured. It should be noted that the object 30 that can be shot by the image forming apparatus of the present disclosure is a matter, at least a part of which is a region that can transmit a light beam. For example, the object 30 may be a slide plate including a pathological sample with a thickness of several μm. The object 30 does not have to have a plate shape but may also be powder or liquid as well. When measured along a normal to the imaging surface, the object 30 may have a size of a few ten μm or less, for example.

Next, a first exemplary configuration for the illumination unit 111 will be described with reference to FIGS. 5A, 5B and 5C.

The illumination unit 111 with this first exemplary configuration includes a plurality of light sources (illuminating light sources) 10a, 10b and 10c, which are arranged at respectively different positions corresponding to multiple different light source directions and are turned ON sequentially. For example, when the light source 10a is turned ON, light is emitted from the light source 10a and irradiates the object 30 as shown in FIG. 5A. In FIGS. 5A to 5C, the light emitted from the light sources 10a, 10b and 10c is illustrated as if the light was diverging. Actually, however, the distances from the light sources 10a, 10b and 10c to the image sensor 113 are so long that the light incident on the object 30 and image sensor 113 may be regarded as substantially parallel. Optionally, the light radiated from the light sources 10a, 10b and 10c may also be converged by an optical system such as a lens (not shown) into a parallel light beam or a quasi-parallel light beam. That is why the light sources 10a, 10b and 10c may be either point light sources or surface-emitting light sources. The object 30 is put on the upper surface of the image sensor 113. The upper surface of the image sensor 113 is indicated by the dashed line in FIG. 5A and functions as an object supporting portion 112.

First, an image is captured by the image sensor 113 while the object 30 is irradiated with the light emitted from the light source 10a. Next, the light source 10b, for example, is turned ON and the light sources 10a and 10c are turned OFF. In this case, light is emitted from the light source 10b and irradiates the object 30 as shown in FIG. 5B. In such a state, an image is captured by the image sensor 113 while the object 30 is irradiated with the light emitted from the light source 10b. Next, the light source 10c is turned ON and the light sources 10a and 10b are turned OFF. In this case, light is emitted from the light source 10c and irradiates the object 30 as shown in FIG. 5C. In such a state, another image is captured by the image sensor 113.

Figure 5A:
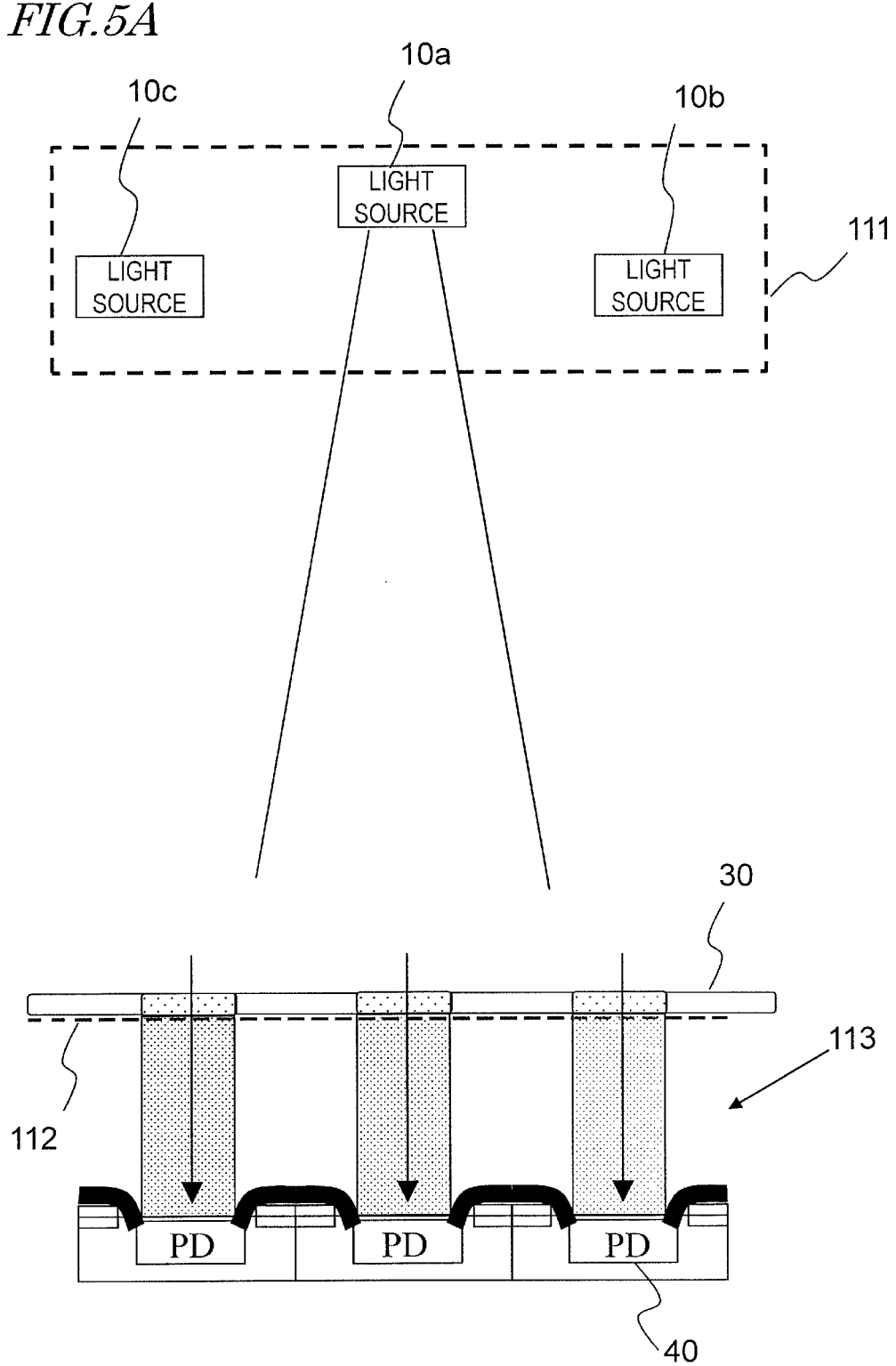
FIG. 5A illustrates an exemplary illumination unit for an image forming apparatus according to the present disclosure.
Figure 5B:
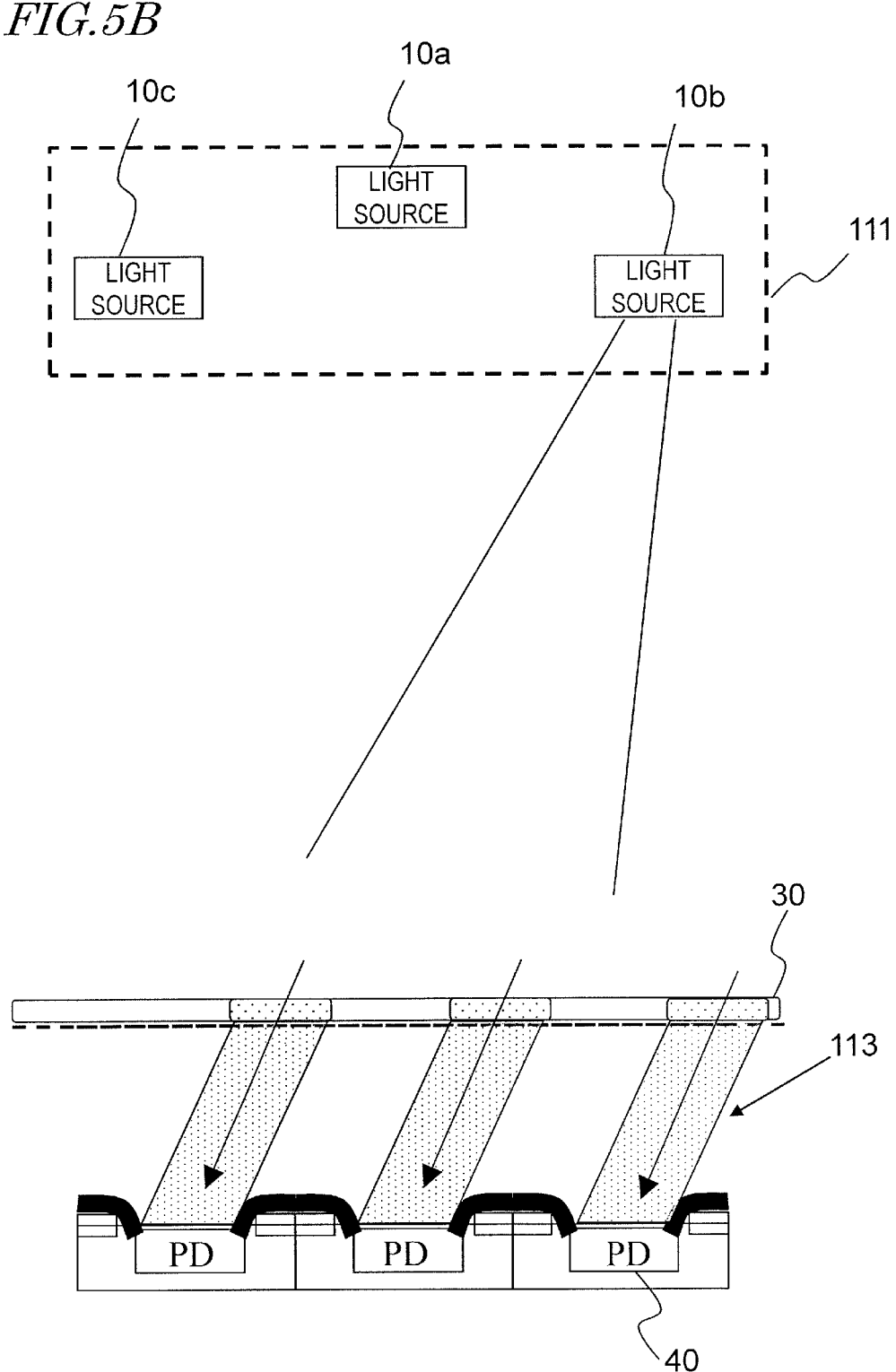
FIG. 5B illustrates another exemplary illumination unit for an image forming apparatus according to the present disclosure.

In the examples illustrated in FIGS. 5A to 5C, the object 30 is irradiated with light beams coming from three different light source directions, and an image is captured every time the object 30 is irradiated with a light beam. Thus, three images are captured in total. However, the number of light sources that the illumination unit 111 has does not have to be three. Optionally, multiple light sources with respectively different emission wavelengths may be arranged close to each other in the same light source direction. For example, if light sources which emit red, green and blue light beams (which will be hereinafter referred to as "RGB light sources") are arranged at and near the position of the light source 10a shown in FIG. 5A, three images can be captured by sequentially radiating the red, green and blue light beams in the state shown in FIG. 5A. And once those three images are captured, a full-color image can be obtained just by superposing those images one upon the other. These images are time-sequential color images.

It should be noted that the wavelength of the light sources that the illumination unit 111 has does not have to fall within the visible radiation range but may also fall within the infrared or ultraviolet range as well.

Alternatively, white light may be emitted from each of those light sources. Still alternatively, cyan, magenta and yellow light beams may be emitted from those light sources.

Next, look at FIG. 6, which schematically illustrates a second exemplary configuration for the illumination unit 111. In the exemplary configuration shown in FIG. 6, the illumination unit 111 includes at least one light source 10 which is supported so as to be movable to any direction. By moving this light source 10, light can be emitted from any of multiple light source directions and can irradiate the object 30.

It should be noted that even in the examples illustrated in FIGS. 5A to 5C, the light sources 10a, 10b and 10c do not have to be fixed at particular positions but may also be supported movably. Alternatively, a light beam emitted from a single fixed light source 10 may have its optical path changed by an actuated optical system such as a movable mirror so as to be incident on the object 30 from a different direction.

In the examples illustrated in FIGS. 5A to 5C and in the example illustrated in FIG. 6, the light source direction is supposed to change within a plane which is parallel to the paper. However, the light source direction may also define a tilt angle with respect to that plane.

Figure 7:
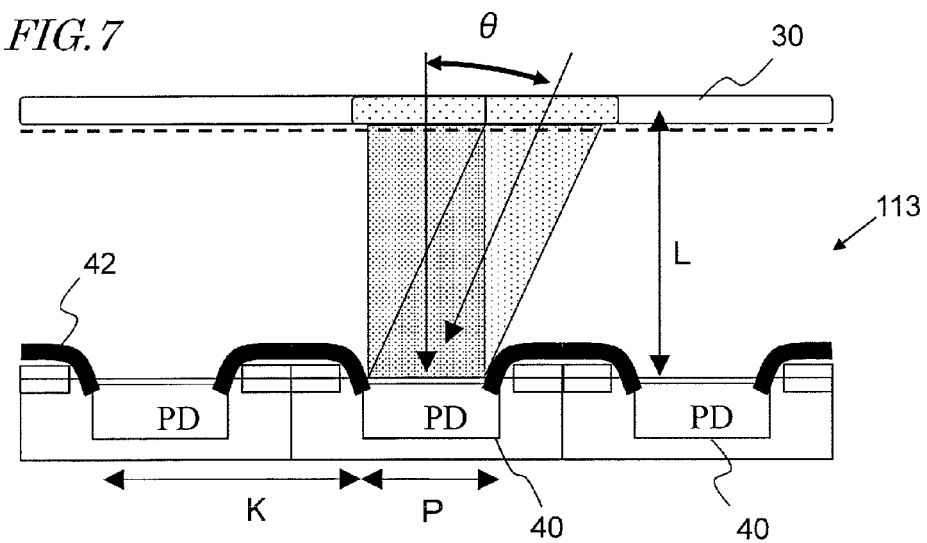
FIG. 7 is a cross-sectional view illustrating how a light ray may be incident on an image sensor according to the present disclosure.

Next, directions in which illuminating light beams are incident will be described with reference to FIGS. 7 and 8. In FIG. 7, shown on the same drawing are two light beams which have come from two different directions to be incident on the central photodiode 40 of interest. This means that the respective image capturing states shown in FIGS. 5A and 5B are illustrated on the same drawing for convenience sake. In the example illustrated in FIG. 7, the light source directions are adjusted so that two light beams that have been transmitted through two adjacent regions of the object 30 are incident on the same photodiode 40. If the direction in which the light beam emitted from the light source 10b shown in FIG. 5B is incident on the object 30 (i.e., its angle and azimuth of incidence) is inappropriate, then not both of the two light beams transmitted through those adjacent regions of the object 30 will be incident on the same photodiode 40.

As shown in FIG. 7, if an object 30 is shot with light beams that have been incident on the object 30 from multiple different directions, the amount of information about pixels to be sampled spatially from the object 30 can be increased. This means that by simply adding together the two images captured with such light beams coming from two different directions as shown in FIG. 7, a high-resolution image can be obtained as a synthetic image.

It should be noted that even if light beams have come from multiple different directions to be incident on, and transmitted through, the object 30, those light beams do not always have to be incident on the same photodiode 40. The light source directions may be adjusted so that light beams transmitted through two adjacent regions of the object 30 are incident on two different photodiodes 40 as shown in FIG. 8, for example.

Figure 8:
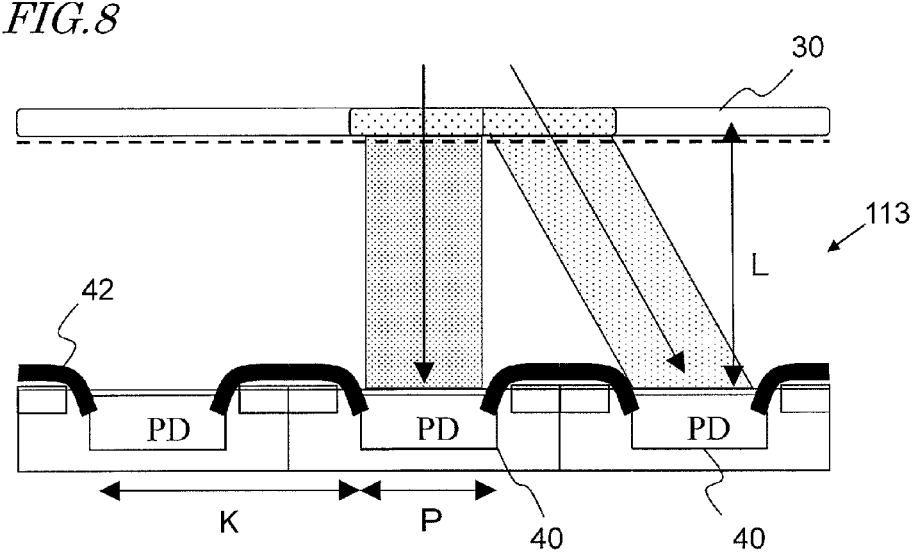
FIG. 8 is a cross-sectional view illustrating how light rays may also be incident on an image sensor according to the present disclosure.

In FIGS. 7 and 8, also shown are the interval L between the imaging surface and the object 30 and the pixel pitch K. The angle of incidence θ of a light beam may be expressed by L, K and other parameters. This respect will be described later.

Next, it will be described with reference to FIGS. 9A through 16C how to generate a high-resolution image in principle by synthesizing together a plurality of images which have been captured by irradiating the object 30 with light beams that have come from multiple different directions. In this example, each pixel of the image sensor 113 is supposed to have an aperture ratio of 25% and the object 30 is supposed to be irradiated with light beams coming from four different directions.

Figure 9A:
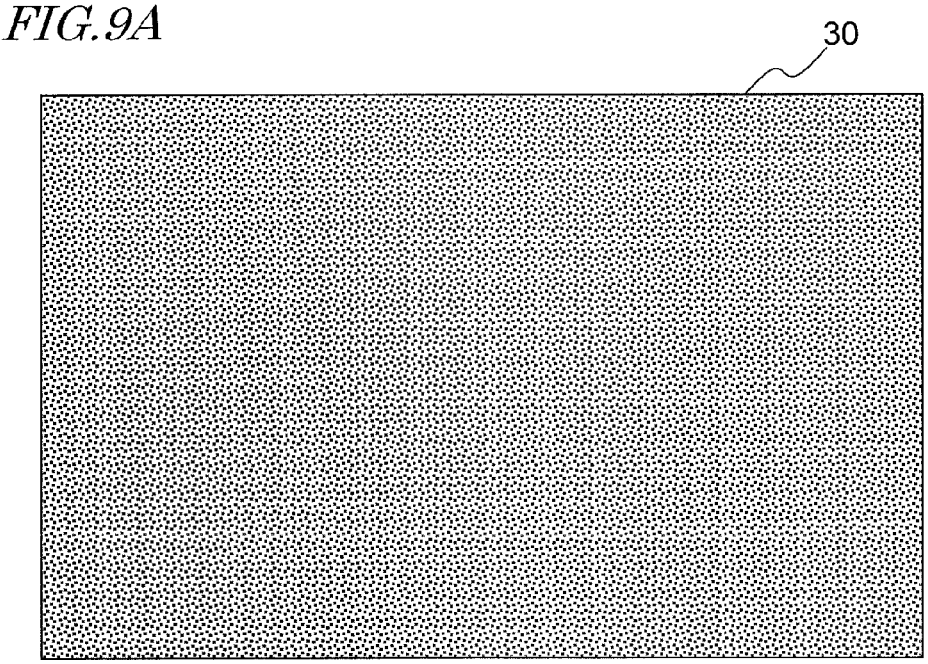
FIG. 9A is a plan view illustrating a portion of an object 30.
Figure 9B:
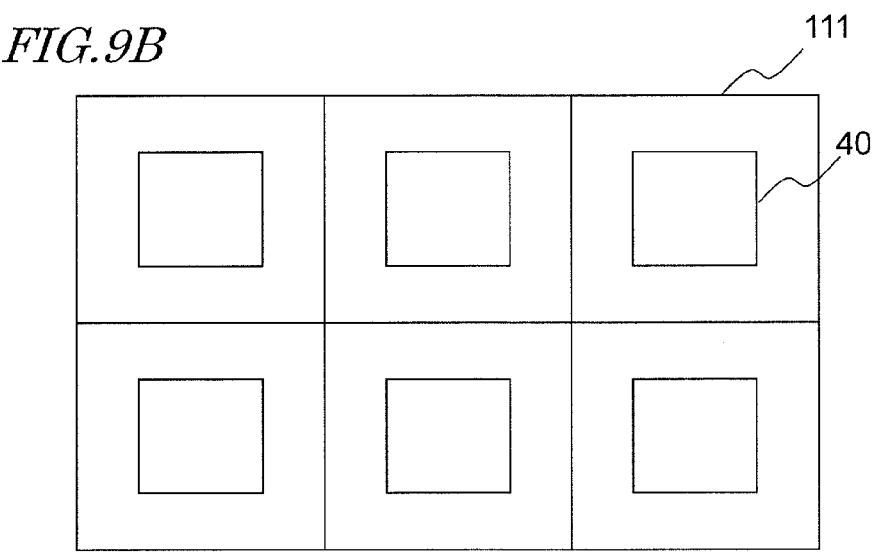
FIG. 9B is a plan view schematically illustrating only some of a huge number of photodiodes 40 of the image sensor 113 by extracting six of them which contribute to capturing the region shown in FIG. 9A.

First of all, look at FIGS. 9A and 9B. FIG. 9A is a plan view illustrating a portion of the object 30. FIG. 9B is a plan view schematically illustrating only some of a huge number of photodiodes 40 of the image sensor 113 by extracting six of them which contribute to capturing the region shown in FIG. 9A. According to the present disclosure, an image of the object 30 is captured with substantially parallel light rays transmitted through the object 30. There is no need to provide any imaging lens between the object 30 and the image sensor 113, and the object 30 may be arranged close to the image sensor 113. The interval between the imaging surface of the image sensor 113 and the object 30 is typically 1 mm or less and may be set to be approximately 1 μm, for example. Although the entire object 30 is actually shot by a huge number (which is far greater than six) of photodiodes 40, only six of those photodiodes 40 are shown in FIG. 9B for the sake of simplicity.

Figure 10A:
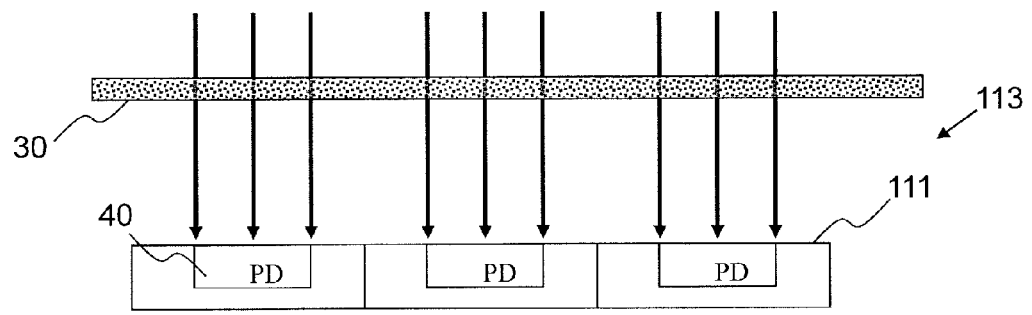
FIG. 10A is a cross-sectional view schematically showing one example of the direction in which light rays transmitted through the object 30 are incident on photodiodes 40.
Figure 10B:
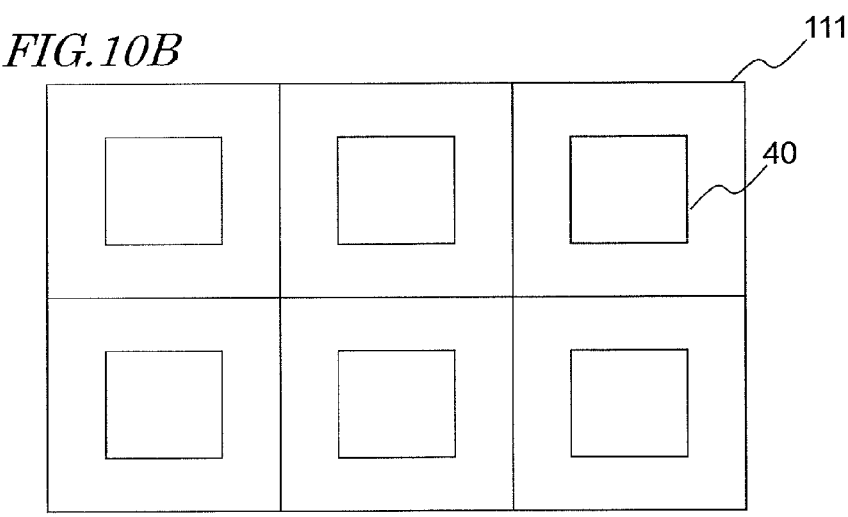
FIG. 10B is a plan view schematically illustrating an exemplary arrangement of six photodiodes 40 of interest.
Figure 10C:
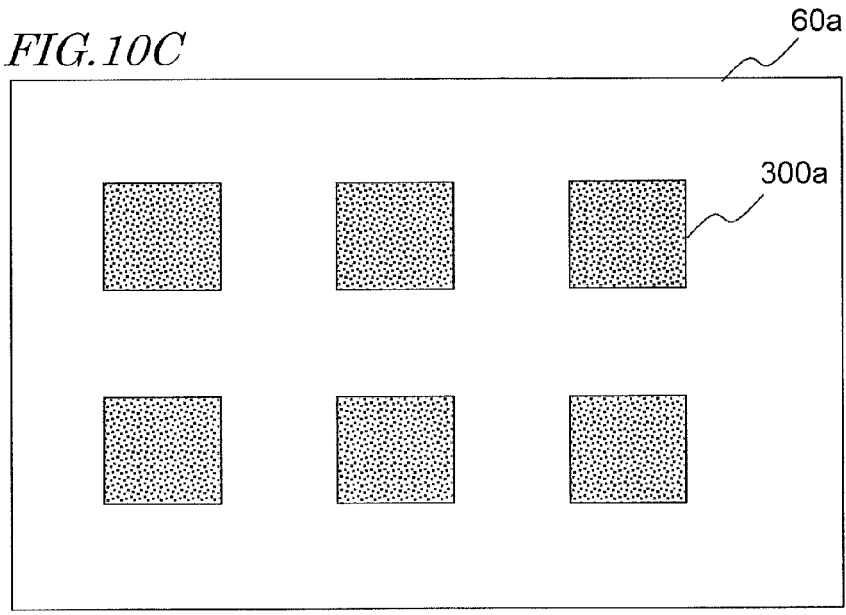
FIG. 10C illustrates schematically six pixels 300a representing image portions captured by those six photodiodes 40.

Next, take a look at FIGS. 10A to 10C. FIG. 10A is a cross-sectional view schematically showing the direction in which light rays transmitted through the object 30 are incident on photodiodes 40. FIG. 10B is a plan view schematically illustrating an exemplary arrangement of six photodiodes 40 of interest. And FIG. 10C illustrates schematically six pixels 300a representing image portions captured by those six photodiodes 40. Each of these pixels 300a has a value (pixel value) representing the amount of light that has been incident its associated photodiode 40. In this example, an image 60a is formed of the pixels 300a shown in FIG. 10C.

Figure 11A:
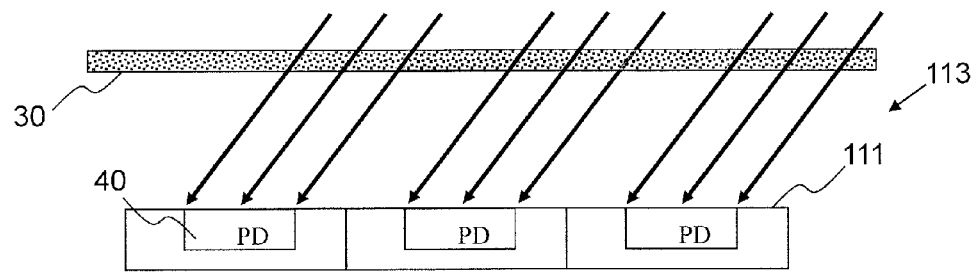
FIG. 11A is a cross-sectional view schematically showing another example of the direction in which light rays transmitted through the object 30 are incident on photodiodes 40.
Figure 11B:
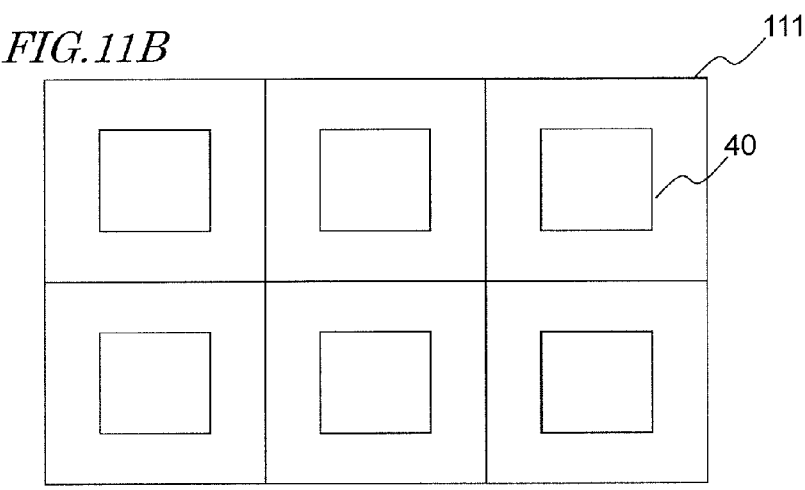
FIG. 11B is a plan view schematically illustrating an exemplary arrangement of six photodiodes 40 of interest.
Figure 11C:
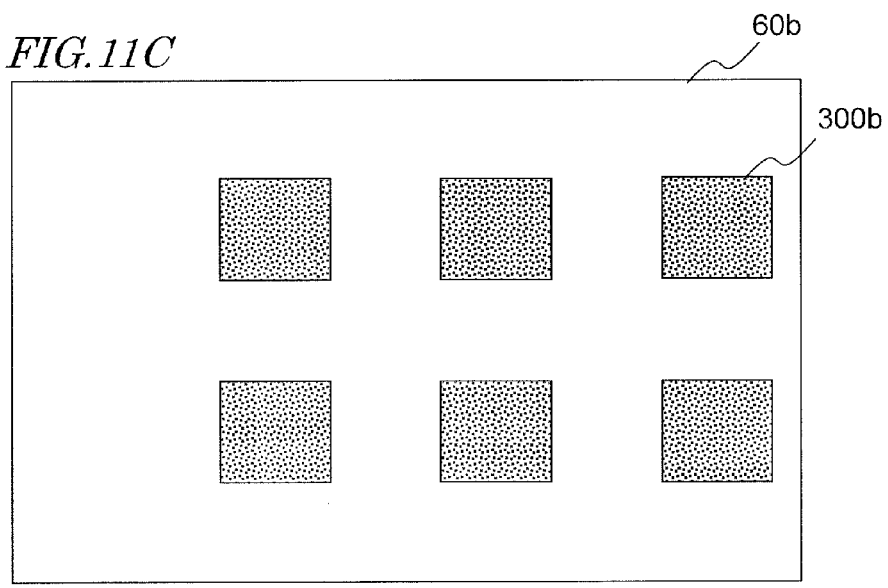
FIG. 11C illustrates schematically six pixels 300b representing image portions captured by those six photodiodes 40.

Next, take a look at FIGS. 11A to 11C. FIG. 11A is a cross-sectional view schematically showing the direction in which light rays transmitted through the object 30 are incident on photodiodes 40. FIG. 11B is a plan view schematically illustrating an exemplary arrangement of six photodiodes 40 of interest just like FIG. 10B. And FIG. 11C illustrates schematically six pixels 300b representing image portions captured by those six photodiodes 40. An image 60b is formed of the pixels 300b shown in FIG. 11C.

Comparing FIGS. 10A and 11A to each other, it can be seen that by appropriately adjusting the direction in which the incoming light rays are incident on the object 30, the regions of the object 30 that the light rays have been transmitted through before being incident on the photodiodes 40 in the state shown in FIG. 10A can be different from in the state shown in FIG. 11A. As a result, the images 60a and 60b shown in FIGS. 10C and 11C can include pieces of information about pixels corresponding to different portions of the object 30.

Figure 12A:
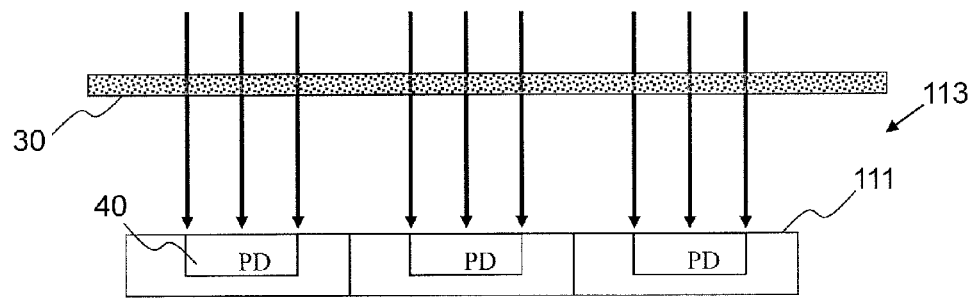
FIG. 12A is a cross-sectional view schematically showing still another example of the direction in which light rays transmitted through the object 30 are incident on photodiodes 40.
Figure 12B:
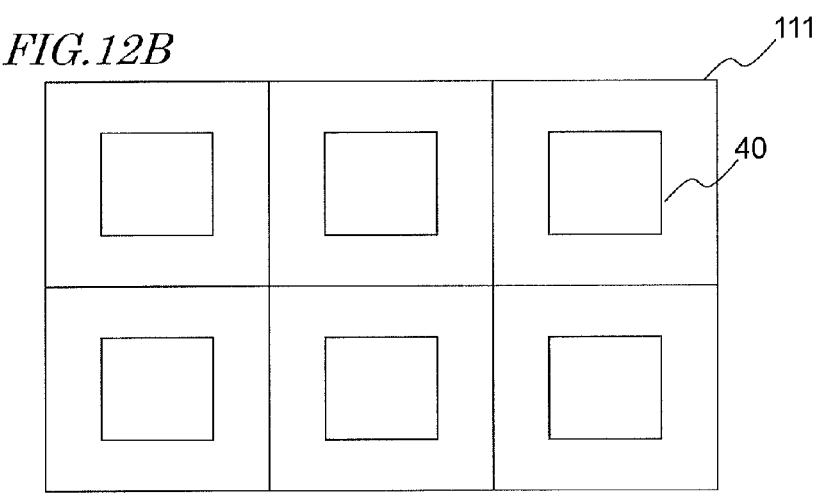
FIG. 12B is a plan view schematically illustrating an exemplary arrangement of six photodiodes 40 of interest.
Figure 12C:
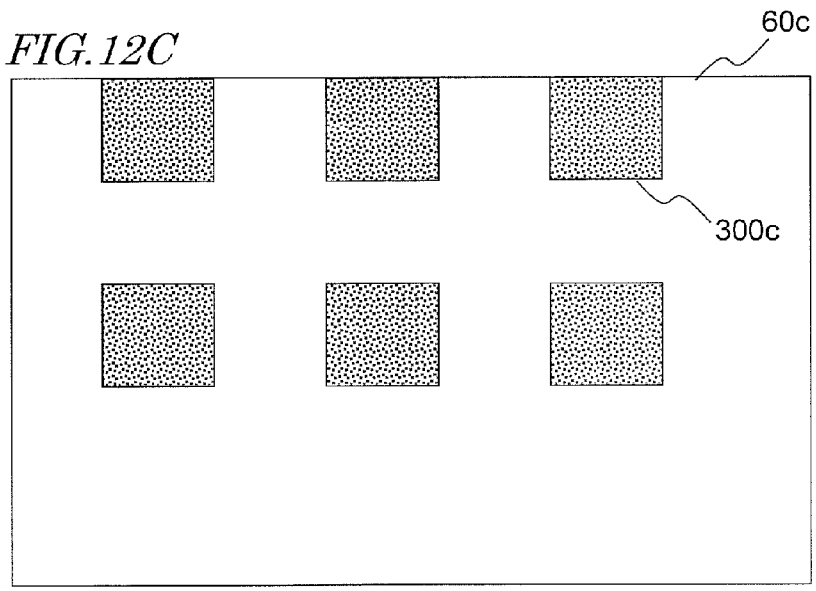
FIG. 12C illustrates schematically six pixels 300c representing image portions captured by those six photodiodes 40.
Figure 13A:
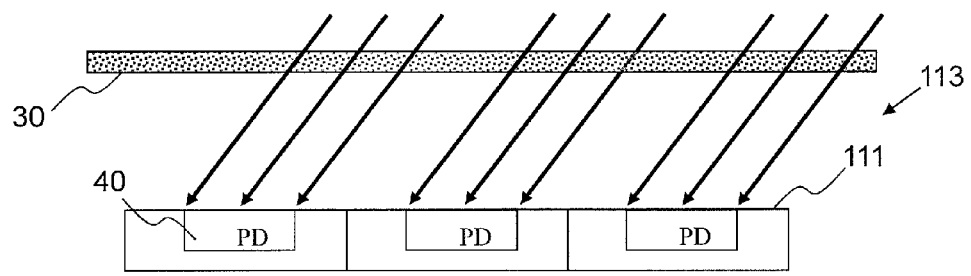
FIG. 13A is a cross-sectional view schematically showing yet another example of the direction in which light rays transmitted through the object 30 are incident on photodiodes 40.
Figure 13B:
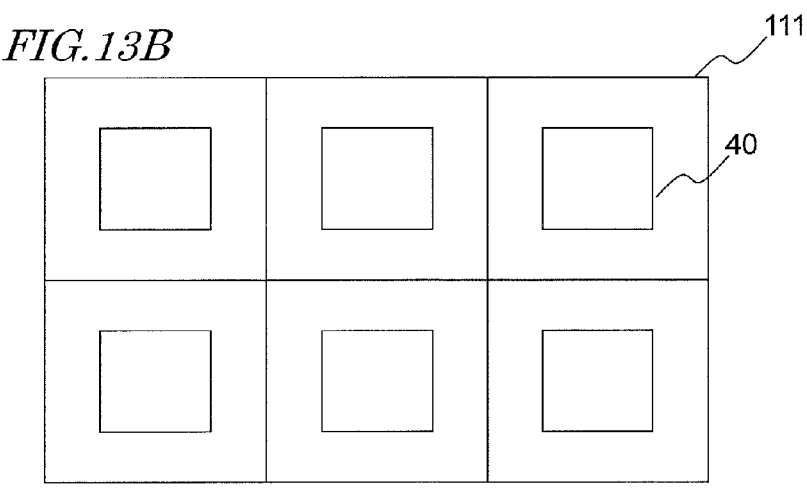
FIG. 13B is a plan view schematically illustrating an exemplary arrangement of six photodiodes 40 of interest.
Figure 13C:
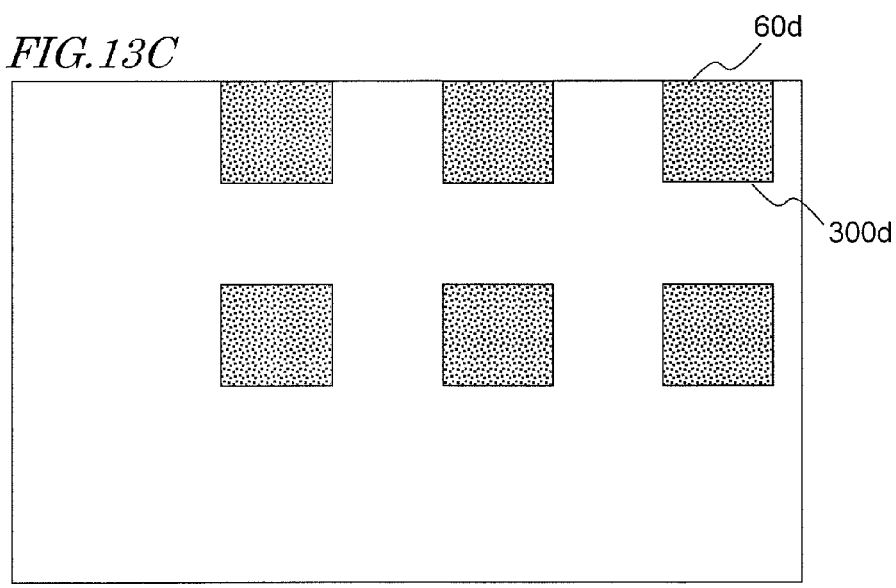
FIG. 13C illustrates schematically six pixels 300d representing image portions captured by those six photodiodes 40.

Next, take a look at FIGS. 12A through 13C. FIGS. 12A and 13A are cross-sectional views each schematically showing the directions in which light rays transmitted through the object 30 are incident on photodiodes 40. In these examples, the light rays are tilted in a direction with respect to a normal to the imaging surface, in a manner of coming out of the plane of the figure. FIGS. 12B and 13B are plan views each schematically illustrating an exemplary arrangement of six photodiodes 40 of interest. And FIGS. 12C and 13C each illustrate schematically six pixels 300c, 300d representing image portions captured by those six photodiodes 40. An image 60c is formed of the pixels 300c shown in FIG. 12C. And an image 60d is formed of the pixels 300d shown in FIG. 13C.

Figure 14:
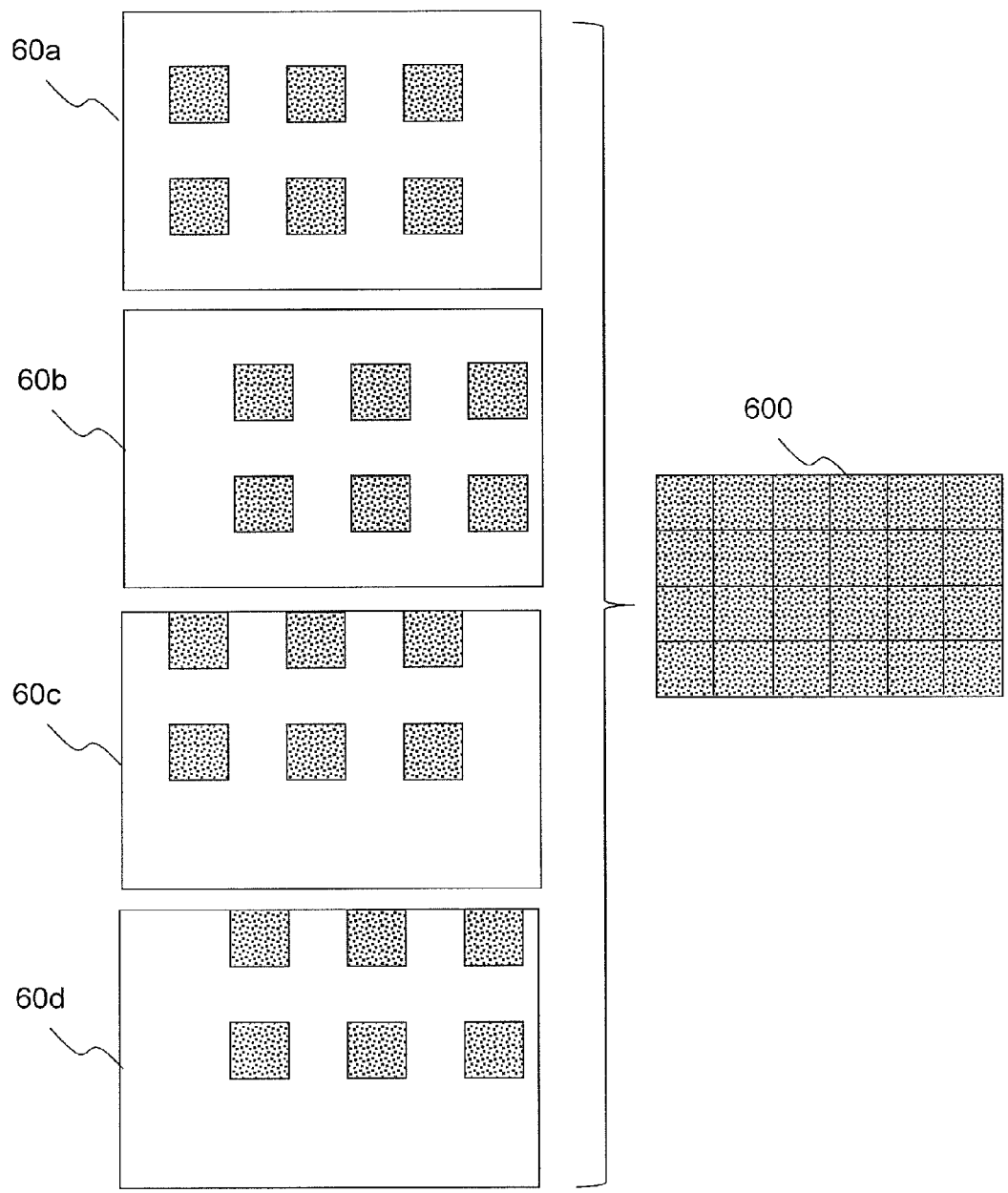
FIG. 14 illustrates schematically how a high-resolution image 600 is generated by synthesizing four images 60a, 60b, 60c, and 60d together.

FIG. 14 illustrates schematically how a high-resolution image 600 is generated by synthesizing the four images 60a, 60b, 60c, and 60d together. The number of pixels (or pixel density) of the high-resolution image 600 is four times as large as the number of pixels (or pixel density) of any of those four images 60a, 60b, 60c, and 60d. Since the image sensor 113 has an aperture ratio of 25% in this example, the resolution can be increased fourfold at maximum by irradiating the object with those four light beams coming from four different directions. Speaking more generally, supposing N is an integer which is equal to or greater than two, if the aperture ratio of the image sensor 113 is approximately equal to 1/N, the resolution can be increased N fold at maximum.

It will be advantageous that the object 30 does not move or get deformed while those low-resolution images are captured with the direction of the illuminating light beam being changed.

Figure 15A:
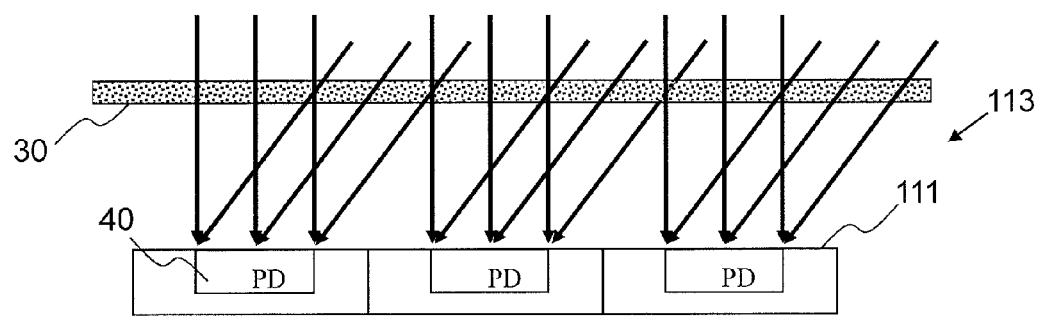
FIG. 15A is a combined cross-sectional view schematically showing light rays shown in FIG. 10A and light rays shown in FIG. 11A.

Next, look at FIGS. 15A through 16C. FIG. 15A illustrates the respective states shown in FIGS. 10A and 11A in combination. In the state shown in FIG. 15A, the directions in which the light beams are incident on the object 30 are adjusted appropriately. That is why as shown in FIG. 15C, the two sets of pixels 300a and 300b in the two superposed images 60a and 60b represent mutually different regions of the object 30 without overlapping with each other.

Figure 15B:
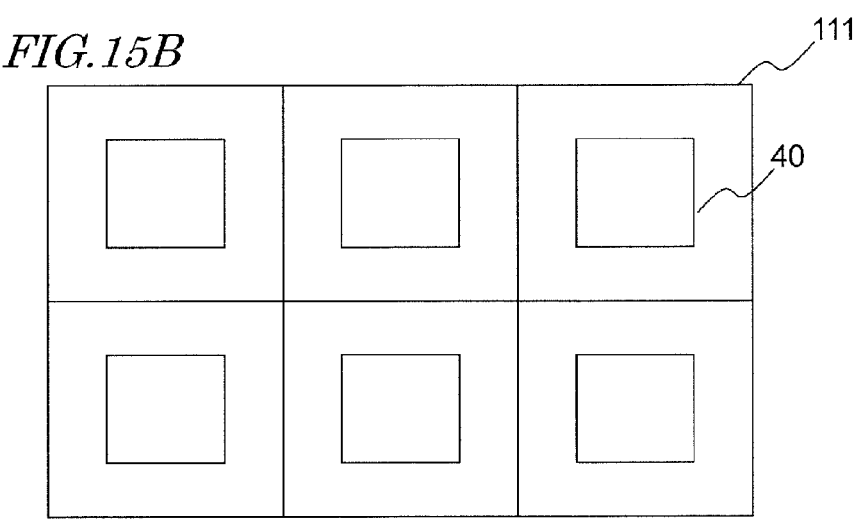
FIG. 15B is a plan view schematically illustrating an exemplary arrangement of six photodiodes 40 of interest.
Figure 15C:
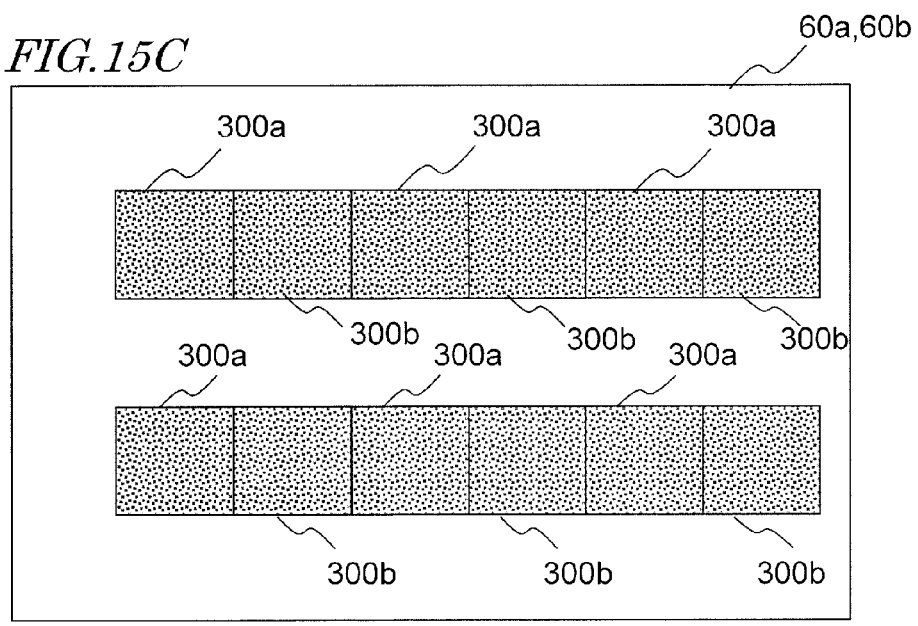
FIG. 15C is an example of a synthesized image of two images 60a and 60b that have been captured in respective appropriate irradiation directions.
Figure 16A:
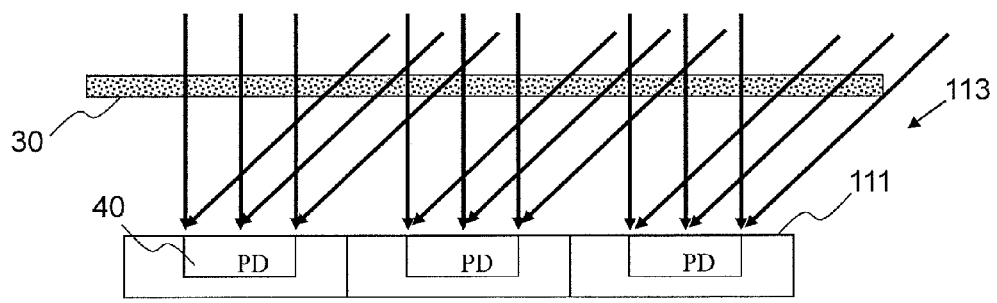
FIG. 16A is a combined cross-sectional view schematically showing light rays of which directions are not adjusted appropriately.
Figure 16B:
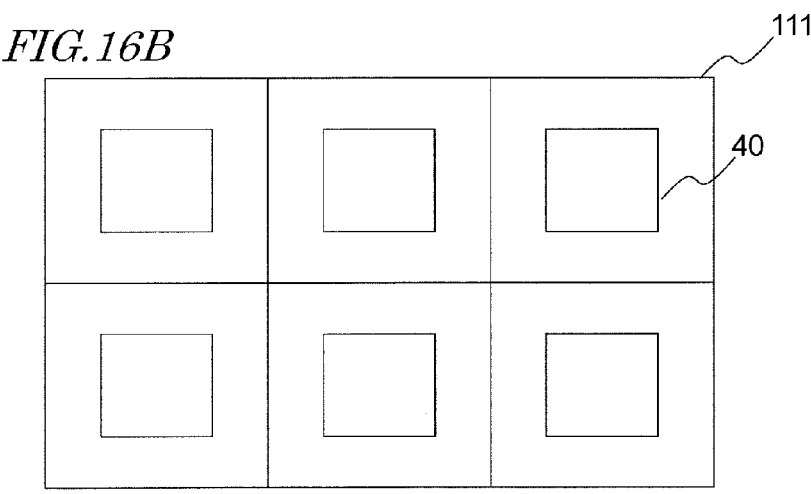
FIG. 16B is a plan view schematically illustrating an exemplary arrangement of six photodiodes 40 of interest.
Figure 16C:
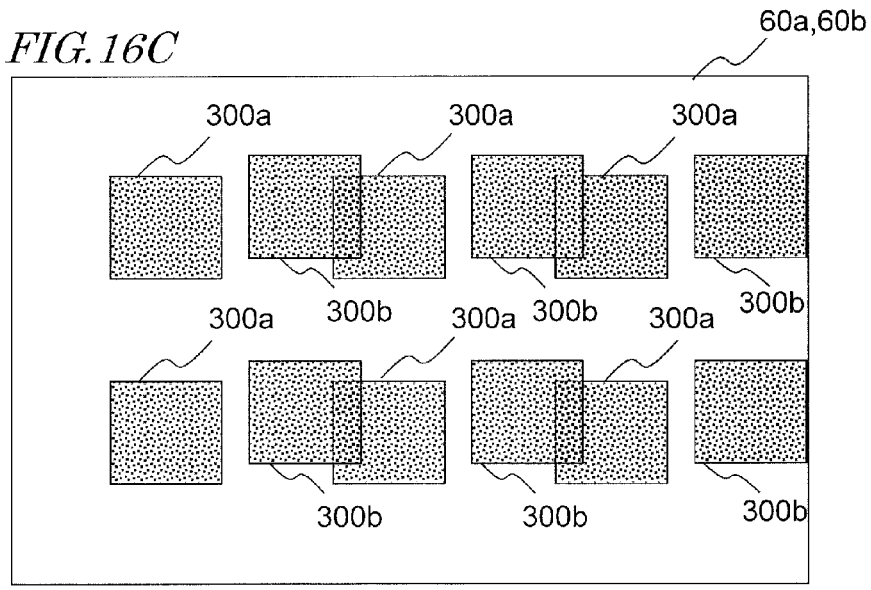
FIG. 16C is an example of a synthesized image of two images 60a and 60b that have been captured in inappropriate irradiation directions.

FIGS. 16A, 16B and 16C correspond to FIGS. 15A, 15B and 15C, respectively. In the state shown in FIG. 16A, however, the directions in which the light beams are incident on the object 30 are not adjusted appropriately. As a result, as shown in FIG. 16C, the two sets of pixels 300a and 300b in the two superposed images 60a and 60b partially pertain to identical regions the object 30. As can be seen from the foregoing description, it is beneficial to set appropriately the directions in which the light beams are incident on the object 30. Also, to prevent unnecessary light other than illuminating light beams from entering the object 30 at least during an image capturing session, the object 30 and the image sensor 113 may be surrounded with walls that shut out external light.

Embodiments of the present disclosure will now be described in further detail.

Embodiment 1

Figure 17:
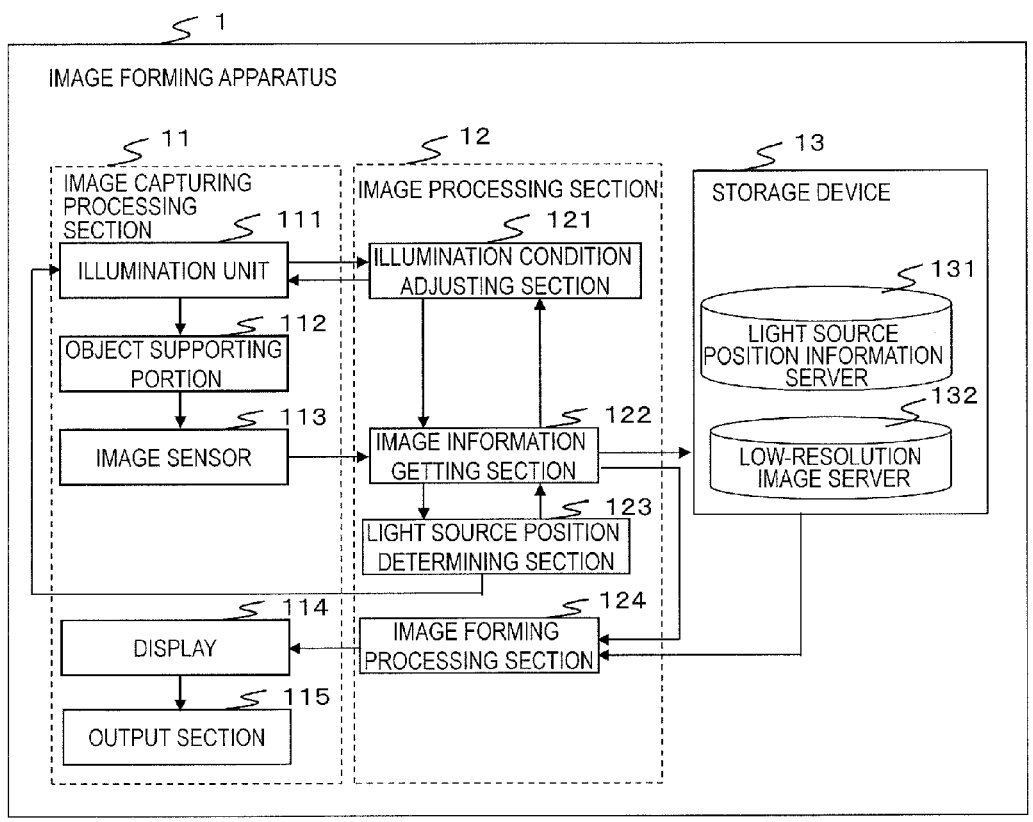
FIG. 17 is a block diagram showing an example of general configuration for an image forming apparatus according to a first embodiment.

An image forming apparatus as a first embodiment of the present disclosure will be described with reference to FIG. 17, which is a block diagram showing an example of configuration for an image forming apparatus according to this embodiment. As shown in FIG. 17, this image forming apparatus 1 includes an image capturing processing section 11 with an illuminating function and an image capturing function, an image processing section 12 which generates and outputs a high-resolution image based on low-resolution images obtained by the image capturing processing section 11, and a storage device 13 which stores light source position information and the low-resolution image.

The image capturing processing section 11 includes the illumination unit 111, the object supporting portion 112, the image sensor 113, a display 114 and an output section 115. The illumination unit 111 has the configuration described above, and can irradiate the object with parallel light beams with a predetermined illuminance from multiple directions. The object supporting portion 112 supports the object so that the interval between the imaging surface of the image sensor 113 and the object becomes equal to or shorter than 10 mm (typically 1 mm or less).

The illumination unit 111 of this embodiment includes LEDs as light sources for example. The illumination unit 111 may include LEDs in the three colors of RGB, which are arranged at four positions. However, the light sources do not have to be LEDs but may also be light bulbs, laser diodes or fiber lasers as well. When light bulbs are used, a lens or reflective mirror which transforms the light emitted from the light bulbs into a parallel light beam may be used. Still alternatively, the light sources may also emit infrared light or ultraviolet light. Color filters which either change or filter out the wavelengths of the light emitted from the light sources may be arranged on the optical path.

The illumination unit 111 may include either a plurality of light sources as shown in FIGS. 5A to 5C or a single light source which is supported movably as shown in FIG. 6 so as to change the direction of the light that is going to be incident on the object.

The object supporting portion 112 is a member for supporting the object during an image capturing session, and may be the upper surface of the image sensor 113. Optionally, the object supporting portion 112 may have a mechanism to support the object so that its position does not change during an image capturing session. The object supporting portion 112 may be configured to put the object 30 on the image sensor 113 with almost no gap left between them.

Figure 18:
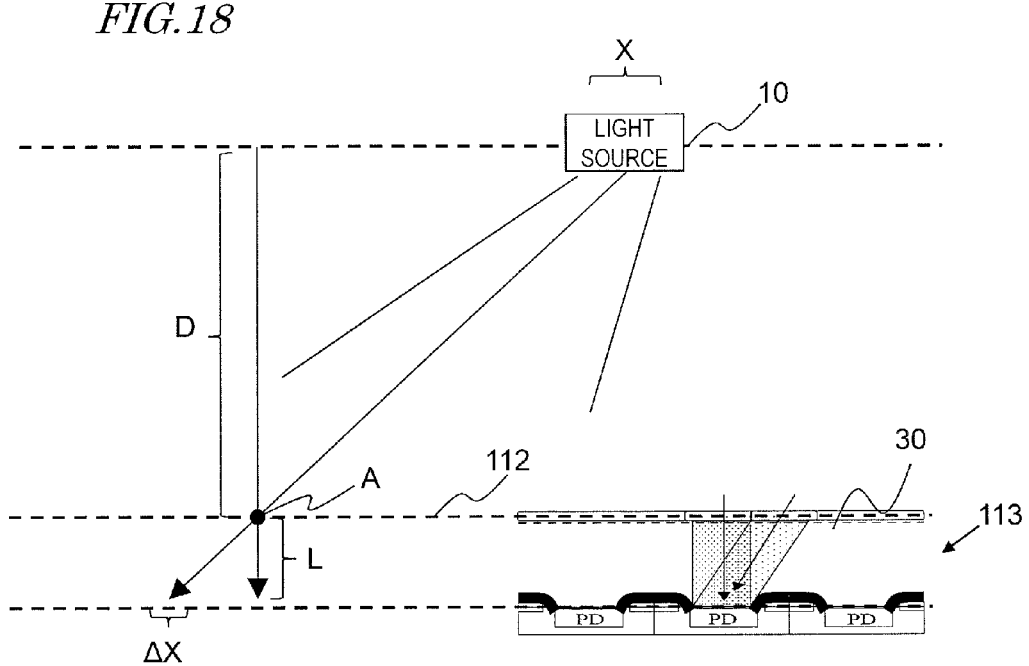
FIG. 18 is a cross-sectional view illustrating how an error is caused in the point of incidence of a light ray due to a positional shift of a light source in an image forming apparatus according to the first embodiment.

FIG. 18 illustrates the relative arrangement of the object 30 on the image sensor 113 with respect to the light source 10.

The distance D from the light source 10 to the object 30 may be set to be equal to or longer than 1 m, for example. To prevent the image from getting blurred, the interval L between the imaging surface of the image sensor 113 and the object 30 may be set to be equal to or smaller than 100 μm ($=1\times10^{-4}$ m), e.g., 1 μm ($=1\times10^{-6}$ m). Supposing D=1 m and L=$1\times10^{-6}$ m, if the light source 10 shifts X m horizontally and laterally, the light ray going out of the light source 10 and passing through a point A on the object 30 will be incident at a point on the imaging surface which has also shifted ΔX m. Since ΔX/X=D/L is satisfied, X may be reduced to 0.1 m or less to decrease ΔX to 0.1 μm ($=1\times10^{-7}$ m) or less. It is easy to set the positional shift X of the light source 10 to be 0.1 m (=10 cm) or less when the position of the light source 10 is adjusted. When an image sensor 113 with a pixel pitch K of about 1 μm is used, the distance from the image sensor 113 to the light source 10 may be set to be approximately 1 m. In that case, even if the light source has caused a positional shift X of several cm or so, the image quality will not be debased. Also, in view of these considerations, if red, green and blue light sources (which will be hereinafter referred to as "RGB light sources") are arranged in a particular light source direction close to each other so as to fall within the range of 0.1 m (=10 cm) or less, those light sources may be handled as a single light source.

In this embodiment, the image sensor 113 may be comprised of approximately 4800×3600 pixels, for example. In that case, the pixel pitch K may be set to be approximately 1.3 μm, for example. Also, the interval between the imaging surface and the upper surface of the image sensor, i.e., the interval L between the imaging surface and the object, may be set to be approximately 1.3 μm, for example. In this embodiment, the aperture ratio of the image sensor 113 may be, but does not have to be, 25%.

Next, an exemplary relative arrangement between the light sources 10 of the illumination unit 111 and the image sensor 113 will be described with reference to FIG. 19.

Figure 19:
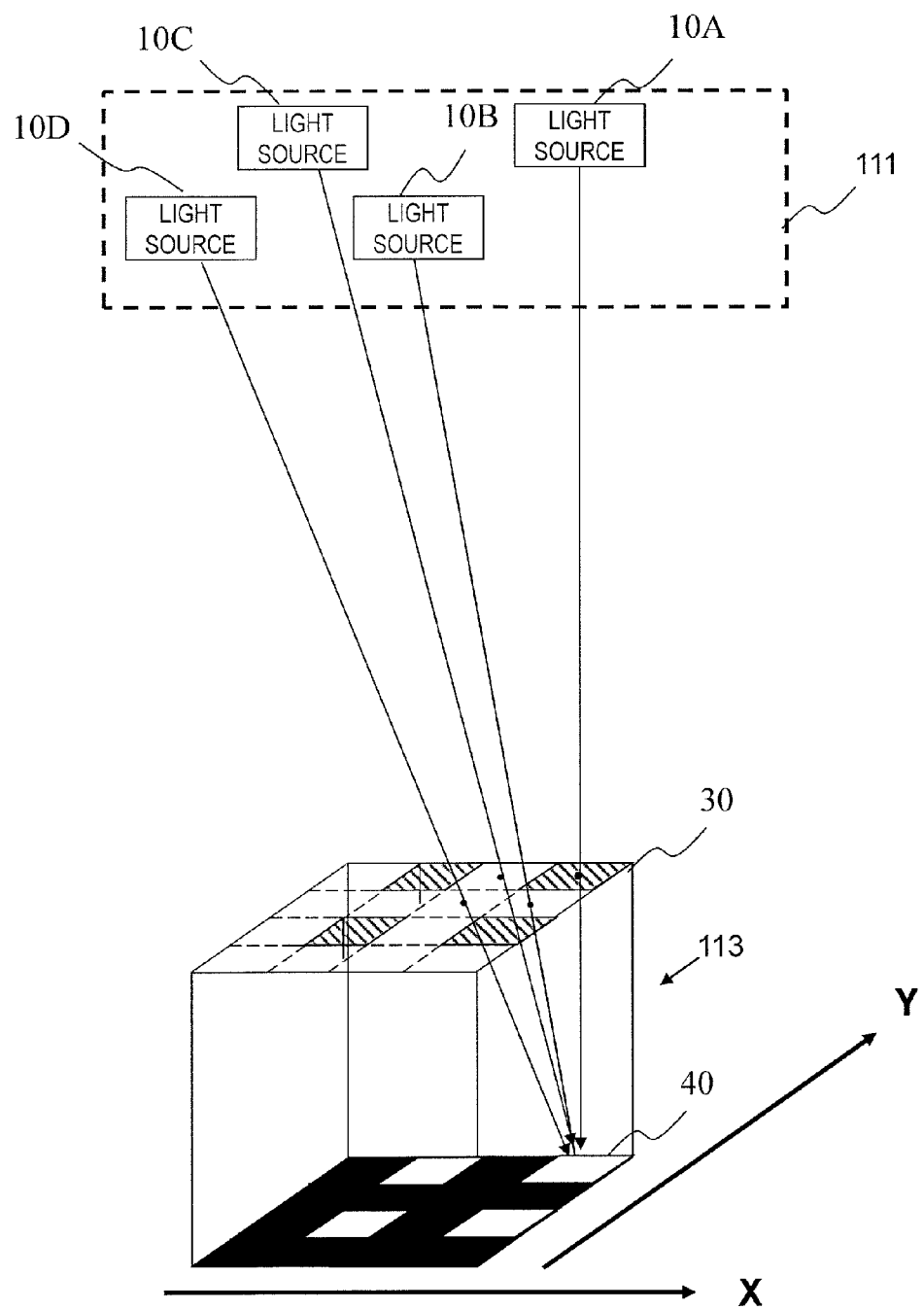
FIG. 19 shows exemplary positions of light sources in an image forming apparatus according to the first embodiment.

The illumination unit 111 shown in FIG. 19 includes four light sources 10A, 10B, 10C and 10D at a position which is about 1 m away from the image sensor 113. From these light sources 10A, 10B, 10C and 10D, emitted are light beams, each having a spread of about 1/100 [rad] or less. Each of these light beams is a substantially parallel light beam. In FIG. 19, shown are four photodiodes 40 which are associated with four pixels that are arranged in two columns and two rows, and also shown are four light rays incident on one photodiode 40 of interest among those four. These four light rays correspond to the respective center axes of the four light beams (which will be hereinafter simply referred to as "optical axes") emitted from the light sources 10A, 10B, 10C and 10D. On the object 30 shown in FIG. 19, boundary lines are drawn for convenience sake to define sixteen regions which are arranged in four rows and four columns. Actually, however, such lines are not drawn on the real object 30. But these boundary lines are just drawn on the object 30 to clearly indicate exactly what region of the object 30 a light ray has been transmitted through before being incident on a single photodiode 40. Among those sixteen regions defined by the boundary lines, ones that are located right over the respective photodiodes 40 are shadowed.

A first light source 10A is located right over the image sensor 113 and its optical axis intersects at right angles with the imaging surface. That is to say, the optical axis of the first light source 10A is parallel to a normal to the imaging surface. In this description, the point at which the optical axis of the first light source 10A intersects with the upper surface of the image sensor 113 (or the object) will be hereinafter referred to as a "reference point".

The optical axis of a second light source 10B is tilted in the negative Y-axis direction with respect to a normal to the imaging surface. The point at which the optical axis of the second light source 10B intersects with the upper surface of the image sensor 113 (or the object) has shifted by K/2 in the negative Y-axis direction with respect to the reference point. The optical axis of a third light source 10C is tilted in the negative X-axis direction with respect to a normal to the imaging surface. The point at which the optical axis of the third light source 10C intersects with the upper surface of the image sensor 113 (or the object) has shifted by K/2 in the negative X-axis direction with respect to the reference point. The optical axis of a fourth light source 10D is tilted in a direction which has rotated π/4 radians from the negative X-axis direction with respect to a normal to the imaging surface. The point at which the optical axis of the fourth light source 10D intersects with the upper surface of the image sensor 113 (or the object) has shifted by K/2 in each of the negative Y-axis and negative X-axis directions with respect to the reference point.

The "irradiation direction" of illuminating light is determined by the relative arrangement of its light source with respect to the object (or imaging surface). In this description, the imaging surface is regarded as a reference plane and the direction from which an illuminating light ray has come before being incident on the imaging surface is defined to be the "irradiation direction". Supposing the horizontal and vertical directions on the imaging surface are X and Y axes, respectively, and a normal to the imaging surface is Z axis, the irradiation direction may be determined by a vector in the XYZ coordinate system. The irradiation direction may be an arbitrary one, so is the number of irradiation directions.

The irradiation direction that is perpendicular to the imaging surface may be represented by the vector (0, 0, 1). If the interval between the imaging surface and the object is L, sixteen different irradiation directions θ1 through θ16 may be represented by the vectors (0, 0, L), (K/4, 0, L), (2K/4, 0, L), (3K/4, 0, L), (0, K/4, L), (K/4, K/4, L), (2K/4, K/4, L), (3K/4, K/4, L), (0, 2K/4, L), (K/4, 2K/4, L), (2K/4, 2K/4, L), (3K/4, 2K/4, L), (0, 3K/4, L), (K/4, 3K/4, L), (2K/4, 3K/4, L) and (3K/4, 3K/4, L), respectively. Another angle at which the same images can be captured may also be adopted.

It should be noted that the points at which the light rays emitted from the light sources 10A, 10B, 10C, and 10D are incident on the object before entering the same photodiode do not have to shift by K/2 parallel to the X- or Y-axis. Alternatively, the magnitude of that shift may be (odd number)×(K/2). Supposing M and N are odd numbers, the magnitude of that shift may be represented by |(MK/2, NK/2, 0)| according to vector notation. Also, if the aperture ratio is 1/9 as in the second embodiment to be described later, the points at which the light rays coming from respective light sources are incident on the object before entering the same photodiode will shift by K/3 or 2K/3 parallel to the X- or Y-axis.

Also, even though the optical axis of the light source 10A is defined to intersect with the imaging surface at right angles, the optical axis of every light source 10A, 10B, 10C, 10D may define a tilt angle with respect to a normal of the imaging surface. Alternatively, an arrangement in which at least one light source 10 is supported movably and moves to an appropriate position to emit a light beam in a predetermined direction from that position may also be adopted as already described with reference to FIG. 6.

FIG. 20 shows an exaggerated distribution of the angles of incidence of multiple light rays that have been emitted from a single light source 10. A light ray is incident perpendicularly onto a region which is located right under the light source 10. On the other hand, a light ray is incident obliquely onto a region which is located at an end portion of the imaging surface. Suppose the distance D from the imaging surface to the light source 10 is set to be approximately 1 m. The distance C from the center of the image sensor to the end portion is at most 10 mm (=1×10$^{-2}$ m). Also, in this example, L=1× 10$^{-6}$ m. Ideally, the light coming from the light source should be incident perpendicularly, but is incident obliquely onto such an end portion of the imaging surface. That is why the point of incidence of such an obliquely incident light ray shifts ΔX with respect to the point of incidence of the perpendicularly incident light ray. When the exemplary set of numerical values described above is adopted, C/D=Δx/L is satisfied. Thus, Δx=(LC)/D=(1×10$^{-6}$×1×10$^{-2}$)/1=1×10$^{-8}$=10 nm is satisfied. That is to say, depending on whether the light ray has passed through the center or an end portion of the image sensor (i.e., depending on which portion of the object the light ray has passed through) before being incident on the photodiode, a magnitude of shift Δx of at most 10 nm will be caused. If the pixel pitch K is 1 μm (=1×10$^{-6}$ m), Δx=10 nm (=1×10$^{-8}$ m) is smaller than the pixel pitch K by two digits. That is why as long as the distance D from the imaging surface to the light source 10 is set to be an appropriate value with the size of the imaging surface taken into account, the light source direction with respect to the object may be regarded as constant for the same light source, no matter where the light come from with respect to the object.

Now take a look at FIG. 17 again. The image processing section 12 of this embodiment includes an illumination condition adjusting section 121, an image information getting section 122, a light source position determining section 123, and an image forming processing section 124. These components may be implemented as respective functional blocks of a computer that performs the function of the image processing section 12 and may have their functions performed by executing a computer program stored on a storage medium.

The storage device 13 includes a light source position information server 131 and a low-resolution image server 132. The storage device 13 may be a hard disk drive, a semiconductor memory or an optical storage medium, or may also be a digital server which is connected to the image processing section 12 through a digital network such as the Internet.

The illumination condition adjusting section 121 of the image processing section 12 adjusts various illumination conditions (including the light source's position, its brightness, the light emission interval, and illuminance) imposed on the illumination unit 111. The image information getting section 122 controls the image sensor 113 with the illumination conditions set appropriately for the illumination unit 111 and makes the image sensor 113 capture images as the light sources to be turned ON are changed one after another. The image information getting section 122 receives data about the images (low-resolution images) captured by the image sensor 113 from the image sensor 113. Also, the image information getting section 122 gets pieces of information defining the illumination conditions (including light source directions, emission intensities, illuminance and wavelengths) from the illumination condition adjusting section 121 in association with the image data received.

The light source position determining section 123 calibrates the light source position prior to an image capturing session. The light source position determining section 123 determines the light source position based on an image of a calibration sample obtained by the image information getting section 122. When capturing an image of the calibration sample, the calibration sample is placed on the object supporting portion 112. The light source position determining section 123 adjusts the light source position of the illumination unit 111 based on light source positions as determined through calibration.

The light source position information server 131 stores, as a database of positions, information about the light source position determined by the light source position determining section 123. Every time the light source position has been adjusted by the light source position determining section 123, this database is rewritten.

The low-resolution image server 132 stores, as an image database, data about the low-resolution images gotten through the image information getting section 122 and information about the illumination conditions that were adopted when the low-resolution images were captured. In this embodiment, four low-resolution images are captured by irradiating the object with illuminating light beams coming from four different directions, for example. These low-resolution images correspond to the images 60a to 60d which are schematically shown in FIG. 14. When the image forming processing (to be described later) gets done, the data about the low-resolution images may be deleted from the image database.

In response to a signal indicating that an image capturing session has ended from the image information getting section 122, the image forming processing section 124 of the image processing section 12 respectively gets light source position information and low-resolution images from the light source position information server 131 and low-resolution image server 132 of the storage device 13. Then, the image forming processing section 124 gets resolution enhancement done based on the principle described above (see FIGS. 14 and 19). That is to say, by combining pixel values that form the images 60a to 60d, a single high-resolution image can be obtained. In this case, the image forming processing section 124 subjects the image to color correction, de-mosaicing (also called de-pixelization) processing, grayscale correction (γ correction), YC separation processing, overlap correction and other kinds of correction. The high-resolution image thus obtained is presented on the display 114 or output to a device outside of the image forming apparatus 1 through the output section 115. The high-resolution image output through the output section 115 may be written on a storage medium (not shown) or presented on another display.

Although a high-resolution image, of which the number of pixels has been increased fourfold, (i.e., an image which has been zoomed in at a zoom power of 2×) is supposed to be formed in the embodiment described above using the image sensor 113 with an aperture ratio of 25%, N low-resolution images may be captured by an image sensor with an aperture ratio of 1/N and a high-resolution image, of which the number of pixels has been increased N fold, (i.e., an image which has been zoomed in at a zoom power of $N^{0.5}$) may also be formed.

Although a high-resolution image can be formed according to this embodiment based on low-resolution images, the low-resolution images may be used as they are if no high-resolution image is needed, in particular. According to this embodiment, the zoom power of the image can be changed easily even without using any lens with a high zoom power.

Figure 21A:
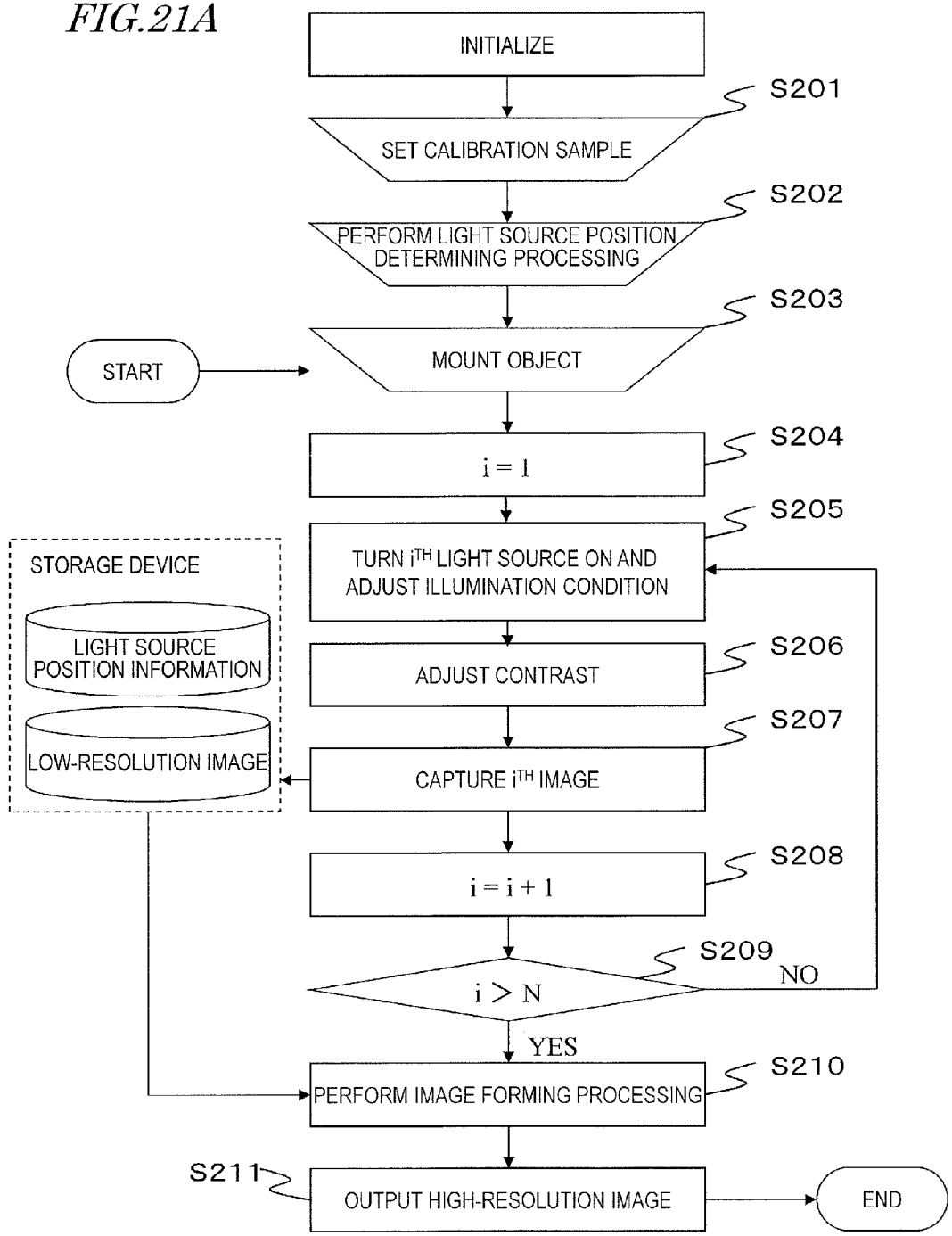
FIG. 21A is a flowchart showing an exemplary procedure in which an image forming apparatus according to the first embodiment operates.

Next, it will be described with reference to FIG. 21A how the image forming apparatus 1 of the embodiment described above performs the initialization and image forming operations. FIG. 21A is a flowchart showing an exemplary procedure in which the image forming apparatus 1 generates an image.

[Preparing Step: Adjusting Light Source Position]

Figure 22:
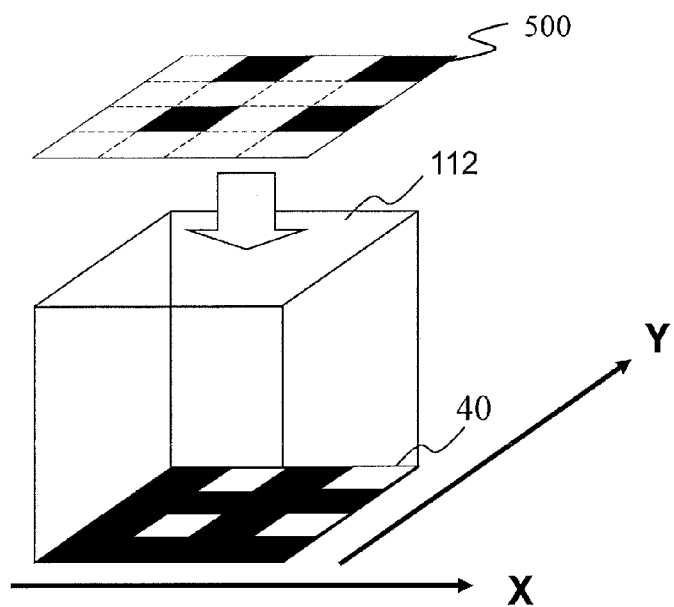
FIG. 22 illustrates a calibration sample and its arrangement in an image forming apparatus according to the first embodiment.

After a calibration sample has been set on the object supporting portion 112 to initialize the light source position (in Step S201), light source position determining processing is carried out (in Step S202). The calibration sample is a sample of which the optical transmittance at each position is known in advance as two-dimensional information. For example, the calibration sample 500 shown in FIG. 22 is a transparent film and has a black dot pattern which is arranged in a grid pattern on the surface. Although only a portion of the calibration sample 500 for four pixel regions is shown in FIG. 22, the real calibration sample 500 may be large enough to cover the imaging surface of the image sensor 113 entirely. In this example, the black regions are supposed to be regions that are totally opaque to incoming light for the sake of simplicity.

In the calibration sample 500 shown in FIG. 22, the shape and locations of its four black regions agree with those of their associated photodiodes 40. Also, those four black regions are supposed to be located right over their associated four photodiodes 40. Suppose a situation where a light beam is emitted from a particular one of the light sources of the illumination unit 111 (not shown) to irradiate the calibration sample 500. If the optical axis of that light source intersects with the imaging surface at right angles, every light ray emitted from the light source will be cut by the black regions. As a result, the outputs of the four photodiodes 40 will have values at the lowest level. On the other hand, if the optical axis of the light source is slightly tilted with respect to a normal to the imaging surface, some light rays will not be cut by the black regions but will be incident on the respective photodiodes 40. As a result, the outputs of the four photodiodes 40 will have values at a higher level than the lowest one. If the light source position is determined so that the optical axis of the light source intersects with the imaging surface at substantially right angles and then the outputs of the respective photodiodes 40 are detected with the light source position changed, their outputs may sometimes have local minimum values. In that case, decision can be made that the optical axis of the light source intersects with the imaging surface at right angles.

In the example described above, the four black regions are supposed to be totally opaque regions. However, those black regions do not have to have an optical transmittance of 0%. Also, although the arrangement of the four black regions agrees with that of the four photodiodes 40 in the example illustrated in FIG. 22, the calibration sample 500 does not have to have such a pattern. Rather, as long as the pattern of the calibration sample 500 is known in advance, the pattern may have any arbitrary shape.

The storage device 13 stores sample data associated with a plurality of light source positions which have been set in advance with respect to the calibration sample 500. The illuminating condition adjusting section 121 chooses a predetermined light source position from a plurality of light source positions and irradiates the calibration sample 500 with a light beam. The image sensor 113 captures an image of the calibration sample 500 which is being irradiated with a light beam emitted from the predetermined light source position. Then, the light source position determining section 123 compares the image thus captured to the sample data stored in the storage device 13. And images will be captured a number of times with the light source position slightly changed until the image captured agrees with the sample data. As a result, the light source position can be determined appropriately. The relative arrangement of a plurality of light sources may be determined so that light rays are incident as shown in FIG. 15A, not as shown in FIG. 16A.

[Resolution Enhancing Step]

Figure 23:
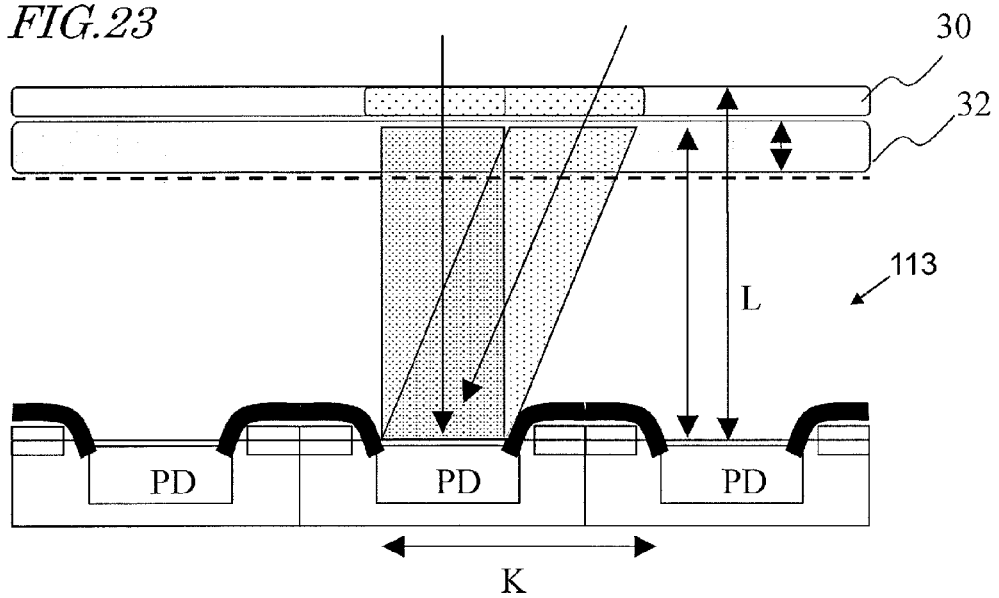
FIG. 23 illustrates a situation where a cover glass has been inserted into an image forming apparatus according to the first embodiment.

Next, the object is mounted on or above the object supporting portion 112 (in Step S203). In this example, the object is a pathological specimen. However, the object may also be light-transmitting sample, of which the thickness is about several μm and of which the shape does not change during the image capturing session (such as a cell or a sliced tissue). Optionally, the image capturing session may be carried out with slide glass reversed. In this case, cover glass 32 may be put on the upper surface of the image sensor and the sample may be put on the cover glass. In that case, the thickness of the cover glass 32 is added to the interval L. That is why the light source position may be adjusted again (see FIG. 23).

Next, to get low-resolution images, images are captured with four light sources sequentially turned ON one after another. For example, by defining i=1 (in Step S204), only the $i^{th}$ light source is turned ON (in Step S205). The $i^{th}$ image (low-resolution image) is captured (in Step S207) with the contrast ratio adjusted (in Step S206).

Next, i is defined to be i+1 (in Step S208) and then decision is made whether or not i has exceeded N=4 which is the number of images to be captured (in Step S209). Images are captured over and over again until i exceeds 4.

The $i^{th}$ low-resolution image captured is stored in an image buffer. If the decision has been made that i>N is satisfied (i.e., if the answer to the query of the processing step S209 is YES), the image forming processing is carried out. The pixel data are synthesized together with the pixel locations of the respective low-resolution images shifted from each other so that the N low-resolution images are superposed one upon the other as shown in FIG. 14, thereby forming a high-resolution image (in Step S210). And that image is sent out as a high-resolution image output (in Step S211). The high-resolution image may be either output to the display 114 or supplied to an external device.

Figure 24:
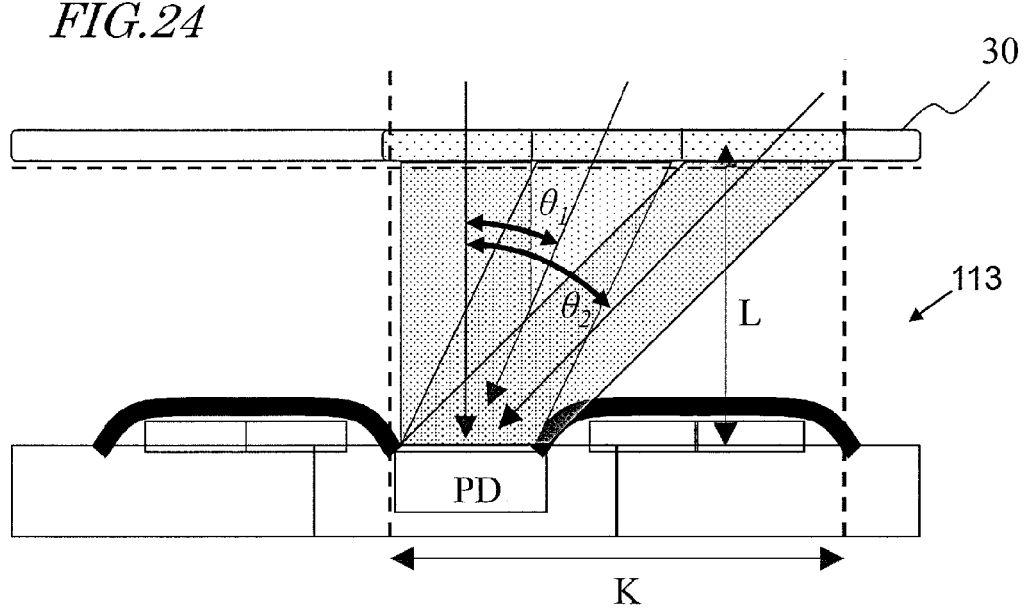
FIG. 24 is a cross-sectional view illustrating other exemplary directions in which light rays may also be incident on an image forming apparatus according to the first embodiment.

FIG. 24 shows the directions in which light rays are incident when an image to be zoomed in at a power of 3× in each of the X and Y directions is going to be captured by an image sensor with an aperture ratio of 1/9.

Figure 21B:
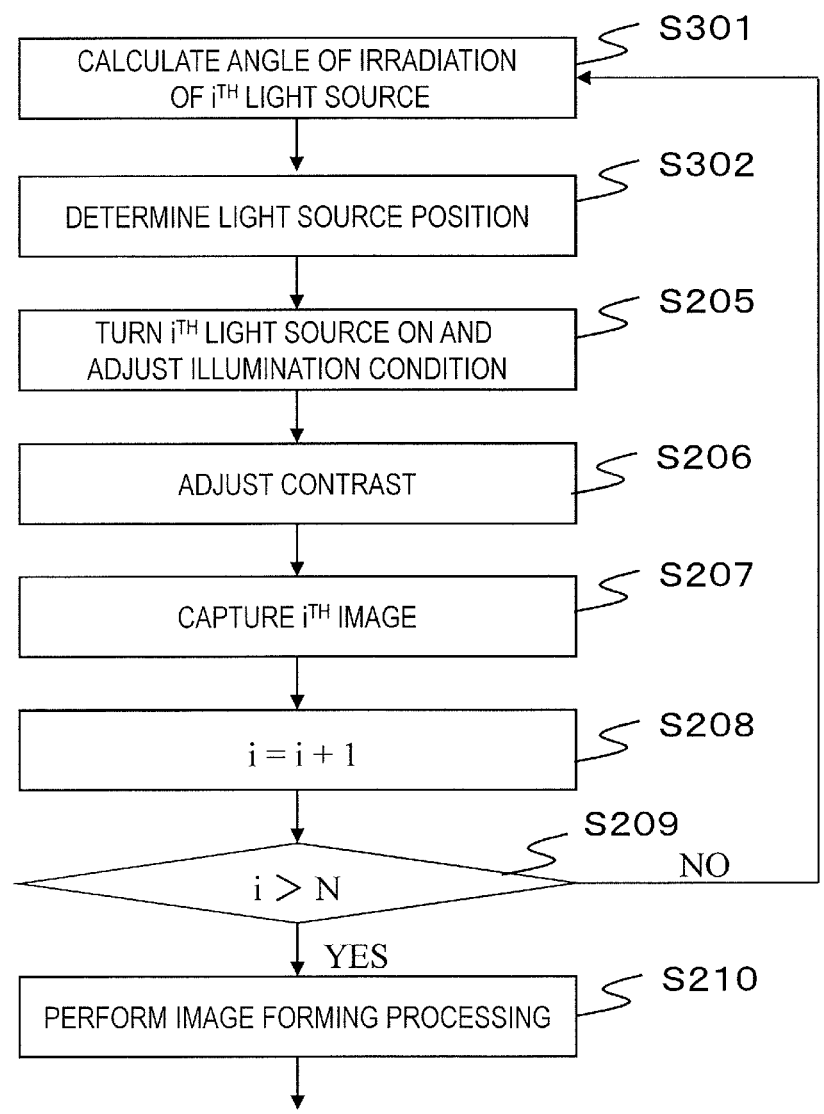
FIG. 21B is a flowchart showing another exemplary procedure in which an image forming apparatus according to the first embodiment operates.

FIG. 21B is a flowchart showing another exemplary operation of an image forming apparatus according to this embodiment. In this example, the light source position is determined by calculation each time. According to this procedure, the angle of irradiation of the light source is calculated in Step S301 and then the light source position is determined in Step S302. After that, the other processing steps S205 to S210 will be performed just as described above.

Figure 21C:
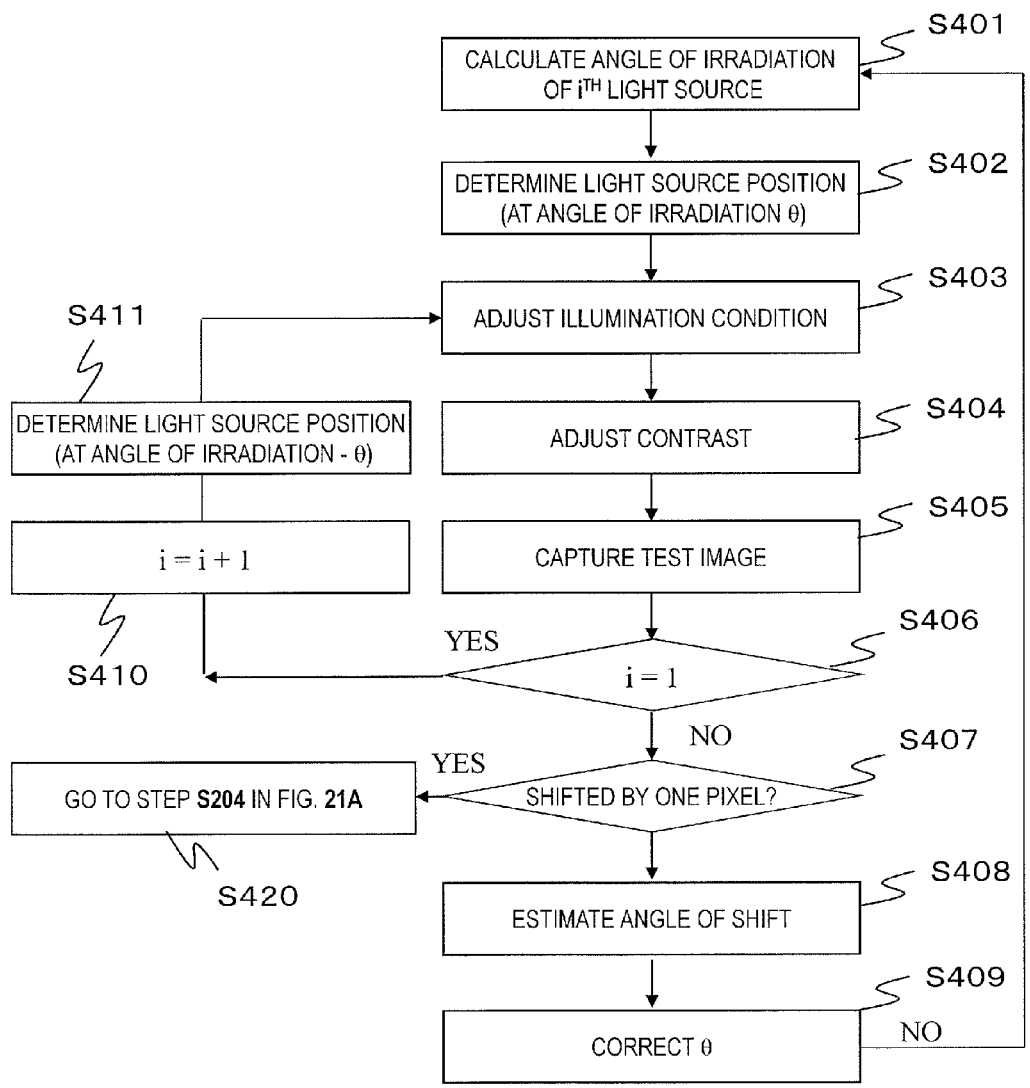
FIG. 21C is a flowchart showing still another exemplary procedure in which an image forming apparatus according to the first embodiment operates.

FIG. 21C is a flowchart showing still another exemplary operation of an image forming apparatus according to this embodiment. In this example, the light source position is determined by experiment, not by calculation.

A method of adjusting the angle in the X and Y directions will be described. If the pitches are different in the X and Y directions, for example, the angle needs to be adjusted in each of the X and Y directions. In the following example, however, the adjustment is supposed to be made only in the Y direction for the sake of simplicity. If the angle does not have to be readjusted in both of the X and Y directions, then the angle may be adjusted in just one of the two directions and the angle obtained in that direction may be used.

Figure 27:
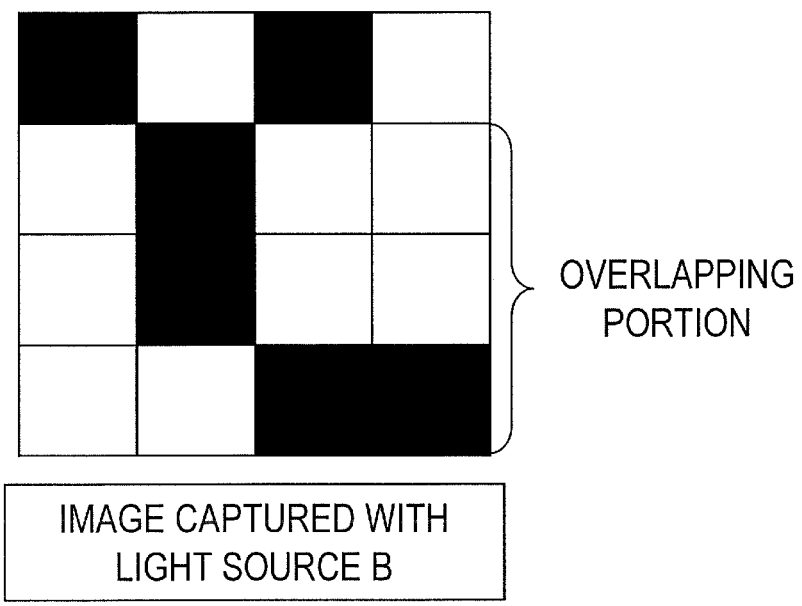
FIG. 27 illustrates an exemplary image obtained by an image forming apparatus according to the second embodiment.
Figure 28:
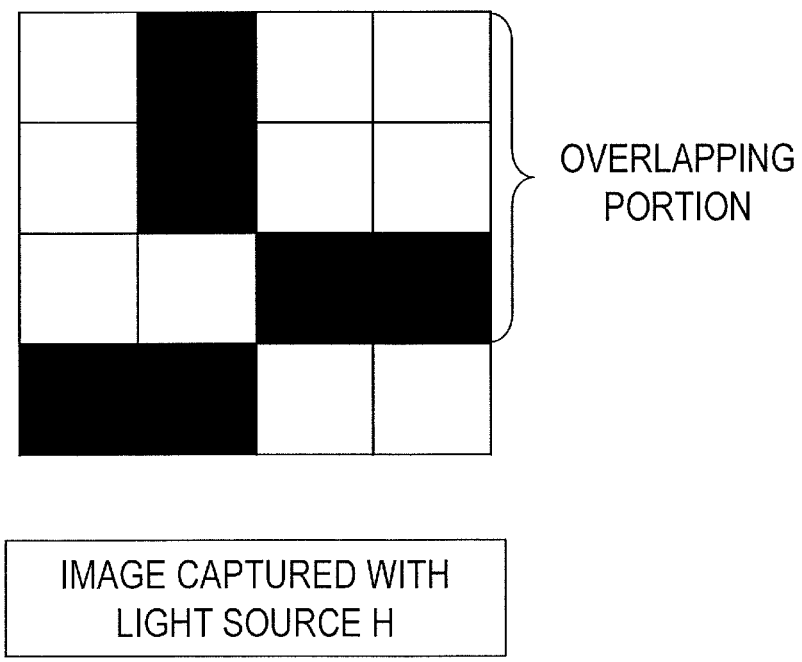
FIG. 28 illustrates an exemplary image obtained by an image forming apparatus according to the second embodiment.

Now it will be described with reference to FIGS. 27 and 28 how to adjust the angle. FIG. 27 illustrates an image obtained by the image information getting section 122 with the light source B turned ON, for example. FIG. 28 illustrates an image obtained by the image information getting section 122 with the light source H turned ON, for example. These images have been captured with light rays that have been transmitted through the same portions of a calibration sheet.

A procedure of operations is carried out in accordance with the flowchart shown in FIG. 21C in order to obtain an appropriate angle of irradiation at which a shift of 0.5 pixels will be caused in the Y direction. In this case, certain angles of irradiation are supposed to be θ and −θ. If θ is the right angle to be obtained, then the images obtained in those directions will be two images which shift from each other by one pixel as shown in FIGS. 27 and 28. On the other hand, if θ is not the right angle to be obtained, then images obtained will shift from each other by less than, or greater than, one pixel. Then, subpixel matching is carried out on those images by an arbitrary method such as SSD (Sum of Squared Difference) parabola fitting method, thereby obtaining appropriate θ again. By performing this series of processing steps over and over again, the magnitude of shift between the two images will be substantially equal to one pixel with an error falling within an arbitrary tolerance range, when the angle will be determined.

θ may be any arbitrary appropriate initial value. For example, θ may be the angle used in the previous shooting session or an estimated value obtained by simple calculation.

Embodiment 2

Figure 25:
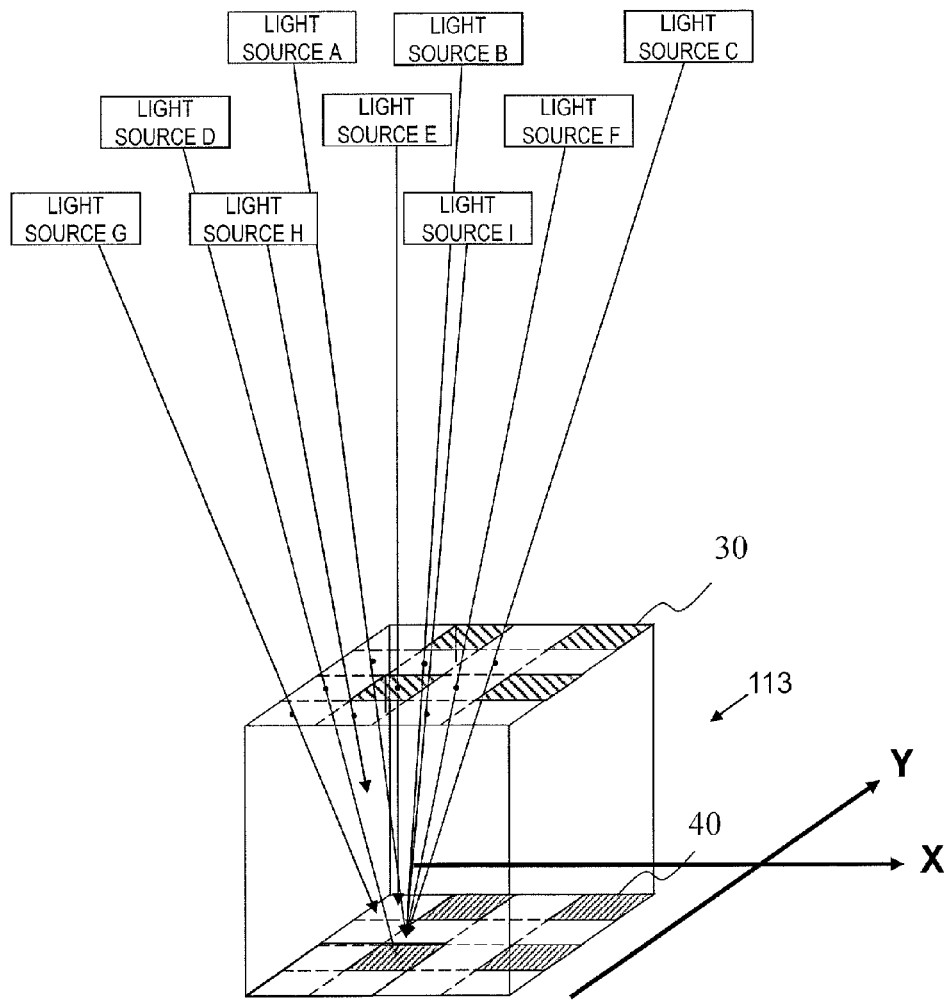
FIG. 25 illustrates an exemplary arrangement of light sources in an image forming apparatus according to a second embodiment of the present disclosure.
Figure 26:
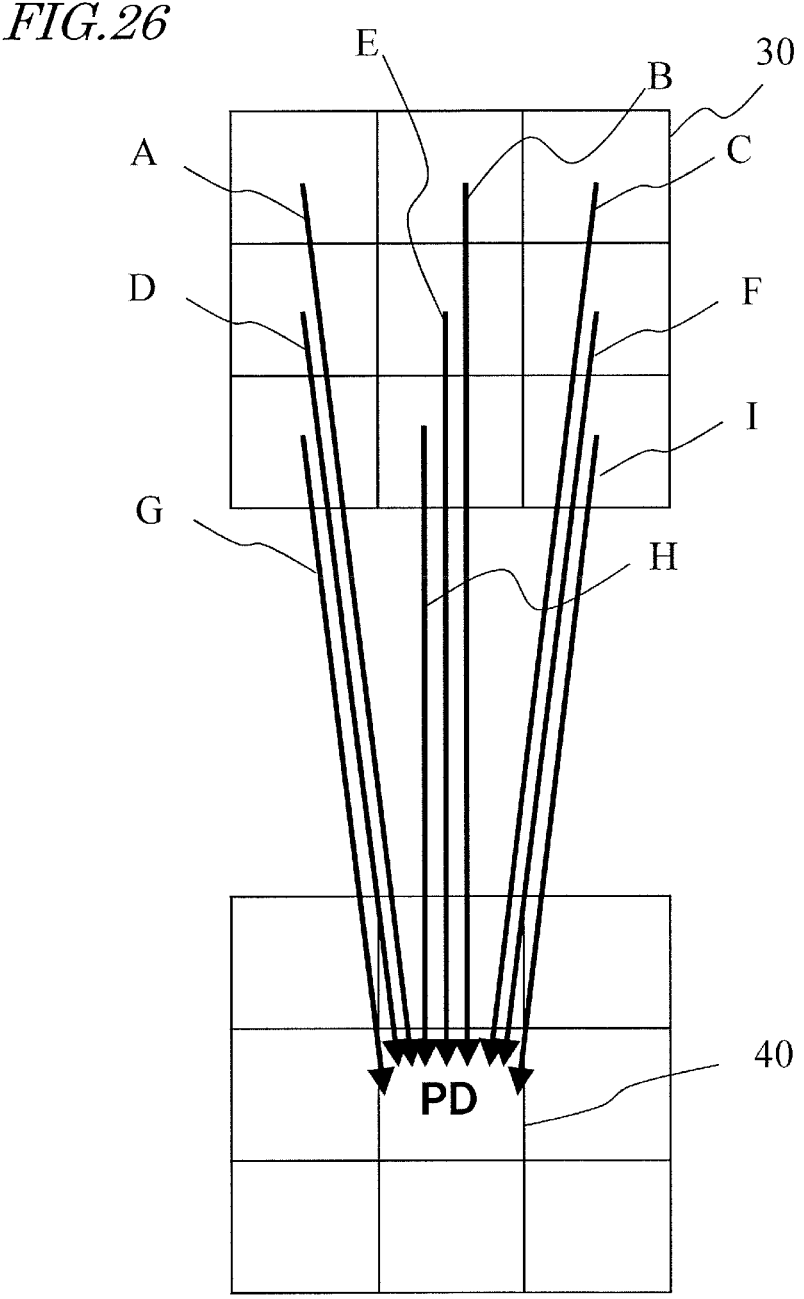
FIG. 26 illustrates an example of the relative positions of light rays incident on an object with respect to photodiodes in an image forming apparatus according to the second embodiment.

A second embodiment of an image forming apparatus according to the present disclosure will be described with reference to FIGS. 25 through 29. In this embodiment, the number of light sources is increased from four to nine as shown in FIGS. 25 and 26. In the other respects, however, the apparatus of this embodiment has the same configuration as the image forming apparatus of the first embodiment described above.

The light source position determining section 123 sequentially turns ON nine light sources A, B, C, D, E, F, G, H, and I one after another, and an image is captured every time one of these light sources is turned ON. By synthesizing together the nine images thus captured, a high-resolution image which has been zoomed in at a zoom power of 2× can be obtained with higher definition.

The images shown in FIGS. 27 and 28 described above are captured and compared to each other. The light source position is determined so that those images shift from each other by one pixel pitch. And the light source position is adjusted in the illumination unit 111. The position of any other light source can also be adjusted in the same way.

Next, it will be described with reference to FIG. 29 how to perform the processing of increasing the definition. According to this embodiment, after this processing gets done, a high-resolution image which has been zoomed in at a zoom power of 2× (and of which the number of pixels has been increased fourfold) can be obtained based on nine images shot.

Figure 29:
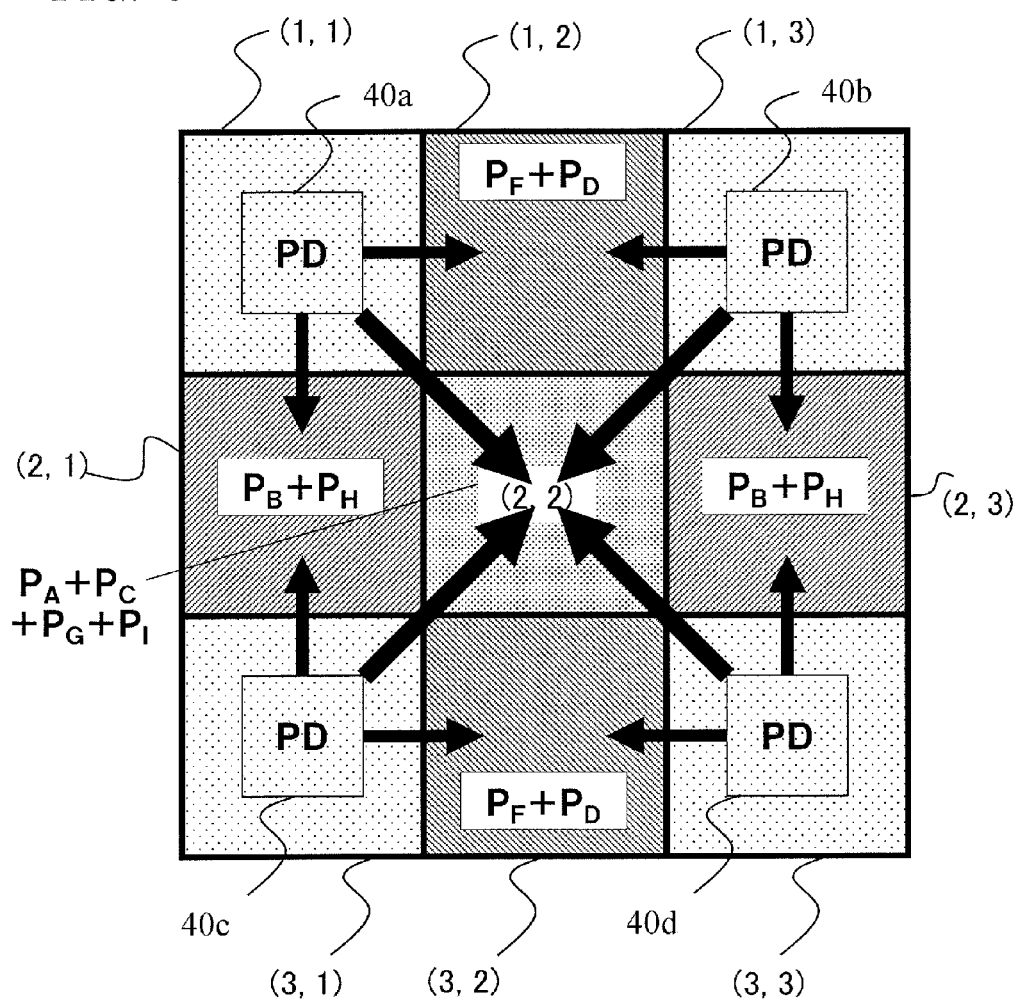
FIG. 29 is a plan view schematically illustrating the relative arrangement of some area of an object put on an image sensor with respect to a portion of the imaging surface located under that area to show how an image forming apparatus according to the second embodiment performs accuracy improvement processing.

FIG. 29 is a plan view schematically illustrating the relative arrangement between some area of the object arranged on the image sensor and a portion of the imaging surface which is located under that area. In FIG. 29, shown are four photodiodes (PDs) 40a, 40b, 40c and 40d. The object's area shown in FIG. 29 is divided into nine regions (1, 1), (1, 2), (1, 3), (2, 1), (2, 2), (2, 3), (3, 1), (3, 2), and (3, 3) which are arranged in three columns and three rows. In this case, a region located at row j, column k position is identified by the reference sign (j, k). In this example, a set of four regions as a whole has the same size as a single pixel, and eventually the resolution can be increased fourfold by the same method as what has already been described for the first embodiment.

When the object is irradiated with an oblique light beam emitted from the light source A shown in FIG. 25, the light ray transmitted through the central region (2, 2) of the object is incident on the photodiode 40d. When the object is irradiated with an oblique light beam emitted from the light source I, the light ray transmitted through the region (2, 2) is incident on the photodiode 40a. When the object is irradiated with an oblique light beam emitted from the light source C, the light ray transmitted through the region (2, 2) is incident on the photodiode 40c. When the object is irradiated with an oblique light beam emitted from the light source G, the light ray transmitted through the region (2, 2) is incident on the photodiode 40b. On the other hand, if the object is irradiated with a light beam emitted from the light source E, for example, the light beam will travel perpendicularly to the imaging surface, and therefore, will be transmitted through the region (2, 2) and then incident on a portion right under the region (2, 2). That is to say, the light beam transmitted through the region (2, 2) will not be incident on any photodiode in that case. In the same way, the light beams emitted from the light sources B, D, F and H will not be incident on any photodiode after having been transmitted through the region (2, 2).

The nine images captured by sequentially turning ON the nine light sources A, B, C, D, E, F, G, H, and I one after another and performing a shooting session every time one of those light sources is turned ON will be identified herein by $P_A$, $P_E$, $P_C$, $P_D$, $P_E$, $P_F$, $P_G$, $P_H$, and $P_I$, respectively. Among these nine images $P_A$ through $P_I$, a single pixel, of which the pixel value mirrors the transmittance of the region (2, 2), will be present in each of the four images $P_A$, $P_C$, $P_G$ and $P_I$. And by averaging these four associated pixel values, more accurate information about the transmittance of the region (2, 2) can be obtained.

In FIG. 29, four bold arrows extended from the four photodiodes (PDs) 40a, 40b, 40c and 40d point toward the central region (2, 2). This means that the pixel value of the region (2, 2) can be determined based on the respective outputs of the four photodiodes (PDs) 40a, 40b, 40c and 40d. For example, if the respective outputs of these four photodiodes (PDs) 40a, 40b, 40c and 40d (obtained from the four images $P_A$, $P_C$, $P_G$ and $P_I$) are added together and if the sum is divided by four, an averaged pixel value can be obtained. However, there is no need to use all of the outputs of the four photodiodes (PDs) 40a, 40b, 40c and 40d to determine the pixel value of the region (2, 2).

Next, it will be described how to get the pixel values of other regions of the object. First, it will be described how to get the pixel values of the regions (1, 2) and (3, 2).

When the object is irradiated with a light beam emitted from the light source D, the light rays transmitted through the regions (1, 2) and (3, 2) are incident on the photodiodes 40b and 40d, respectively. The image captured in such a situation is an image $P_D$. When the object is irradiated with a light beam emitted from the light source F, the light rays transmitted through the regions (1, 2) and (3, 2) are incident on the photodiodes 40a and 40c, respectively. The image captured in such a situation is an image $P_F$. As can be seen, in the two images, there are pixels of which the pixel values mirror the respective transmittances of the regions (1, 2) and (3, 2). And by averaging these two associated pixel values, more accurate information about the transmittances of the regions (1, 2) and (3, 2) can be obtained.

In FIG. 29, two arrows extended from the two photodiodes (PDs) 40a and 40b point toward the region (1, 2), for example. This means that the pixel value of the region (1, 2) can be determined based on the respective outputs of the two photodiodes (PDs) 40a and 40b. For example, if the respective outputs of these two photodiodes (PDs) 40a and 40b are added together and if the sum is divided by two, an averaged pixel value can be obtained. The same can be said about the other region (3, 2), too.

Next, it will be described how to get the pixel values of the regions (2, 1) and (2, 3). Although the light beam travels in a different direction from the light beam incident on the regions (1, 2) and (3, 2), the same can be said about these regions (2, 1) and (2, 3) as about the regions (1, 2) and (3, 2).

When the object is irradiated with a light beam emitted from the light source B, the light rays transmitted through the regions (2, 1) and (2, 3) are incident on the photodiodes 40c and 40d, respectively. When the object is irradiated with a light beam emitted from the light source H, the light rays transmitted through the regions (2, 1) and (2, 3) are incident on the photodiodes 40a and 40b, respectively. As can be seen, in the two images $P_B$ and $P_H$, there are pixels of which the pixel values mirror the respective transmittances of the regions (2, 1) and (2, 3). And by averaging these associated pixel values, more accurate information about the transmittances of the regions (2, 1) and (2, 3) can be obtained.

Optionally, an image forming apparatus according to the present disclosure may include an illumination system with a tilting mechanism which tilts the object and the image sensor together. In that case, even if the light source position is fixed, the light source direction with respect to the object can also be changed by getting the object and the image sensor rotated by the tilting mechanism. Such an illumination system can get the object and the image sensor tilted together and can sequentially irradiate the object with illuminating light beams coming from multiple different light source directions with respect to the object.

Modified Example

Figure 30:
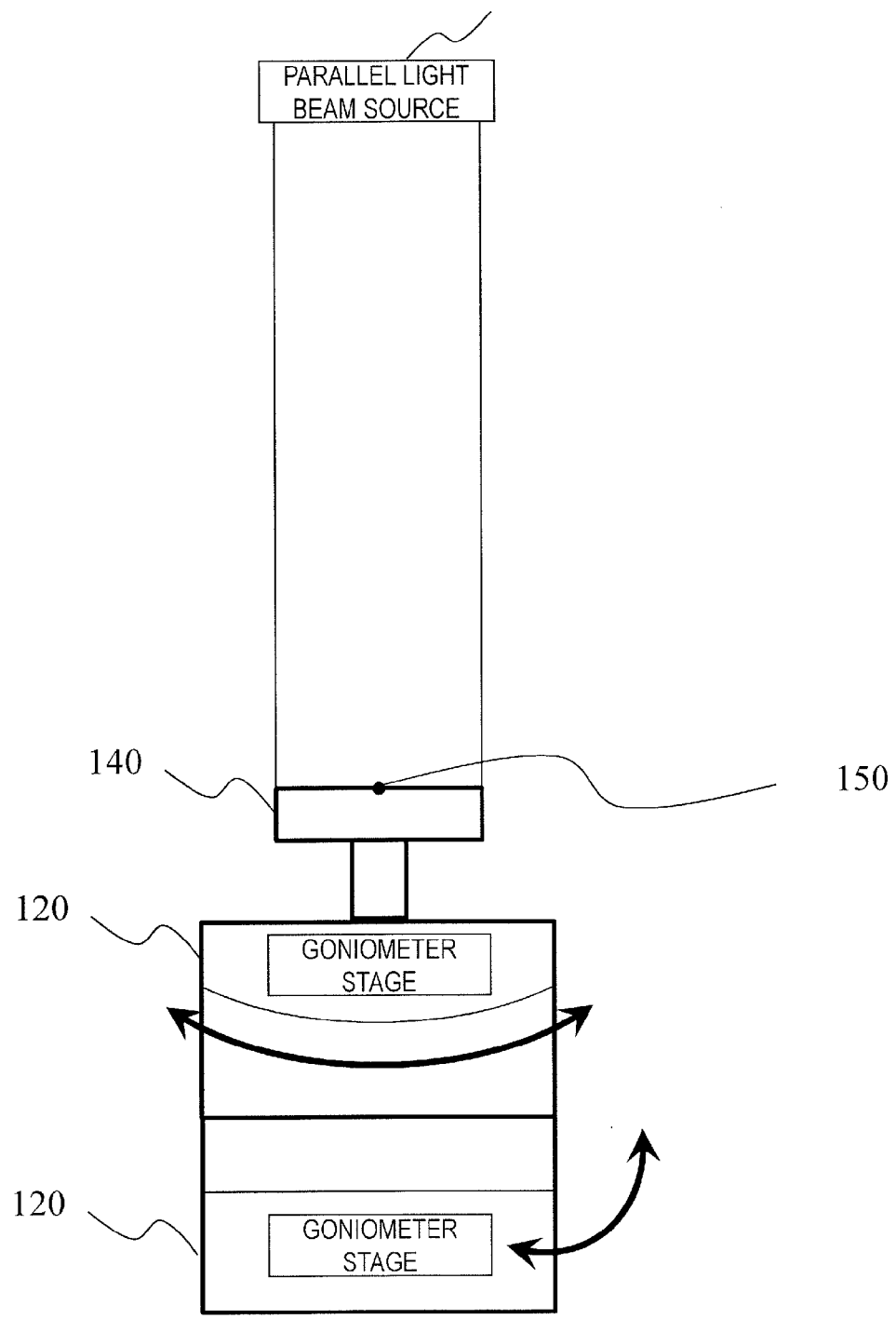
FIG. 30 illustrates a modified example with a holder which holds an object of shooting and an image sensor in an attachable and removable state.
Figure 31:
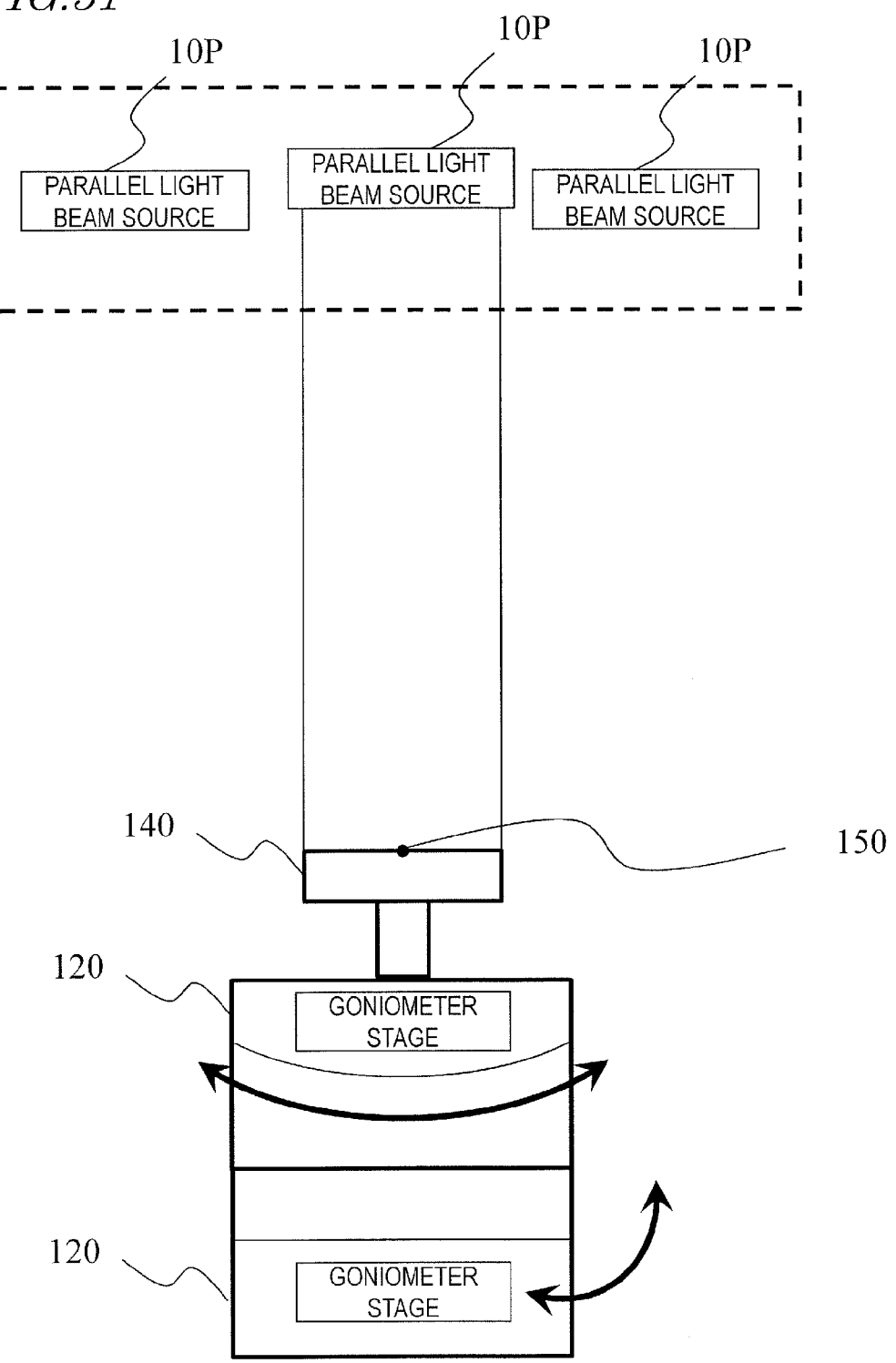
FIG. 31 illustrates another modified example with a holder which holds an object of shooting and an image sensor in an attachable and removable state.

FIG. 30 schematically illustrates a configuration for a modified example including a holder which holds the object and image sensor (which will be hereinafter referred to as an "object of shooting 140") in an attachable and removable state. The object of shooting 140 can be a prepared specimen in which the object and image sensor are combined together. In this example, an angle of illumination adjusting section has a mechanism which changes the orientation of the object of shooting 140. This mechanism includes two gonio systems 120 which can rotate the object within a perpendicular planes that intersect at right angles. The center of rotation 150 of the gonio systems 120 is located at the center of the object in the object of shooting 140. In this modified example, the gonio system 120 can change the irradiation direction of the illuminating light, and therefore, the light source 10P may be fixed. Also, in this modified example, the light source 10P is configured to emit a parallel light beam. Alternatively, the image forming apparatus of this modified example may include a plurality of parallel light beam sources 10P as shown in FIG. 31.

In this case, the configuration in which the light source 10P is fixed and the object of shooting 140 is moved is advantageous than the configuration in which the object of shooting 140 is fixed and the light source 10P is moved, because the former configuration contributes to getting the shooting session done in a shorter time. This is also because the distance L1 from the object of shooting 140 to the light source 10P is so much longer than the interval L2 between the object and the image sensor that form the object of shooting 140 that the light source 10p should be significantly moved proportionally to the long distance according to the latter configuration. By getting the shooting session done in a shorter time, even if the object changes with time on a second basis (e.g., even if the object is luminescence from a biological sample), an appropriate image can also be shot.

Figure 32:
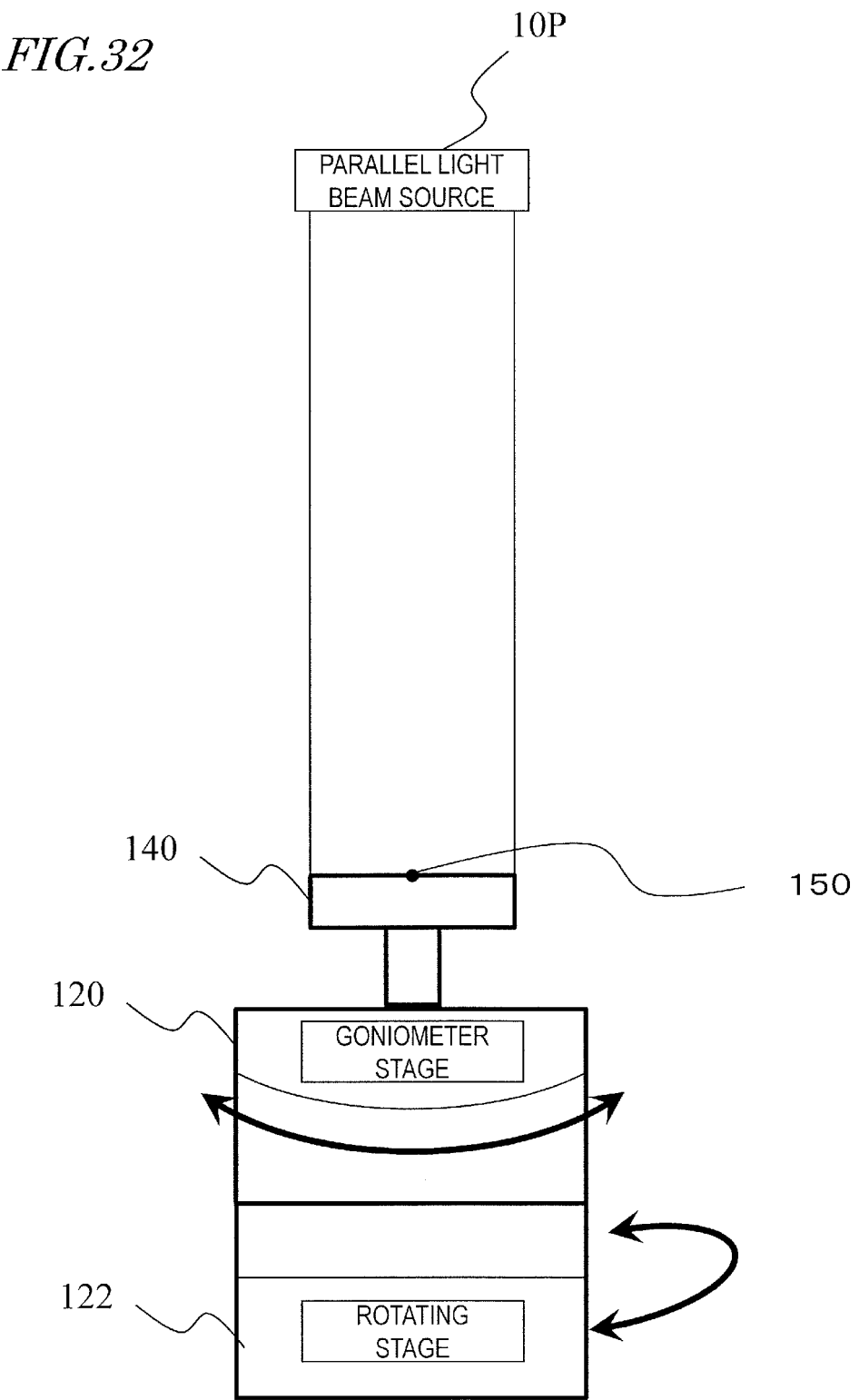
FIG. 32 illustrates still another modified example with a holder which holds an object of shooting and an image sensor in an attachable and removable state.

FIG. 32 illustrates a configuration for a modified example in which a mechanism for changing the object's orientation includes a gonio system 120 and a rotating mechanism 122. By combining the rotation of the object of shooting 140 which is caused by the gonio system 120 within a perpendicular plane with the rotation of the object of shooting 140 which is caused by the rotating mechanism 122 around a perpendicular axis, the object of shooting 140 can be irradiated with an illuminating light beam coming from any arbitrary irradiation direction. A point 150 is located at the center of rotation of the gonio system 120 and at the center of rotation of the rotating mechanism 122.

Figure 33:
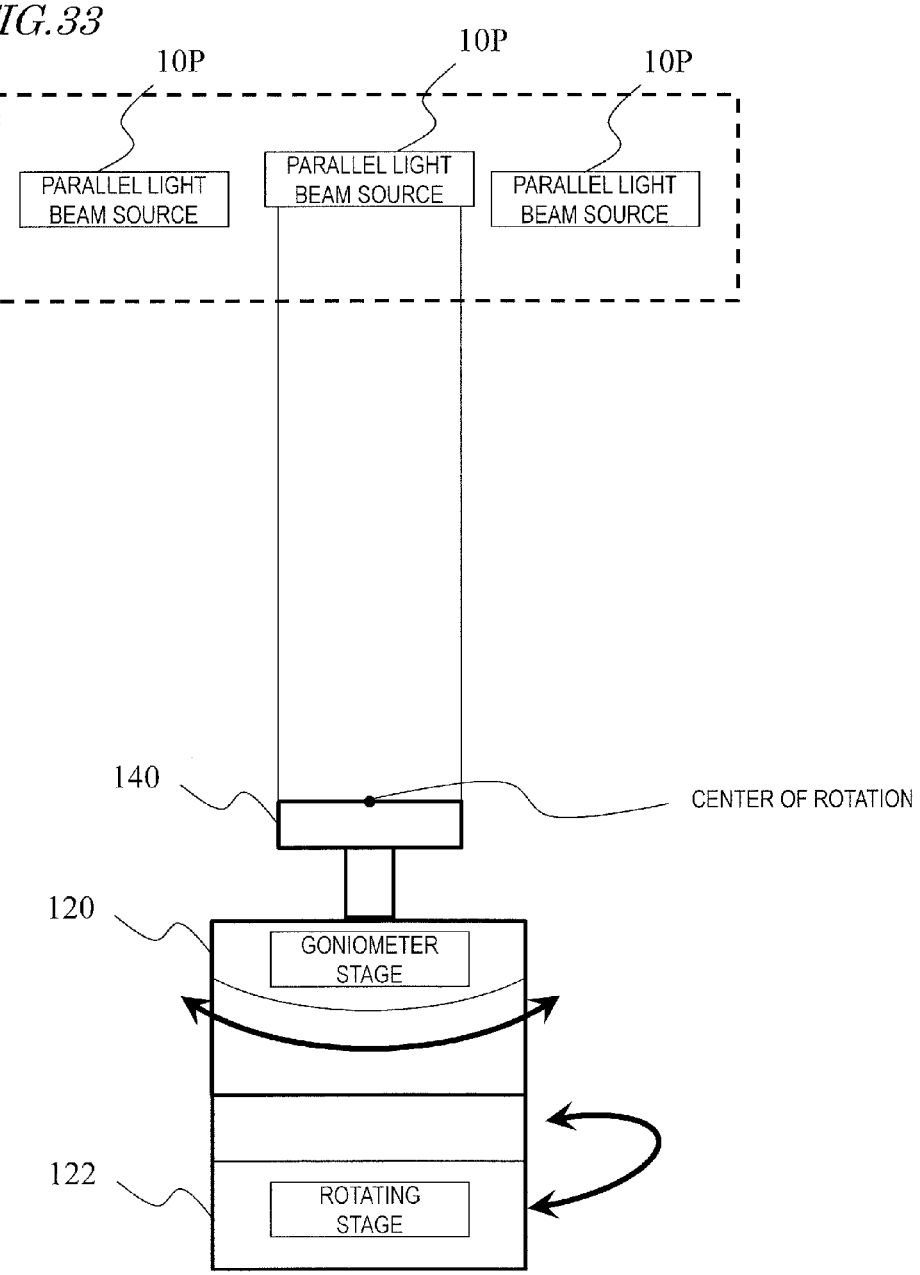
FIG. 33 illustrates yet another modified example with a holder which holds an object of shooting and an image sensor in an attachable and removable state.

Alternatively, the image forming apparatus of this modified example may include a plurality of parallel light beam sources 10p as shown in FIG. 33.

Figure 34:
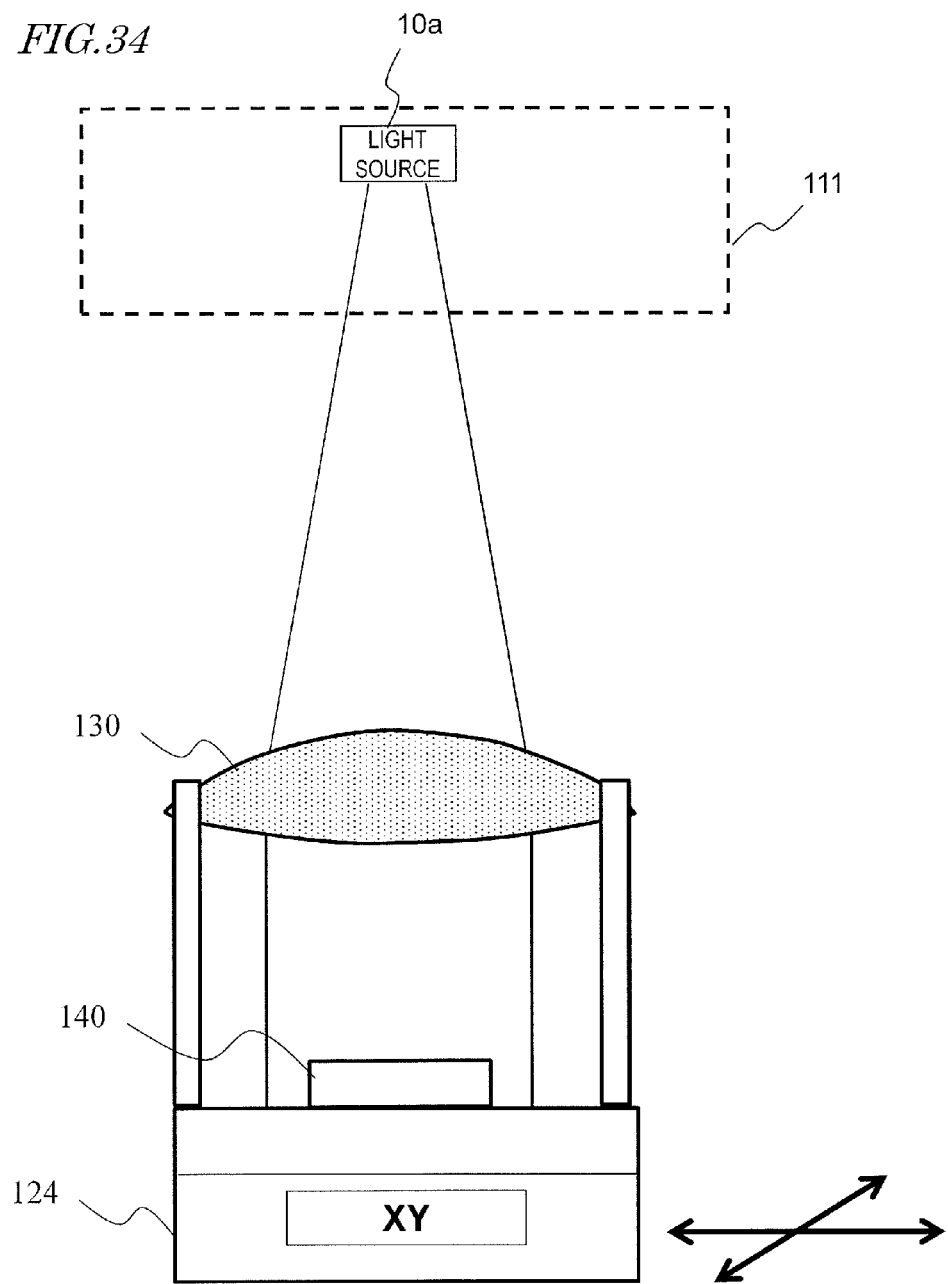
FIG. 34 illustrates yet another modified example with a holder which holds an object of shooting and an image sensor in an attachable and removable state.

FIG. 34 illustrates an exemplary optical system which can increase the degree of parallelism of the light emitted from a light source and can make a parallel light beam incident on the object. In this example, a lens 130 which collimates divergent light emitted from the light source is provided for an XY moving mechanism (moving stage) 124. Along with the moving stage 124, the object of shooting 140 can be moved by an arbitrary distance along the X axis and/or the Y axis within a horizontal plane.

Figure 35:
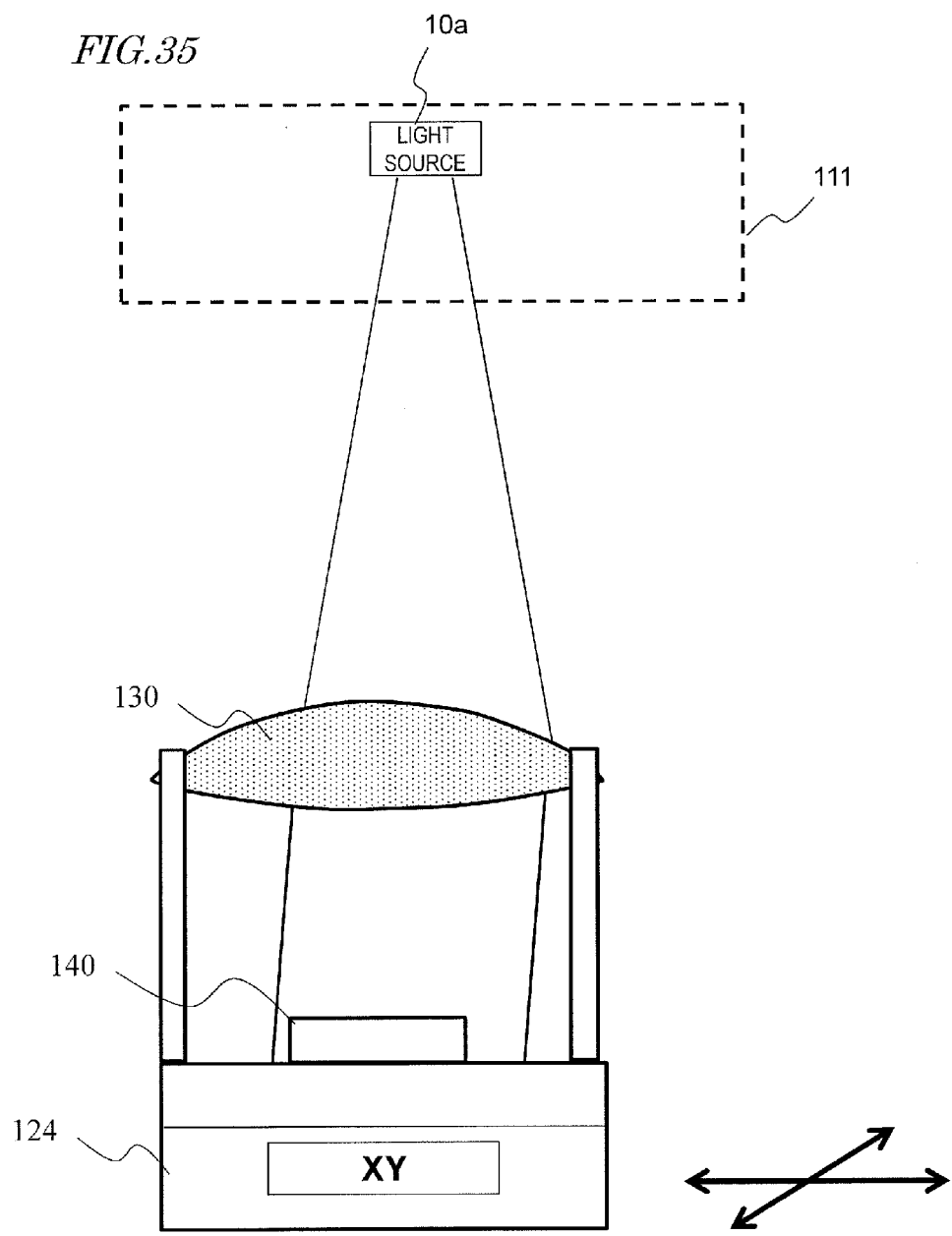
FIG. 35 illustrates yet another modified example with a holder which holds an object of shooting and an image sensor in an attachable and removable state.
Figure 36:
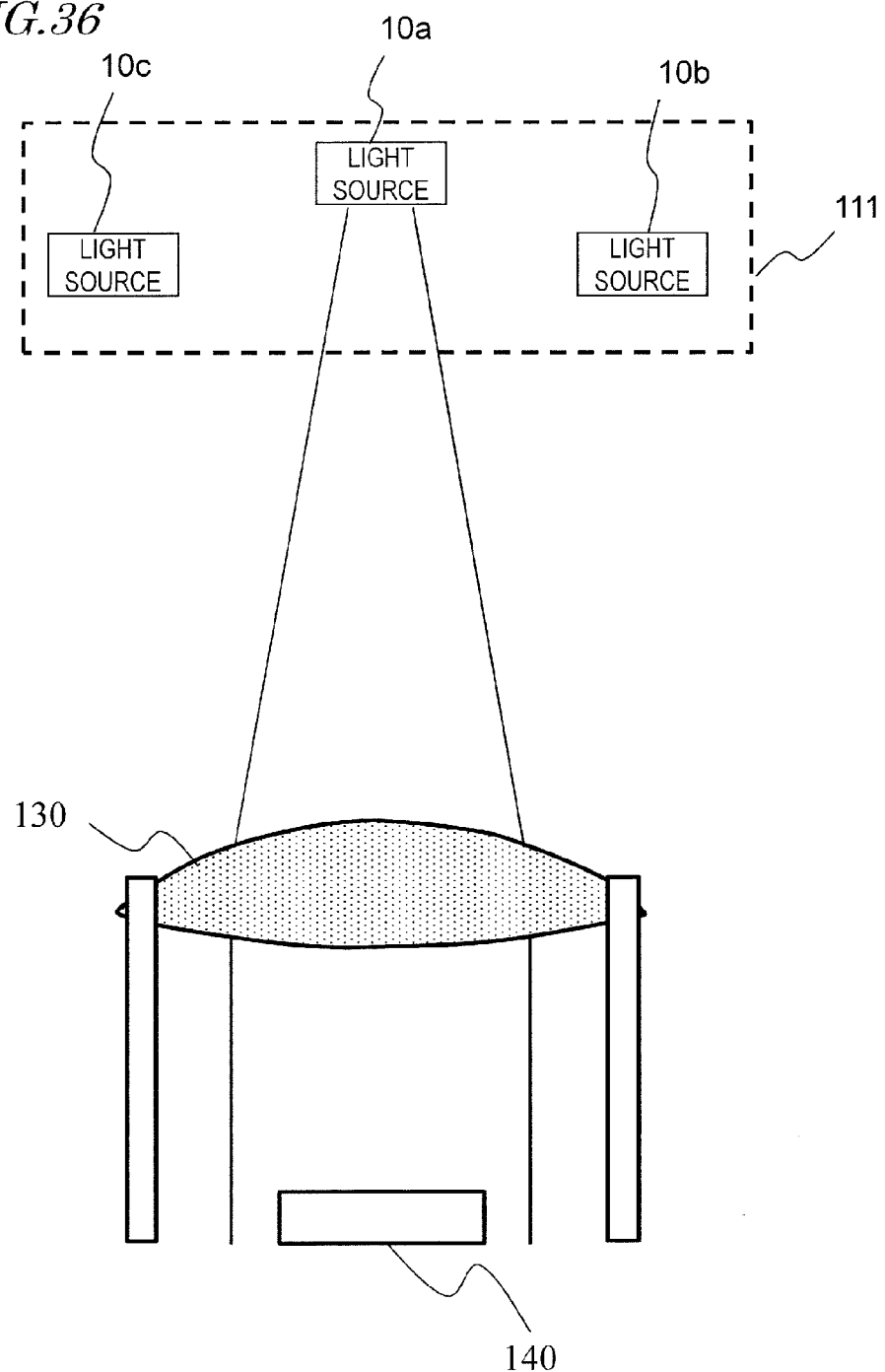
FIG. 36 illustrates yet another modified example with a holder which holds an object of shooting and an image sensor in an attachable and removable state.
Figure 37:
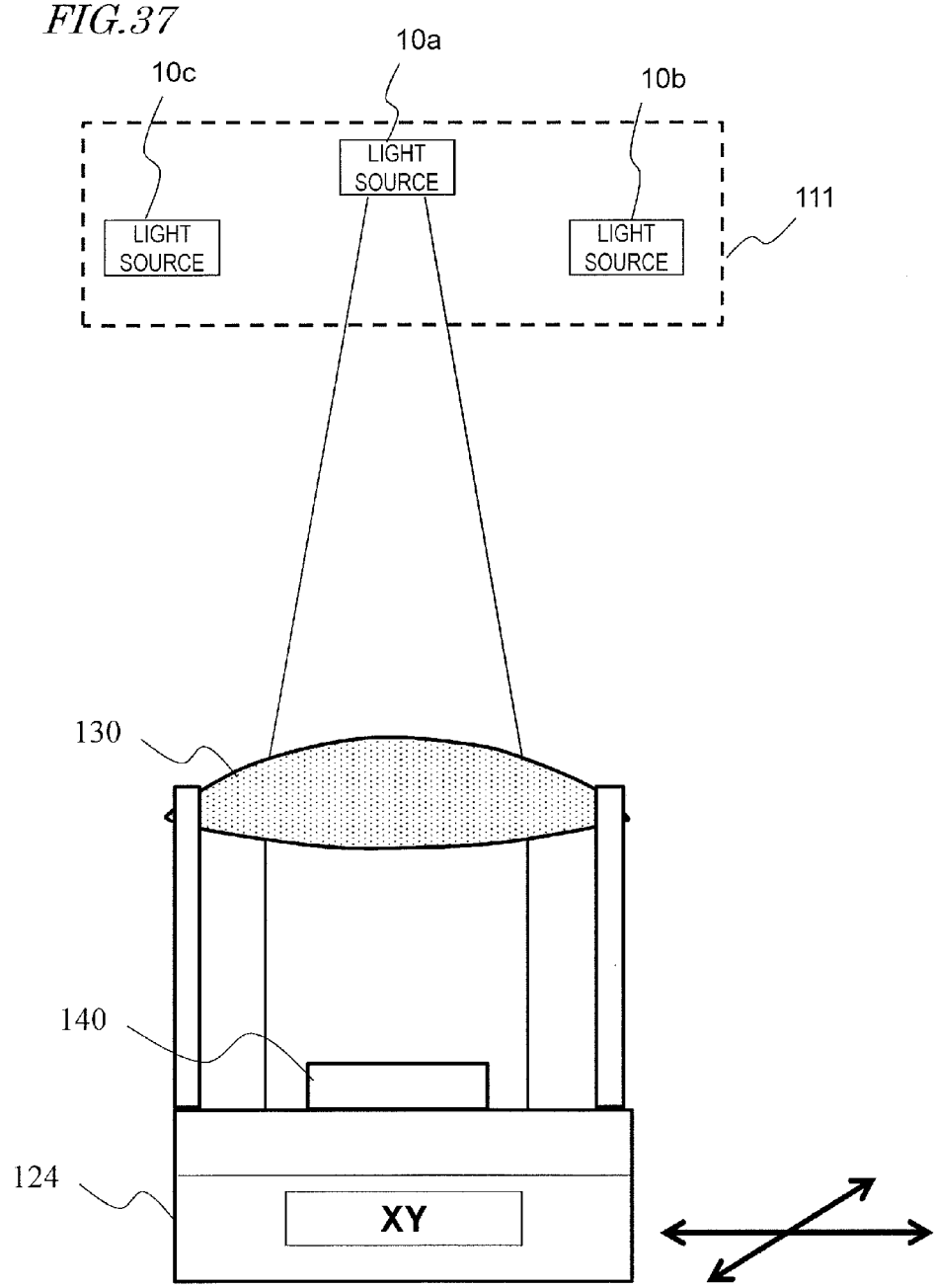
FIG. 37 illustrates yet another modified example with a holder which holds an object of shooting and an image sensor in an attachable and removable state.
Figure 38:
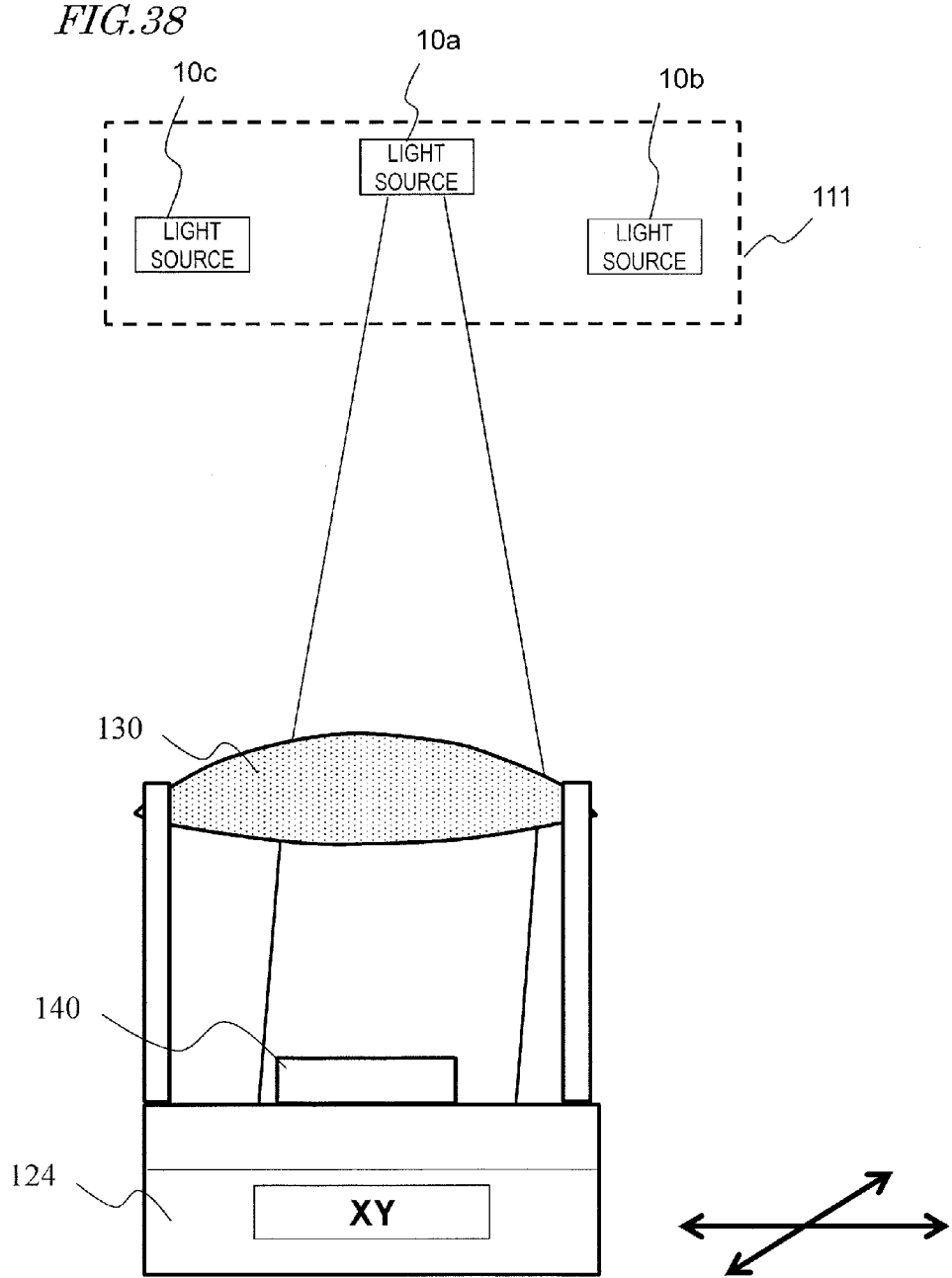
FIG. 38 illustrates yet another modified example with a holder which holds an object of shooting and an image sensor in an attachable and removable state.
Figure 39:
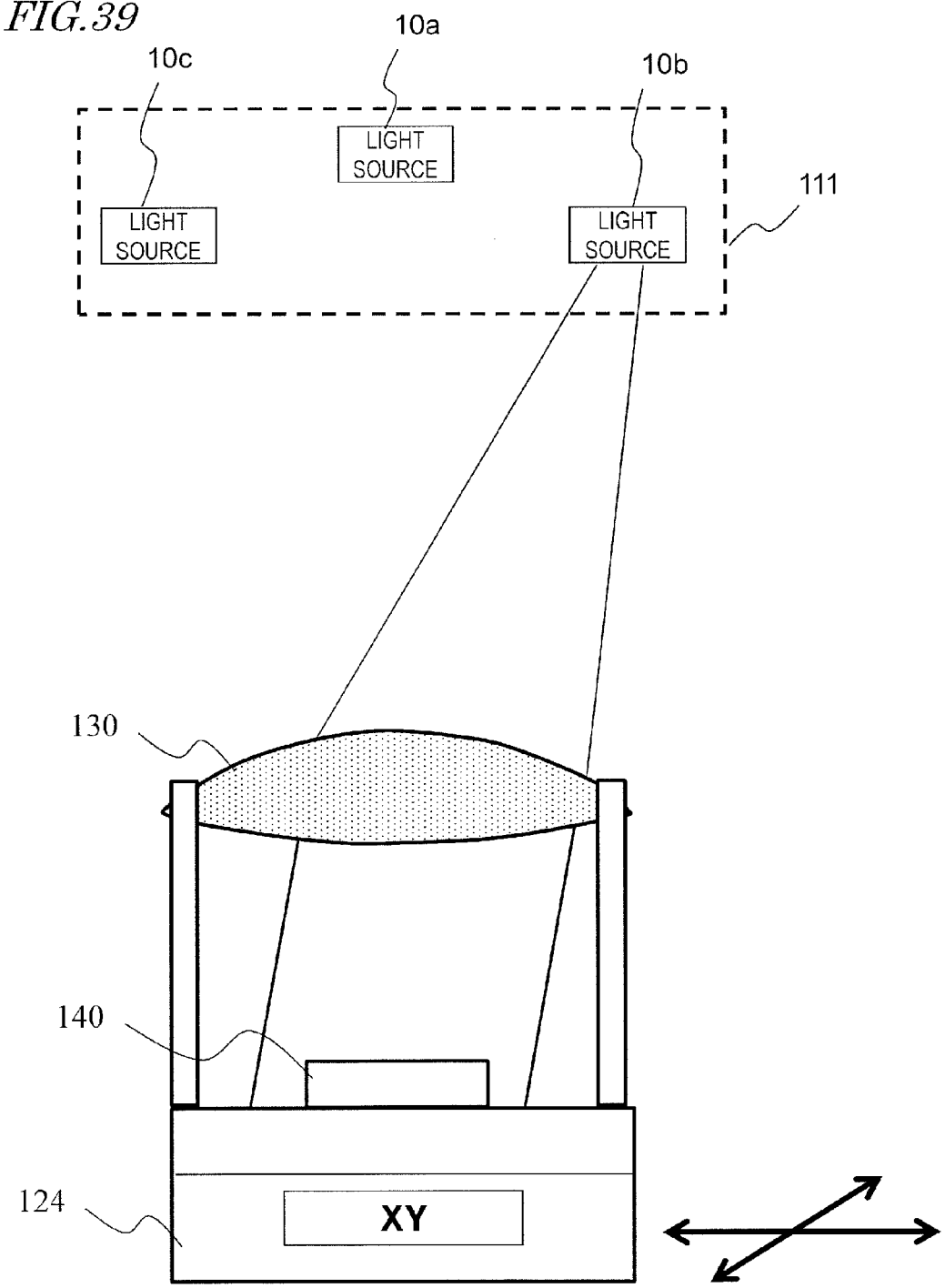
FIG. 39 illustrates yet another modified example with a holder which holds an object of shooting and an image sensor in an attachable and removable state.
Figure 40:
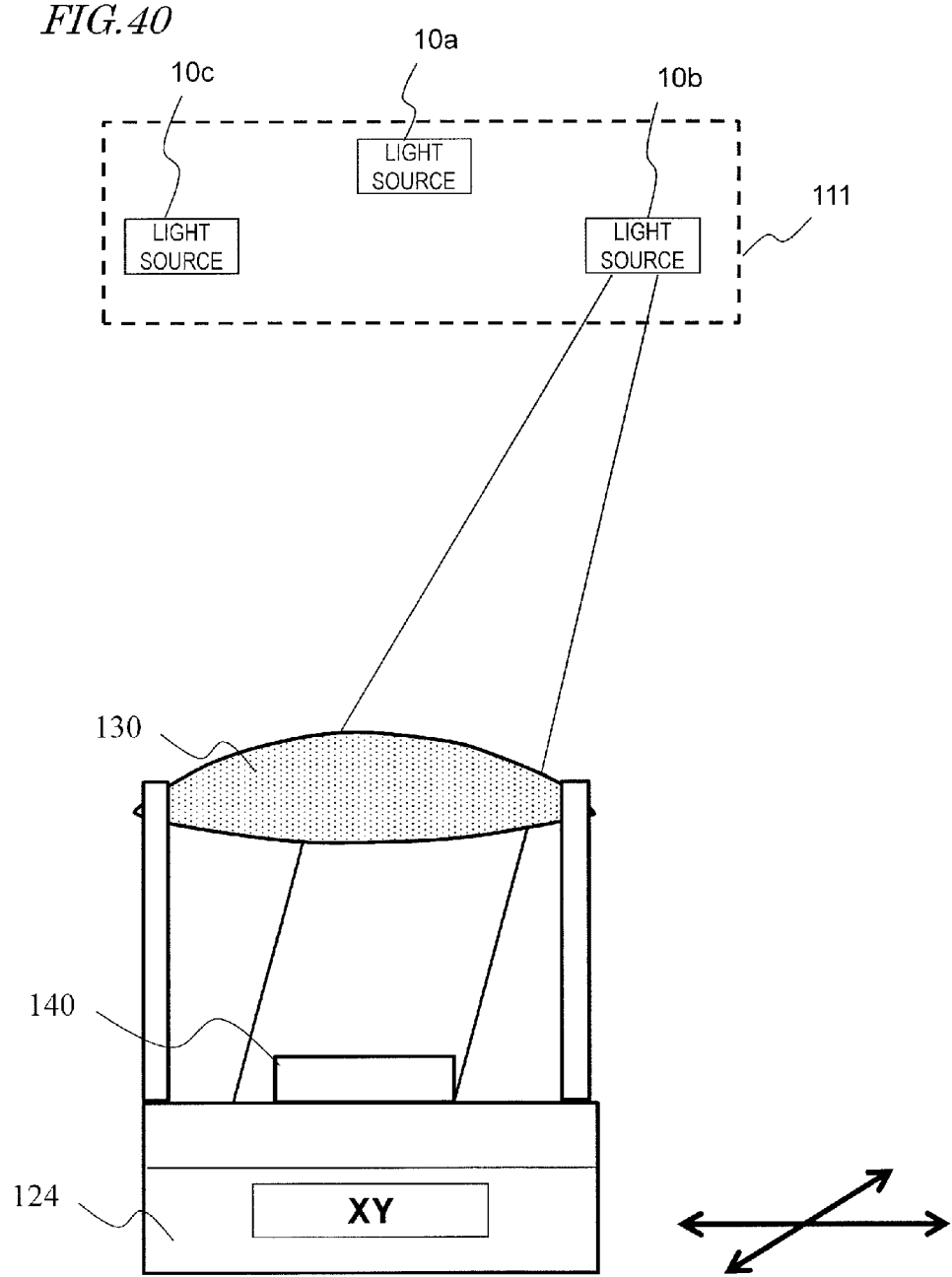
FIG. 40 illustrates yet another modified example with a holder which holds an object of shooting and an image sensor in an attachable and removable state.

FIG. 35 illustrates how an illuminating light beam is incident obliquely onto the object of shooting 140 which has moved a predetermined distance in a specified direction within a horizontal plane. Even if the position of the light source 10a is fixed, the irradiation direction of the illuminating light beam can also be controlled by adjusting the position of the object of shooting 140. Alternatively, the image forming apparatus of this modified example may include a plurality of light sources as shown in FIG. 36. If a plurality of light sources 10a, 10b and 10c are provided as shown in FIG. 36, then the mechanism to move the object of shooting 140 may be omitted or an XY moving mechanism (moving stage) 124 may be provided as shown in FIG. 37. By changing the position of the light source 10a, 10b, 10c to turn ON and/or the position of the object of shooting 140 as shown in FIGS. 38, 39 and 40, an illuminating light beam can be made incident on the object of shooting 140 at any intended angle of incidence.

Figure 41:
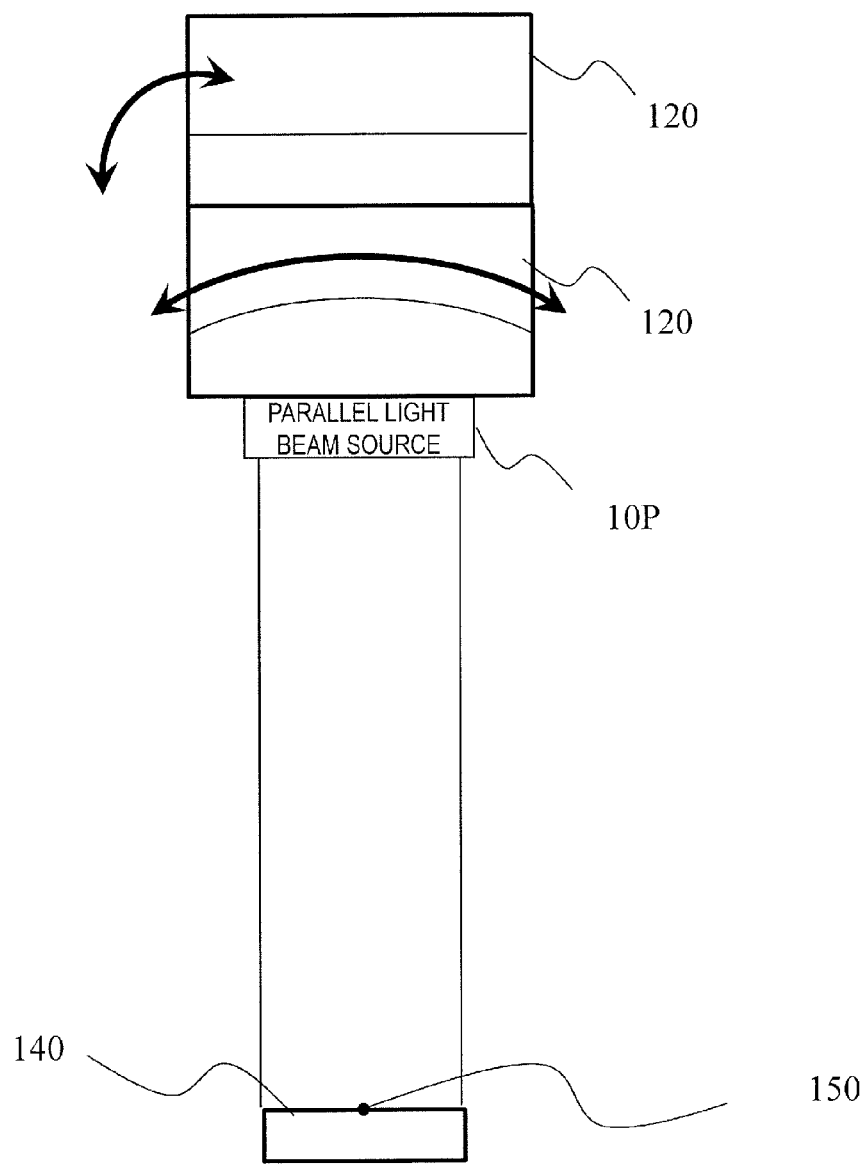
FIG. 41 illustrates yet another modified example with a holder which holds an object of shooting and an image sensor in an attachable and removable state.
Figure 42:
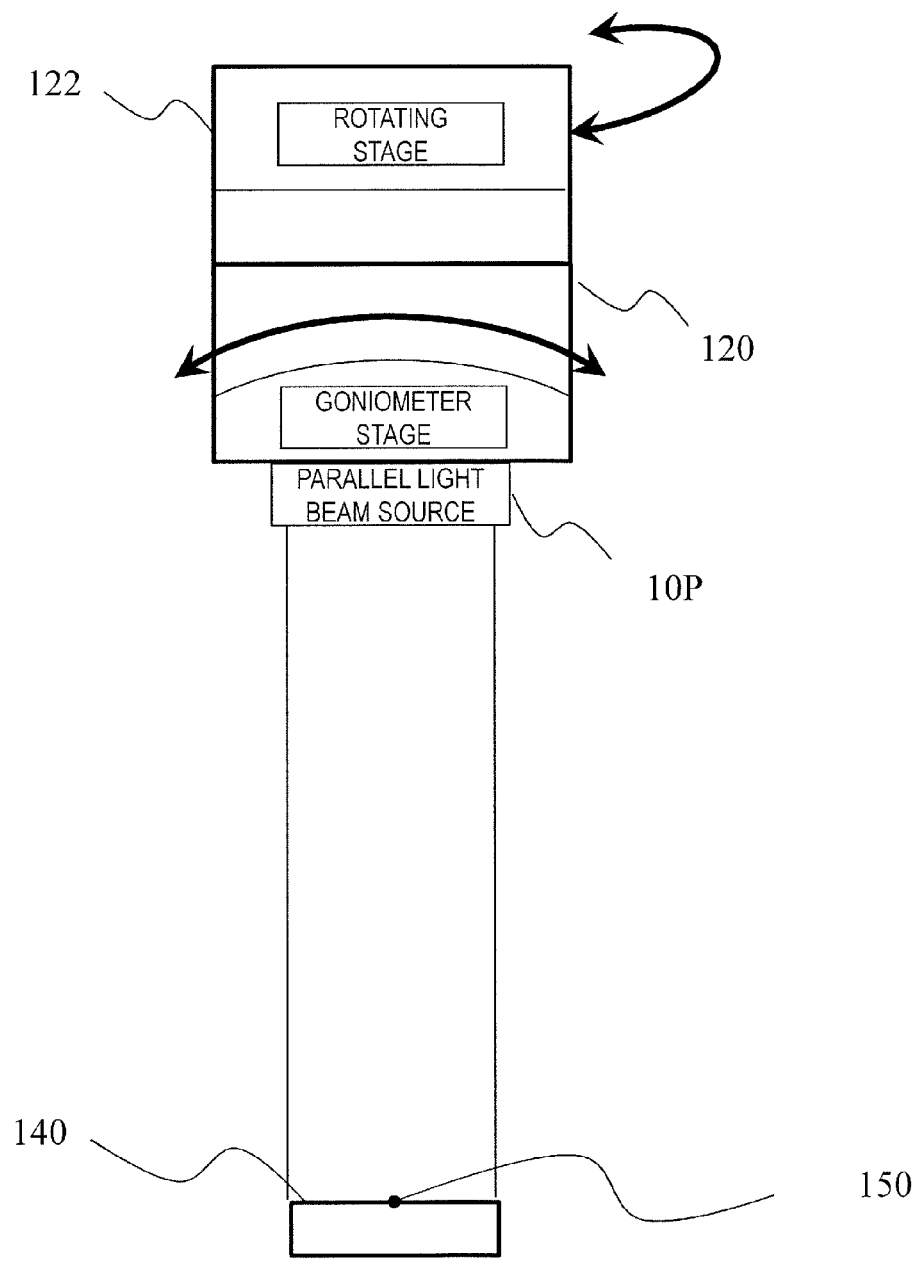
FIG. 42 illustrates yet another modified example with a holder which holds an object of shooting and an image sensor in an attachable and removable state.

FIG. 41 illustrates schematically a configuration for a modified example in which two gonio systems 120 support a parallel light beam source 10P. FIG. 42 illustrates schematically a configuration for a modified example in which a gonio system 120 and a rotating mechanism 122 support a parallel light beam source 10P.

In these modified examples, either a light source which emits a parallel light beam or an optical system which increases the degree of parallelism of the light emitted from a light source is used. However, these are just examples of embodiments of the present disclosure. As described above, if the distance from the light source to the object is sufficiently long, light which can be regarded as a substantially parallel light beam will be incident on the object.

If a light source which irradiates the object with light and of which the orientation and position are fixed is used and if a tilting mechanism which tilts the object at multiple tilt angles is provided, an image sensor which is arranged at a position where the light that has been transmitted through the object is incident and the object can get tilted together by the tilting mechanism, and a plurality of images can be captured at the multiple tilt angles.

According to an exemplary aspect of the present disclosure, a specimen management apparatus includes a sample image capture device and an information processing device. The sample image capture device includes a sample supporting portion on which a pathological sample is put and an image sensor configured to capture an image of the pathological sample at a specified one of multiple resolutions (or zoom powers). The information processing device is configured to obtain a feature quantity of the image captured by the sample image capture device and output patient information of the pathological sample to a display device based on the feature quantity. In detail, the information processing device searches a database in which the feature quantity calculated based on the sample image of a patient is associated with information about the patient for patient information that matches the feature quantity of that image. If the database includes multiple sets of patient information that match the feature quantity of the image, a high-resolution image having a higher resolution than that of the image is gotten and the database is searched for a set of patient information that matches the feature quantity of the high-resolution image. In this case, a set of patient information includes at least one of the patient's name, the name of his or her disease, findings, information about other inspections, and clinical information.

The sample image capture device which may be used in a specimen management apparatus according to the present disclosure can capture a plurality of images of a pathological sample put on its sample supporting portion at multiple different resolutions (or zoom powers). An example of such a sample image capture device is a device configured to irradiate a pathological sample put on an image sensor with illuminating light and capture a digital image based on the light transmitted through the pathological sample. With such a device, there is no need to arrange any objective lens for imaging between the image sensor and the pathological sample, and a plurality of images can be captured with the image sensor and pathological sample arranged close to each other. As a result, images, of which the resolutions are comparable to a microscope's, can be captured based on the arrangement of fine pixels that the image sensor has. The resolution of the image to be captured can be changed by getting binning processing done by the image sensor. Alternatively, as will be described in detail later, multiple low-resolution images may be captured with the direction of an illuminating light beam entering the pathological sample changed, and the resolution may be enhanced through image processing.

The information processing device may be a general-purpose computer in which a program according to the present disclosure is installed. A typical example of such an information processing device includes a processor and a memory, and operates in accordance with an instruction defined by a program stored in the memory. As a result, the device including the processor and the memory can function as a whole as a device including respective functional blocks to be described later. Those functional blocks that the information processing device of the present disclosure has may be implemented as either a piece of dedicated hardware or a combination of hardware and software.

The database in which the feature quantity calculated based on the sample images of a patient is associated with information about the patient may be provided in a storage device that the information processing device has or provided for data storage or a data server which may be connected to the information processing device over a digital network. As the feature quantity of the image, any of various known feature quantities may be selected. And the patient information may be searched for by a known matching technique.

A third embodiment of the present disclosure will now be described with reference to the accompanying drawings.

Embodiment 3

Figure 43:
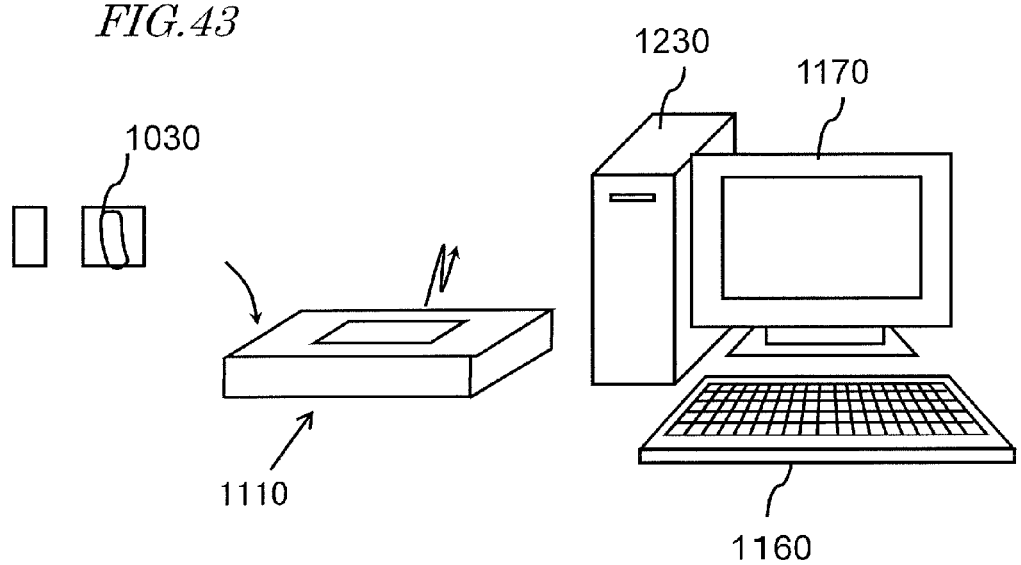
FIG. 43 illustrates an exemplary overall configuration for a specimen management apparatus according to a third embodiment of the present disclosure.

FIG. 43 illustrates an exemplary overall configuration for a specimen management apparatus according to a third embodiment.

Figure 44:
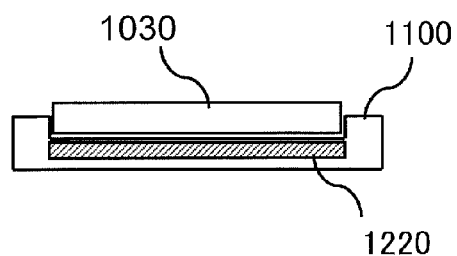
FIG. 44 is a cross-sectional view of an exemplary sample image capture device according to the third embodiment of the present disclosure.

The specimen management apparatus shown in FIG. 43 includes a sample image capture device 1110 and an information processing device 1230. As shown in FIG. 44, the sample image capture device 1110 includes a sample supporting portion 1100 on which a pathological sample 1030 is put and an image sensor 1220 which captures an image of the pathological sample 1030 at a specified one of multiple resolutions (or zoom powers). The image sensor 1220 may be a two-dimensional image sensor in which a huge number of photoelectric conversion sections are arranged in columns and rows on the imaging surface. The photoelectric conversion sections are typically photodiodes which have been formed in a semiconductor layer or on a semiconductor substrate, and create electric charge based on the incoming light received. The resolution of the two-dimensional image sensor depends on the arrangement pitch or arrangement density of photoelectric conversion sections on the imaging surface. The arrangement pitch of the respective photoelectric conversion sections is almost as short as the wavelength of visible radiation. The image sensor 1220 is typically a CCD (Charge-Coupled Device) image sensor or an MOS (Metal Oxide Semiconductor) image sensor, for example.

The information processing device 1230 is configured to obtain a feature quantity of the image captured by the sample image capture device 1110 and output patient information of the pathological sample 1030 to a display device 1170 based on the feature quantity. In detail, the information processing device 1230 searches a database in which the feature quantity calculated based on the sample image of a patient is associated with information about the patient for a set of patient information that matches the feature quantity of the image of the pathological sample 1030.

The information processing device 1230 is connected to an input device 1160 and the output device 1170. The input device 1160 allows the user to enter data or an instruction into this information processing device 1230. Examples of the input device 1160 include a keyboard, a mouse and a touch-screen. The output device 1170 may be a display which can display an image and characters, printer or loudspeaker. Alternatively, the input device 1160 and output device 1170 may be a device in which a touchscreen and a display device are integrated together.

If the database includes a set of patient information that matches the feature quantity of the image, the information processing device 1230 outputs that set of patient information to the output device 1170. On the other hand, if the database includes multiple sets of patient information that match the feature quantity of the image, then the image processing device 1230 gets a high-resolution image having a higher resolution than that of the image and then searches the database for a set of patient information that matches the feature quantity of the high-resolution image. However, if the database does not include any set of patient information that matches the feature quantity of the image, then the information processing device 1230 receives a set of patient information through the input device 1160 and stores the feature quantity calculated based on the image and the patient information in the database in association with each other. In this case, the sample image capture device 1110 gets a high-resolution image having a higher resolution than the an image that has been captured first, and the information processing device 1230 stores the feature quantities calculated based on the respective images captured and the sets of patient information in the database in association with each other.

Figure 45:
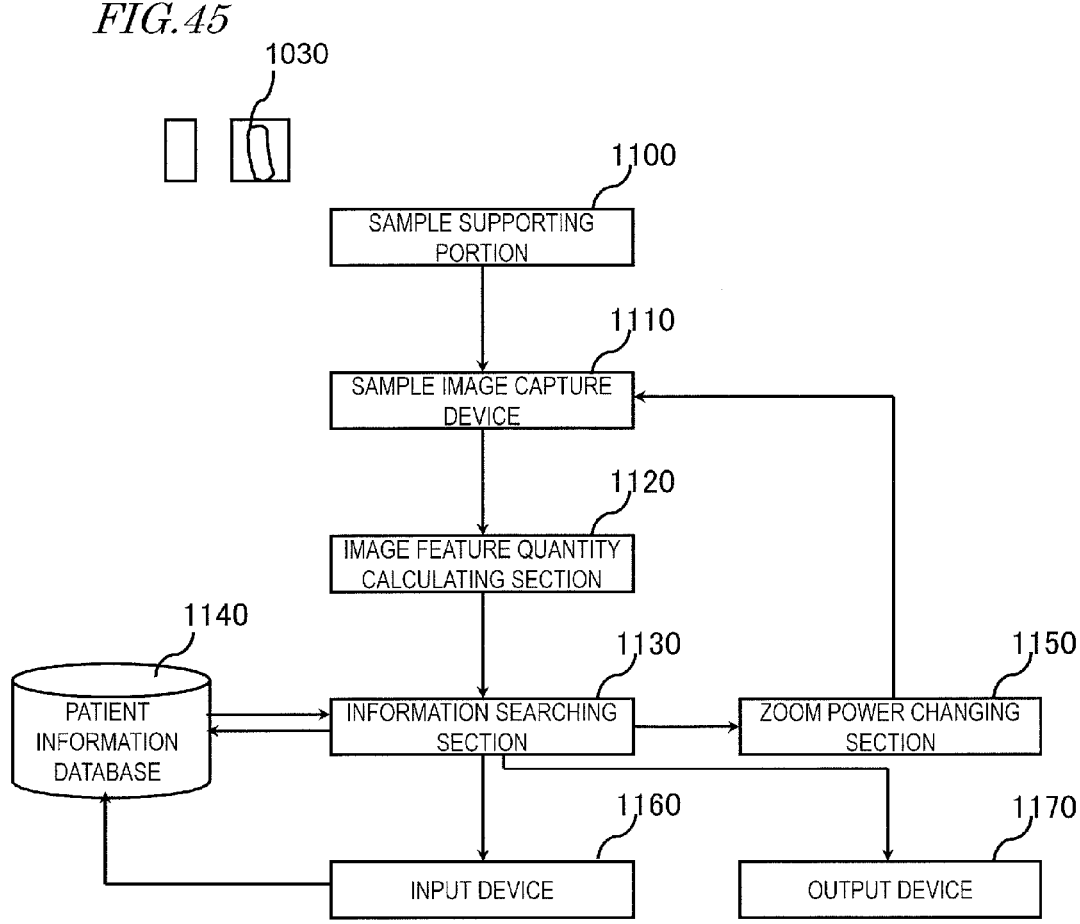
FIG. 45 is a block diagram showing an exemplary configuration for a specimen management apparatus according to the third embodiment of the present disclosure.

FIG. 45 is a block diagram showing an exemplary configuration for a specimen management apparatus according to the third embodiment of the present disclosure. As shown in FIG. 45, the specimen management apparatus of this embodiment includes the sample supporting portion 1100, the sample image capture device 1110, an image feature quantity calculating section 1120, an information searching section 1130, a patient information database (which will be hereinafter simply referred to as a "database") 1140, a zoom power changing section 1150, the input device 1160 and the output device 1170.

A pathological sample 1030, for which patient information needs to be obtained or updated, is put on the sample supporting portion 1100. The pathological sample 1030 may be a general slide which is used to make a pathological inspection, for example.

The sample image capture device 1110 captures an image of the pathological sample 1030 put on the sample supporting portion 1100 at one of multiple different zoom powers which have been set in advance. The image feature quantity calculating section 1120 calculates an image feature quantity based on the sample image that has been captured by the sample image capture device 1110. The information searching section 1130 searches the database 1140 in which sets of patient information and image feature quantities are stored in association with each other for any set of patient information that matches the image feature quantity that has been calculated by the image feature quantity calculating section 1120. If multiple matching results have been found by the information searching section 1130, the zoom power changing section 1150 changes the zoom power to capture images into a higher one (i.e., changes the resolution into a higher one), gets another image captured by the sample image capture device 1110, and then searches samples at the higher zoom power.

If no set of patient information that matches the image feature quantity has been found by the information searching section 1130, then the input device 1160 accepts entry of patient information as a sample of a new patient. On the other hand, if any set of patient information that matches the image feature quantity has been found by the information searching section 1130, the output device 1170 outputs the patient information that has been found.

The operations and configurations of respective sections according to this embodiment of the present disclosure will now be described in further detail.

<Operation of Specimen Management Apparatus>

Figure 46:
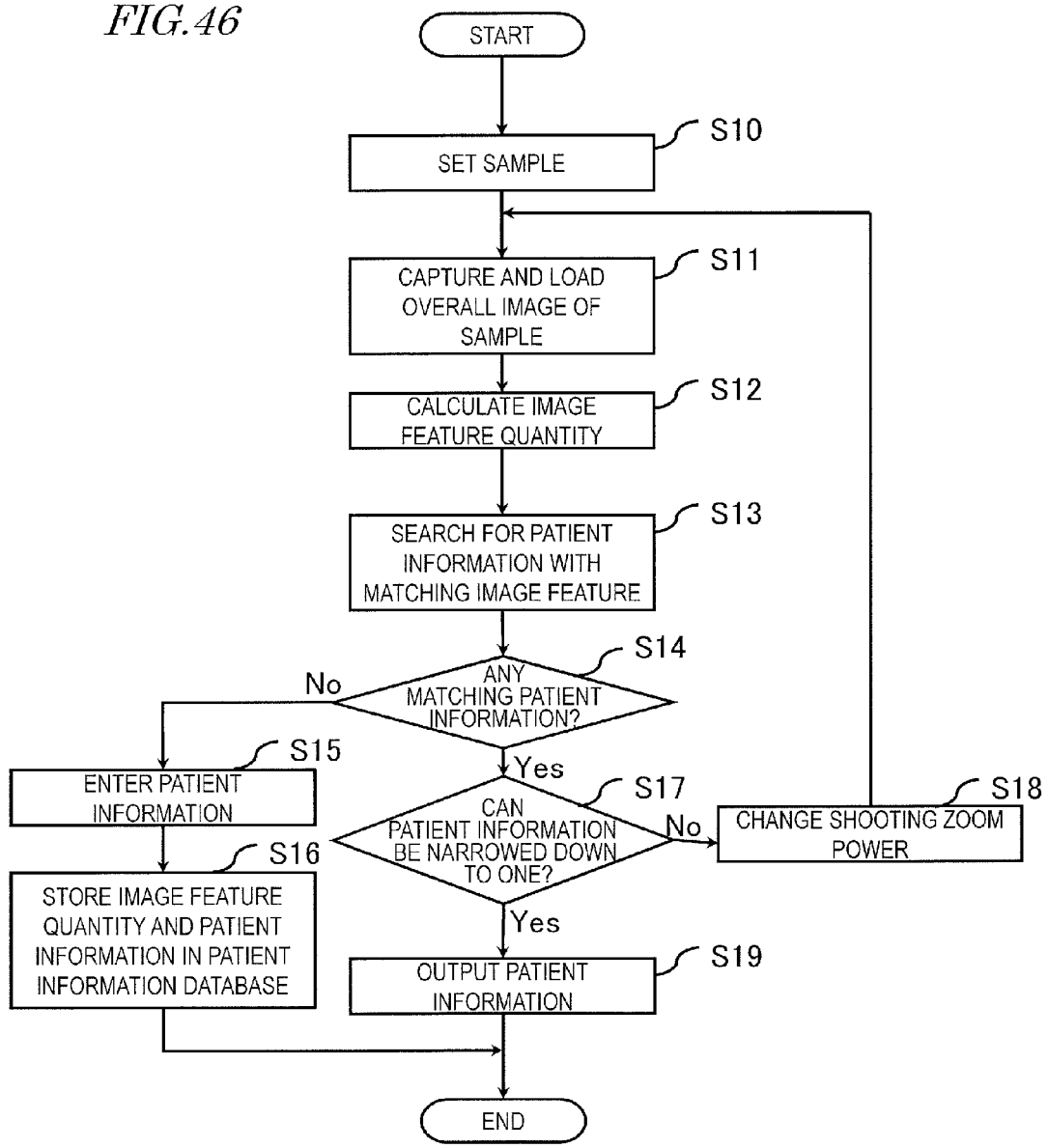
FIG. 46 is a flowchart showing an exemplary procedure of specimen management method according to the third embodiment of the present disclosure.

First of all, look at FIG. 46, which is a flowchart showing the procedure of specimen management.

In Step S10, a sample, for which the patient information needs to be referred to or updated, is put on the sample supporting portion 1100, which may have a recess, of which the size is determined exactly to hold the pathological sample 1030 as shown in FIG. 44. Such a sample supporting portion 1100 can prevent the sample 1030 from shifting while an image is being captured. In Japan, pathological samples generally used have a standardized size of 76 mm×26 mm. That is to say, the sample supporting portion 1100 has a shape into which a pathological sample 1030 of such a size can be set.

Figure 47:
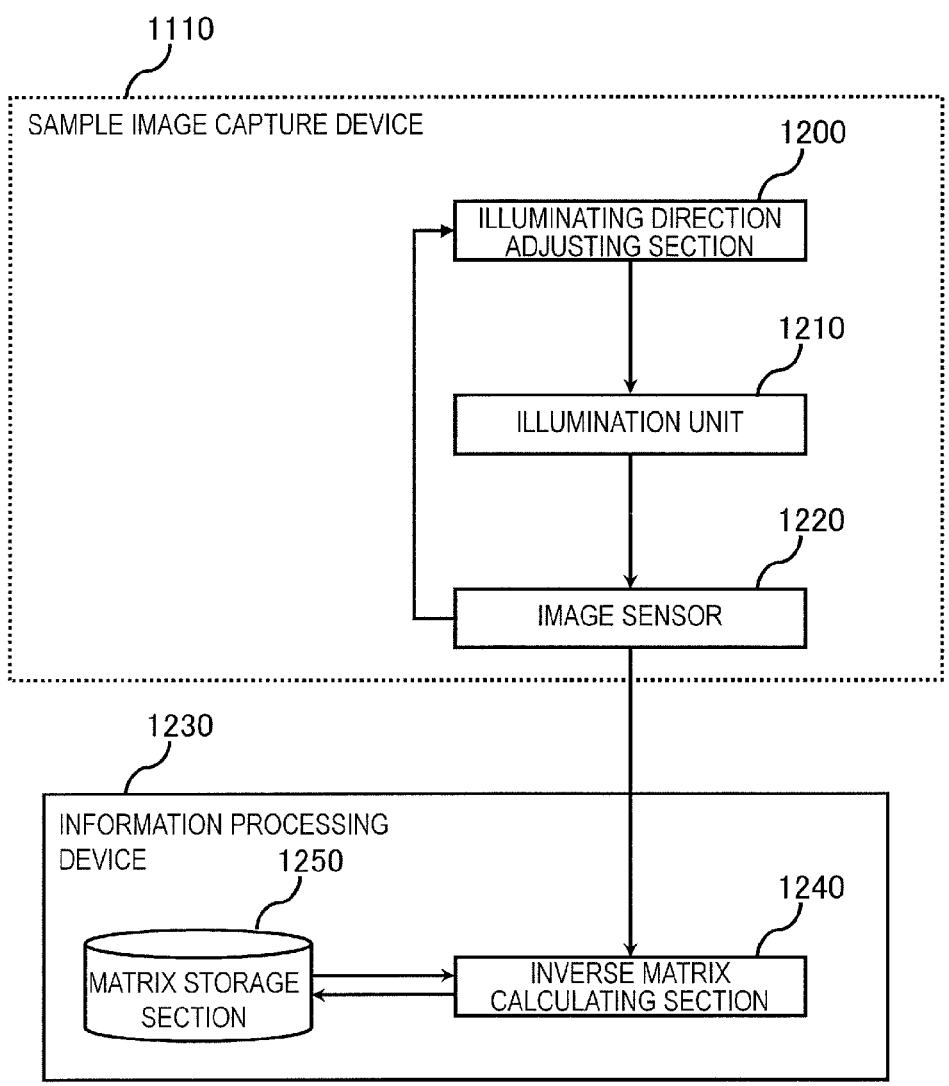
FIG. 47 is a block diagram illustrating an exemplary detailed configuration for a sample image capture device according to the third embodiment of the present disclosure.

Now take a look at FIG. 46 again. In Step S11, the sample image capture device 1110 captures an image of the pathological sample 1030 at one of multiple different zoom powers which have been set in advance. FIG. 47 is a block diagram illustrating an exemplary configuration for the sample image capture device 1110, which includes an illuminating direction adjusting section 1120, an illumination unit 1210 and an image sensor 1220. The sample image capture device 1110 captures an image (e.g., an overall image) of the sample at an arbitrary zoom power specified by the information processing device 1230.

When images are being captured at multiple different zoom powers, the resolution can be increased by using an inverse matrix calculating section 1240 and a matrix storage section 1250. The inverse matrix calculating section 1240 and matrix storage section 1250 may be provided inside the information processing device 1230 as shown in FIG. 47. However, one or both of the inverse matrix calculating section 1240 and matrix storage section 1250 may be provided inside the sample image capture device 1110. It will be described in detail later how the inverse matrix calculating section 1240 and matrix storage section 1250 operate.

Figure 48:
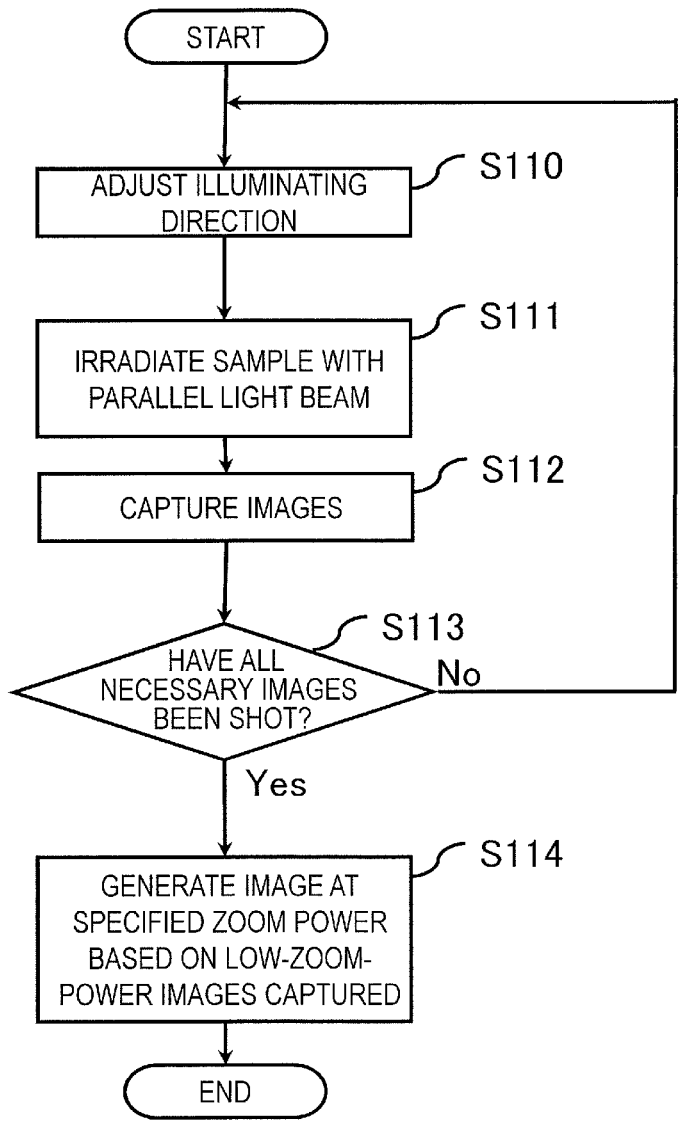
FIG. 48 is a flowchart showing an exemplary procedure in which a sample image capture device operates according to the third embodiment of the present disclosure.

Next, it will be described with reference to FIG. 48 in what processing procedure an image is obtained according to this embodiment.

Figure 49A:
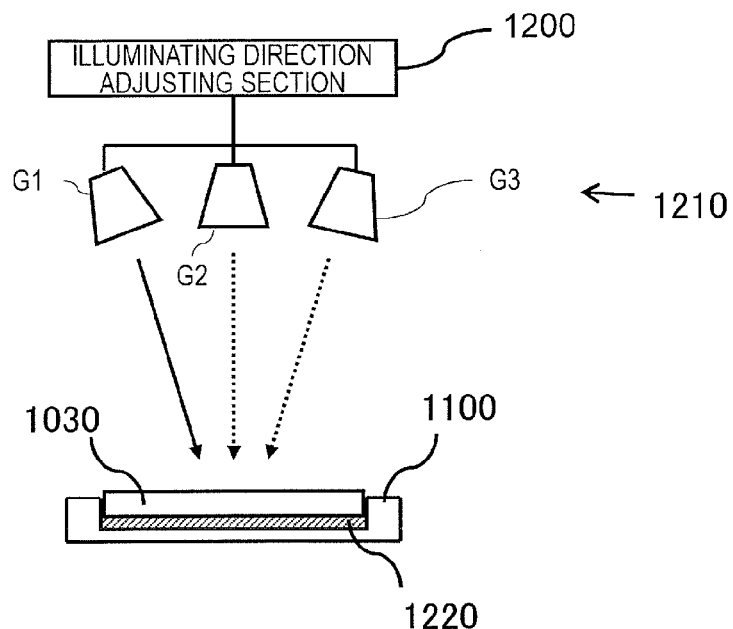
FIG. 49A illustrates an exemplary configuration for an illuminating direction adjusting section according to the third embodiment of the present disclosure.
Figure 49B:
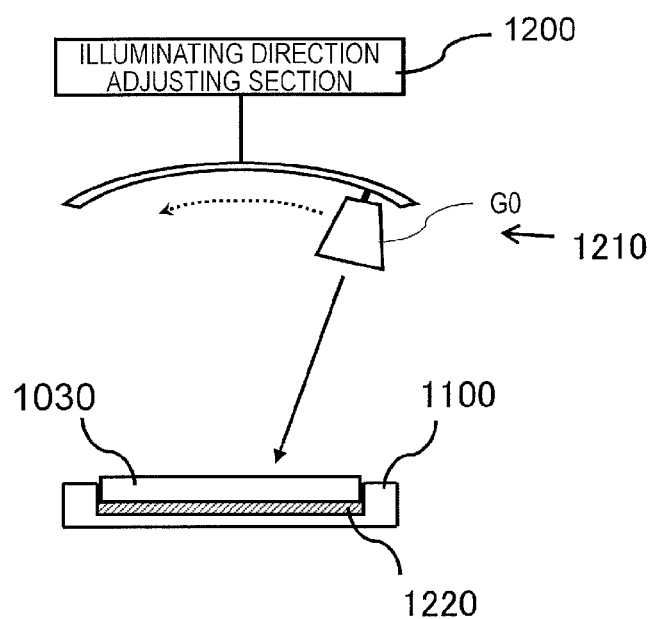
FIG. 49B illustrates another exemplary configuration for an illuminating direction adjusting section according to the third embodiment of the present disclosure.

First, in Step S110, the angle of the parallel illuminating light beam to irradiate the sample 1030 is adjusted by the illuminating direction adjusting section 1200. As a method for adjusting the irradiation direction, a plurality of light sources (e.g., light sources G1, G2 and G3) may be arranged as shown in FIG. 49A so as to irradiate the sample 1030 at a predetermined angle or a single light source G0 may be moved to define a specified angle as shown in FIG. 49B.

Figure 50A:
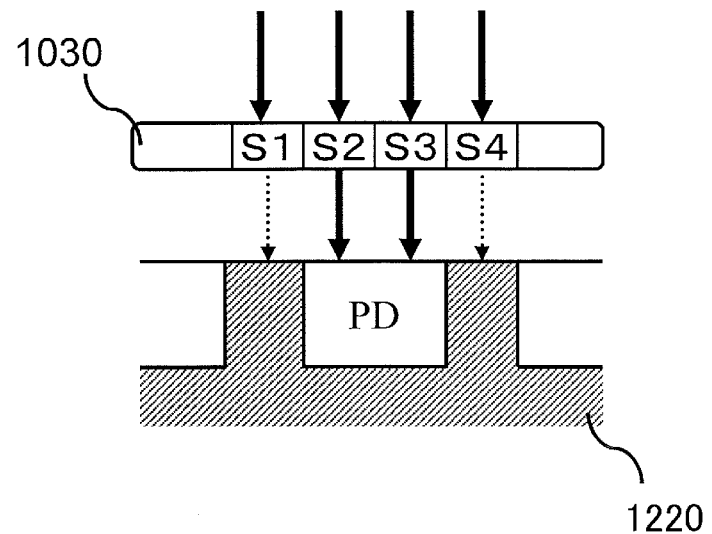
FIG. 50A illustrates how a sample image capture device operates (i.e., how the illuminating direction changes) according to the third embodiment of the present disclosure.
Figure 50B:
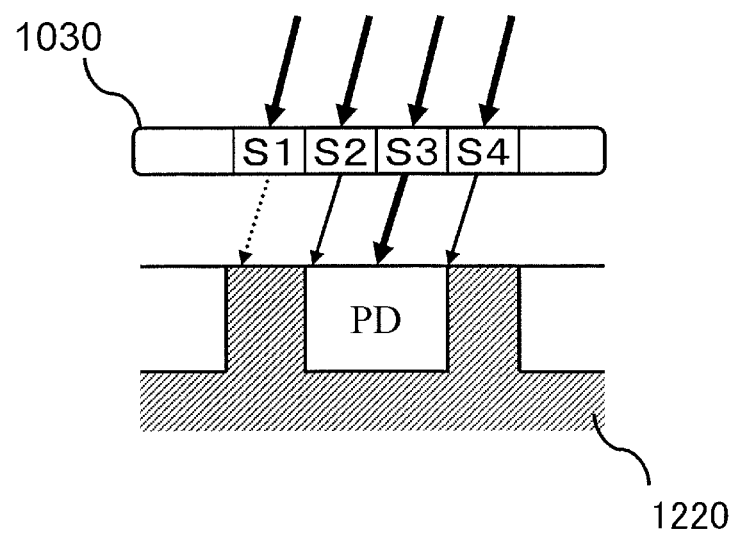
FIG. 50B illustrates how a sample image capture device operates (i.e., how the illuminating direction changes) according to the third embodiment of the present disclosure.
Figure 51:
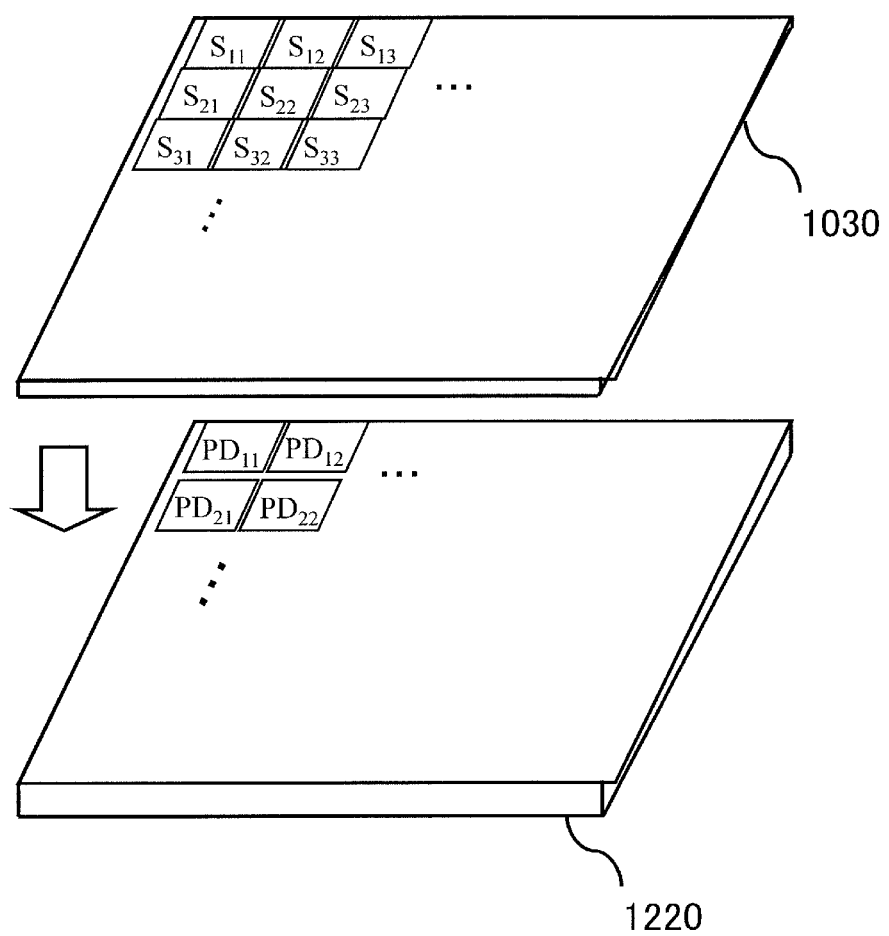
FIG. 51 is a perspective view illustrating the relative arrangement of a sample with respect to an image sensor according to the third embodiment of the present disclosure.

Next, in Step S111, the illumination unit 1210 irradiates the sample to be shot with a parallel light beam at the angle that has been adjusted in Step S110. FIGS. 50A and 50B illustrate how the illuminating direction may be changed. The sample 1030 and the image sensor 1220 have a two-dimensional arrangement as shown in FIG. 51. In FIGS. 50A and 50B, illustrated schematically is a cross section of a single pixel region including a single photodiode (PD) for the sake of simplicity. The light that has been incident on the photodiode PD is converted into an electrical signal through photoelectric conversion. In FIGS. 50A and 50B, the boldness of the arrows schematically indicates the amount of light incident on PD. That is to say, it means that the bolder an arrow pointing toward a point is, the larger the amount of light incident at that point.

In the example illustrated in FIG. 50A, the sample is irradiated with a parallel light beam coming from right over the sample. In this case, light rays which have been transmitted through regions S2 and S3 of the sample 1030 are incident on the photodiode PD. On the other hand, if the sample is irradiated with a parallel light beam at the angle shown in FIG. 50B, light rays which have been transmitted through regions S2, S3 and S4 of the sample 1030 are incident on the photodiode PD. In this example, a half of the light ray that has been transmitted through each of the regions S2 and S4 of the sample 1030 is incident on the photodiode PD, while almost all of the light ray that has been transmitted through the region S3 is incident on the photodiode PD. In this case, the photodiode PD will output a different pixel value from the situation illustrated in FIG. 50A.

In the examples illustrated in FIGS. 50A and 50B, respective pixel values of the regions S1, S2, S3 and S4 can not be obtained just by capturing an image in only one irradiation direction. The sample image capture device of this embodiment can obtain pixel values associated with the light rays that have been transmitted through those regions S1, S2, S3 and S4 based on a plurality of images that have been shot with the irradiation direction changed as shown in FIGS. 50A and 50B. Each of these regions S1, S2, S3 and S4 is smaller than a single pixel and corresponds to a subpixel region. This point will be described in further detail below.

In this example, the sample 1030 is supposed to be irradiated with light beams coming from four different directions #1, #2, #3 and #4. Four images are captured with the sample 1030 irradiated with light beams coming from those four different directions #1, #2, #3 and #4. Now let us focus our attention on a single pixel which is located at the same position among multiple pixels that form those four images. The outputs of the photodiode PD included in that pixel of interest are supposed to be A1, A2, A3 and A4, respectively, with respect to the light irradiation directions #1, #2, #3 and #4. Also, the optical transmittances of the regions S1, S2, S3 and S4 of the sample 1030 are supposed to be S1, S2, S3 and S4, respectively. In that case, in the example illustrated in FIG. 50A, the equation A1=0×S1+1×S2+1×S3+0×S4 is satisfied. On the other hand, in the example illustrated in FIG. 50B, the equation A2=0×S1+(½)×S2+1×S3+(½)×S4 is satisfied. In the case of the light irradiation direction #3 (not shown), A3=0×S1+0×S2+(½)×S3+1×S4 is supposed to be satisfied. And in the case of the light irradiation direction #4 (not shown), A4=(½)×S1+1×S2+(½)×S3+0×S4 is supposed to be satisfied.

In this example, the transmittances S1, S2, S3 and S4 depend on the tissue architecture of the sample 1030 and are unknown. The outputs A1, A2, A3 and A4 of the photodiode PD are obtained by capturing four images. That is why since simultaneous equations are defined with respect to the four unknown quantities S1, S2, S3 and S4, S1, S2, S3 and S4 can be obtained by calculation.

FIG. 52A shows a matrix of coefficients for the simultaneous equations in the example described above. By calculating the inverse matrix of this matrix with respect to the vector having the outputs A1, A2, A3 and A4 as its components, the optical transmittances in those regions S1, S2, S3 and S4 narrower than a single pixel (i.e., subpixel regions) can be obtained. As a result, an image of which the resolution has been increased fourfold can be obtained. In other words, a high-resolution image, of which the pixel density is four times as high as that of the image sensor 1120, can be obtained.

The numerical values (elements) of the matrix shown in FIG. 52A do not depend on the tissue architecture of the sample 1030 but do depend on the structure of the image sensor 1220 and the light irradiation direction. That is to say, even if the same image sensor 1220 is used but if the light irradiation direction has changed, the numerical values (elements) of the matrix change. FIG. 52B shows an exemplary set of numerical values in a situation where light beams have been emitted from multiple different directions #1 through #8. Since the number of subpixel regions is eight in this example, the optical transmittances in the eight subpixel regions which are unknown quantities can be determined by irradiating the sample 1030 with light beams coming from those different directions #1 through #8 and obtaining eight outputs with respect to each pixel. As a result, an image of which the resolution has been increased eightfold can be obtained. In other words, a high-resolution image, of which the pixel density is eight times as high as that of the image sensor 1120, can be obtained.

According to this embodiment, the resolution of the image can be increased in this manner. In other words, by capturing a plurality of images with the irradiation direction changed, multiple sample images, of which the resolutions (zoom powers) are different from each other, can be obtained, and there is no need to adjust the focus using an objective lens.

Subsequently, in Step S112, the sample 1030 is shot with the image sensor 1220. An ordinary image sensor such as a scanner often uses a line sensor. However, by using an area sensor such as a CCD image sensor as the image sensor 1220, an image can be shot at high speeds in a range which is broad enough to recognize the sample. In addition, the sample image capture device 1110 of this embodiment does not have any lens to control the zoom power of shooting but generates an image at an arbitrary zoom power based on those multiple images that have been captured with the irradiation direction changed.

Thereafter, in Step S113, decision is made whether or not images that need to be used to generate a sample image at the specified zoom power have all been shot. If the answer is YES, the process advances to Step S114. Otherwise, the process goes back to Step S110 to capture an image of the object irradiated with light at the designated angle.

In Step S114, the information processing device 1230 generates an image at the specified zoom power based on the multiple images that have been captured in Steps S110 to S113 with the irradiation direction changed sequentially. To generate such an image at the specified zoom power, a matrix in which the relation between the irradiation direction and the amount of light incident on the photodiode PD has been calculated in advance is stored in the matrix storage section 1250. FIGS. 52A and 52B show exemplary matrices each showing the relation between the irradiation direction and the light incident on the sensor. Such matrices can be obtained by calculation based on the angle of irradiation, the size of the photodiode PD and the size of the pixel to obtain. Those matrices may also be calculated empirically by, using a sample in which the optical transmittance of each position is known, detecting how the amount of light incident on the photodiode PD changes with the angle of irradiation and depending on which pixel the light is incident on.

Supposing the matrix showing the relation between the irradiation direction and the amount of light incident on the image sensor is M, the pixel value vector obtained in each irradiation direction is A, and the optical transmittance vector to be obtained is S, the equation MS=A is satisfied with respect to each pixel. Since the matrices M and A are given in this case, the S can be obtained by multiplying the inverse matrix of M on both sides. In Step S114, the matrix showing the relation between the irradiation direction and the amount of light incident on the photodiode PD is gotten from the matrix storage section 1250 and each pixel value is calculated by the inverse matrix calculating section 1240. By using a sample image capture device 1110 with such a configuration, an overall image of the sample is shot at an arbitrary zoom power.

In Step S12 (see FIG. 46), the image feature quantity calculating section 1120 calculates the image feature quantity to recognize the specimen based on the sample image that has been obtained in Step S11. As the image feature quantity, color information such as the average luminance, a shape feature such as the degree of roundness, or a feature such as SIFT, HOG or HLAC may be used. Alternatively, as a feature quantity unique to a pathological image, a feature such as the distance between nuclei or cells or color ratio between nucleus and cell may also be used.

Figure 53:
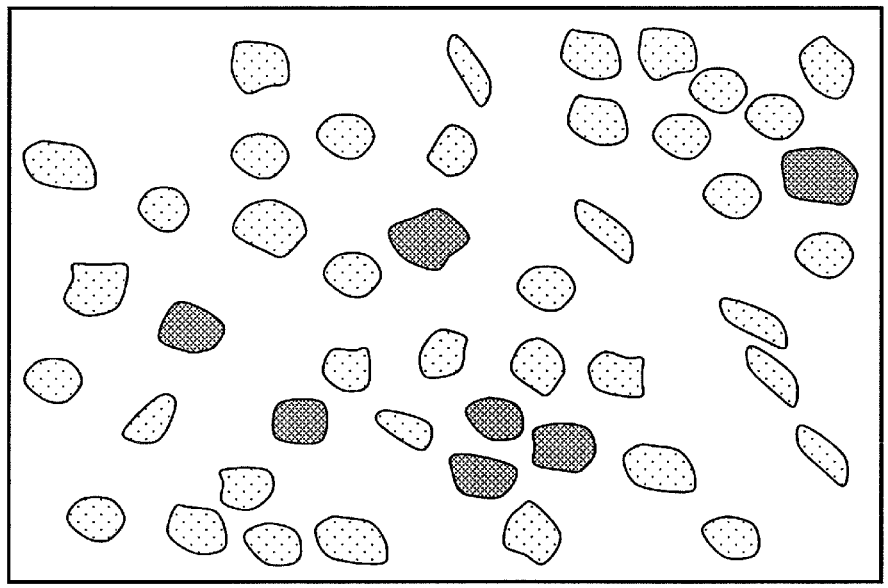
FIG. 53 illustrates an exemplary image captured by observing a pathological sample at a high zoom power (i.e., at a high resolution).
Figure 54:
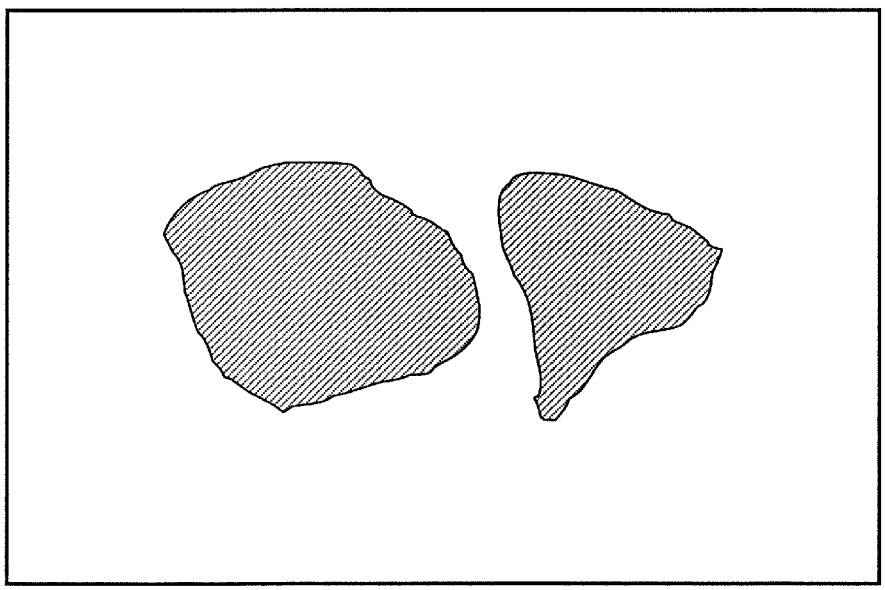
FIG. 54 illustrates an exemplary image captured by observing a pathological sample at a low zoom power (i.e., at a low resolution).

Examples of such pathological images are shown in FIGS. 53 and 54. FIG. 53 illustrates an exemplary pathological sample which was observed at a high zoom power (of 200× or more, for example). On the other hand, FIG. 54 illustrates an exemplary pathological sample which was observed at a low zoom power (of less than 10×, for example). If the zoom power becomes equal to N (where N is an integer which is equal to or greater than one), it means that the resolution of the image (which is represented by either the number of pixels that form a single image or the pixel density) increases N×N fold. It should be noted that the zoom power on the display screen of a display device is defined to be the ratio of the screen pitch of the display device to the pixel pitch of the image sensor.

In the case of a pathological sample, if the pathological sample is observed at a high zoom power, cells and nuclei can be recognized as shown in FIG. 53. Since the arrangement and distance between cells or nuclei vary from one sample to another, the average distance between cells or nuclei may be used as a feature to recognize the sample. Also, in a pathological sample, the tissue to be observed is transparent as it is, and therefore, is usually stained to make the texture easily observable. As a method of staining, HE staining which is a standard staining method or any of various kinds of immunostaining in which staining is carried out according to the purpose of a particular test may be adopted. The ratio between the cell and nucleus which have been stained in different colors by such a staining method may also be used as a feature. For example, according to Ki-67 which is an exemplary immunostaining method, growing cells are stained in reddish brown and the other cells are stained in blue. Such a ratio may be used as not only an index to diagnosis but also information for recognizing the pathological sample as well. Optionally, in this processing step, the image feature quantity to be given a top priority may be changed according to the zoom power of the pathological sample image. The image feature of a pathological sample varies significantly according to the zoom power for observation, which is one of the features of a pathological sample. For example, if a pathological sample is observed at as high a zoom power as shown in FIG. 53, cells and nuclei can be recognized in the resultant image. On the other hand, if a pathological sample is observed at a low zoom power, the overall shape of a pathological section can be seen in the resultant image as shown in FIG. 54. In view of such features, for a low zoom power image, feature quantities which can be used suitably in normal shape recognition such as the degree of roundness, SIFT (Scale-Invariant Feature Transform), HOG (Histogram of Oriented Gradient) and HLAC (Higher-order Local Auto Correlation) may be used in most cases. As for a high zoom power image, on the other hand, features unique to a pathological sample such as the distance between cells or nuclei or the ratio between stain colors may be used in many cases. For example, if the resolution of an image is lower than a reference value, at least one feature quantity selected from the group consisting of the degree of roundness, SIFT, HOG and HLAC may be obtained by calculation. On the other hand, if the resolution of the image is equal to or greater than the reference value, not only the feature quantity but also the average distance between cells or nuclei and/or the ratio between multiple different stain colors may be calculated as well.

Figure 57A:
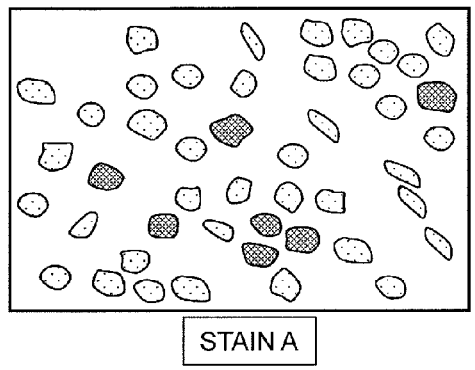
FIG. 57A illustrates exemplary sample obtained by staining the same patient in different colors.
Figure 57B:
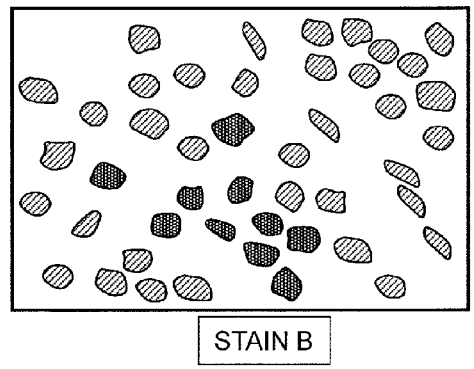
FIG. 57B illustrates exemplary sample obtained by staining the same patient in different colors.

In Step S13, the information searching section 1130 retrieves patient data, of which the image feature quantity agrees with the one calculated in Step S12, from the database 1140. An example of such a database is shown in FIG. 55. The database stores patient data, in which image feature quantities calculated based on the pathological sample image, the shooting zoom power of the sample image on which the image feature quantities have been calculated and patient information are kept in association with each other. By storing patient information in such a format, the database can be searched for patient data, of which the image feature quantity agrees with the one calculated in Step S12. The patient data to be searched for may be supposed to have image feature quantities that perfectly agree with the given ones. Also, in a situation where image feature quantities are expressed as vectors, for example, if the Euclidean distance between those vectors is equal to or smaller than a predetermined threshold value, those images may be regarded as matching ones. Alternatively, the database may also have a format such as the one shown in FIG. 56. According to the format shown in FIG. 56, by assigning an ID to each individual patient, results of tests which were carried out on the same patient in different stains are stored in association with each other. Currently, a pathological test (histological diagnosis) is often carried out with an immunostaining method adopted for the purpose of a particular test, as well as the standard staining method HE (hematoxylyne-eosine). Staining samples of the same patient often have quite different colors but substantially the same sample shape as in the example illustrated in FIGS. 57A and 57B. The reason is that when samples in multiple different stains are made out of the same patient, those samples are often made of a series of slices. Since sample images of a specimen have been captured as images according to the present disclosure, the same patient's samples in multiple different stains can get automatically associated with each other by comparing the feature quantities in shape of the images captured by taking advantage of those properties of pathological samples.

In Step S14, decision is made whether or not the database 1140 includes any set of patient data with the same image feature quantity as the one calculated in Step S12 as a result of the search in Step S13. If the answer is NO, the process advances to Step S15. On the other hand, if the answer is YES, the process advances to Step S17.

In Step S15, the user is prompted to enter, using the input device 1160, patient information associated with the pathological sample put in Step S10. Next, in Step S16, the patient information that has been entered in Step S15 is stored, in association with the sample image's zoom power obtained in Step S11 and the image feature quantity calculated in Step S12, in the database 1140.

In Step S17, decision is made whether or not the database 1140 includes multiple sets of patient information with the same image feature quantity as the one calculated in Step S12 as a result of the search in Step S13. If the database includes multiple sets of patient information with the same image feature quantity and if those sets cannot be narrowed down to one, the process advances to Step S18. On the other hand, if the database includes only one set of patient data, of which the image feature quantity agrees with the given one, then the process advances to Step S19.

If those sets of patient information cannot be narrowed down to one, then the sample image capture device changes the shooting zoom power in Step S18 and the process goes back to the processing step S11 again. In the case of a pathological sample, even if given samples have similar shapes at a low zoom power but if those samples are observed at a high zoom power to a cell or nucleus level, those samples can be recognized without fail. On the other hand, a tradeoff is inevitable between the amount of time it takes to capture sample images in Step S11 and the zoom power. That is why it will be efficient to try to recognize a given sample at a low zoom power first and then increase the zoom power gradually unless the sample can be recognized. For example, the series of processing steps S11 through S17 are carried out over and over again with the zoom power increased gradually until the sets of patient information can be narrowed down to one. Optionally, in adding the patient information of a new sample to the database, the database may be searched for a matching case using only non-color-dependent shape features among various image feature quantities. And if there is any matching case, that case may get associated as a sample of the same patient in a different stain.

In Step S19, the output device 1170 outputs the patient information that has been obtained in Step S13. The output device 1170 does not have to include a display device or a printer. Instead, the output device 1170 may be connected to, and send a signal to, an external display device or printer.

According to the configuration of this embodiment, specimen management can be made on pathological samples accurately with little load imposed on the operator. In addition, according to the specimen management method of this embodiment, conventional slides can be used as they are without adding a barcode or IC tag to pathological slides.

Embodiment 4

Next, a specimen management apparatus according to a fourth embodiment of the present disclosure will be described with reference to FIGS. 58A, 58B and 59.

Figure 58A:
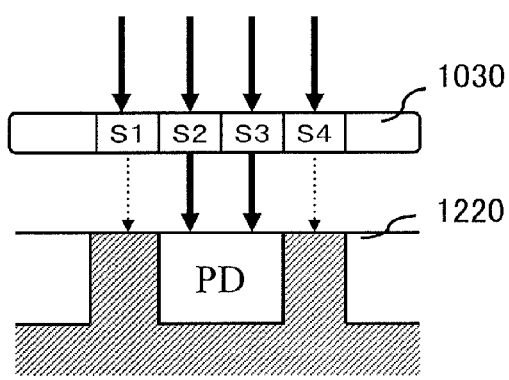
FIG. 58A illustrates how a sample image capture device operates according to a fourth embodiment of the present disclosure.
Figure 58B:
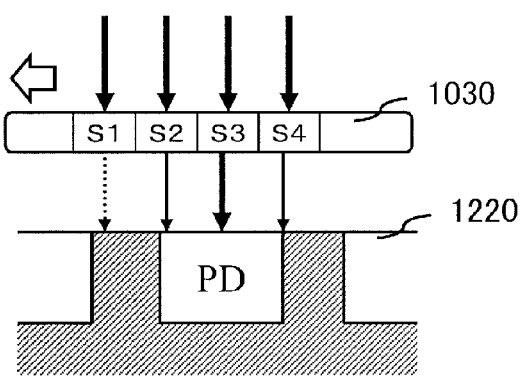
FIG. 58B illustrates how a sample image capture device operates (how the sample is moved) according to a fourth embodiment of the present disclosure.

A sample image capture device 1110 according to this embodiment shoots a sample 1030 put on a sample supporting portion while moving the sample as shown in FIGS. 58A and 58B, thereby capturing a plurality of images to generate a high-zoom-power sample image. Except the configuration of this sample image capture device 1110, the specimen management apparatus of this embodiment has the same configuration as its counterpart of the third embodiment described above.

Figure 59:
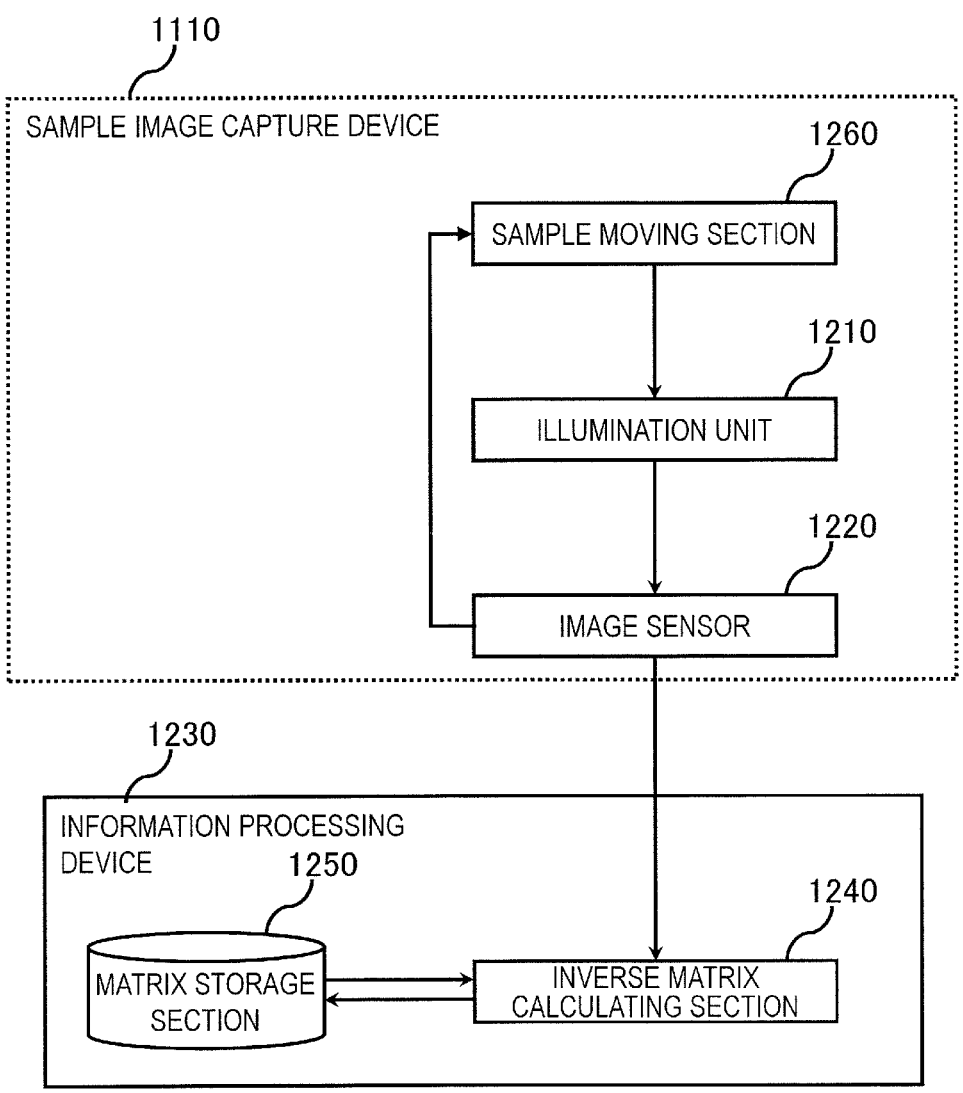
FIG. 59 is a block diagram illustrating an exemplary detailed configuration for a sample image capture device according to the fourth embodiment of the present disclosure.

FIG. 59 is a block diagram illustrating a configuration for the sample image capture device 1110 of this embodiment. In this embodiment, by shooting the sample with the sample itself moved, instead of capturing a plurality of images with the irradiation direction of a parallel light beam changed, a plurality of images to form a high-zoom-power image are captured. In the matrix storage section 1250, stored is a matrix representing the relation between the moving direction, the magnitude of movement, and the light beam incident on the image sensor, in place of the matrix representing the relation between the irradiation direction and the light beam incident on the image sensor. The sample image capture device 1110 of this configuration can perform the function of getting an image at an arbitrary zoom power by carrying out substantially the same series of processing steps as Steps S110 through S114. In Step S110, however, the sample put on the sample supporting portion is moved instead of changing the angle of irradiation of a parallel light beam. According to this configuration, the direction of the parallel light beam to irradiate the pathological sample may be constant. By performing quite the same series of processing steps S111 through S114 as the ones of the third embodiment described above, a high-zoom-power image can be generated based on a plurality of low-zoom-power images.

The image forming apparatus of the present disclosure can obtain a high-zoom-power image without using a microscope, with which it will take a lot of time to get focusing done, and therefore, can obtain high-zoom-power image data in a short time even if the object is a pathological sample with a microscopic tissue.

An image forming method according to another aspect of the present disclosure includes the steps of: sequentially emitting illuminating light beams from multiple different light source directions with respect to an object and irradiating the object with the illuminating light beams; capturing a plurality of different images in the multiple different light source directions, respectively, using an imaging device which is arranged at a position where the illuminating light beams that have been transmitted through the object are incident; and forming a high-resolution image of the object, having a higher resolution than any of the plurality of images, by synthesizing the plurality of images together.

An image forming apparatus according to the present disclosure may include the illumination unit and image sensor described above and a general-purpose computer. The computer may be configured to: make the illumination unit sequentially emit illuminating light beams from multiple different light source directions with respect to an object and irradiate the object with the illuminating light beams; capture a plurality of different images in the multiple different light source directions, respectively, using an imaging device which is arranged at a position where the illuminating light beams that have been transmitted through the object are incident; and form a high-resolution image of the object, having a higher resolution than any of the plurality of images, by synthesizing the plurality of images together. Such an operation may be performed by executing a computer program stored on a storage medium.

An image forming apparatus as one implementation of the present disclosure comprises: an illumination system which sequentially emits illuminating light beams from multiple different irradiation directions with respect to an object and irradiates the object with the illuminating light beams; an image sensor which is arranged at a position where the illuminating light beams that have been transmitted through the object are incident and which captures a plurality of different images in the multiple different irradiation directions, respectively; and an image processing section which forms a high-resolution image of the object, having a higher resolution than any of the plurality of images, by synthesizing the plurality of images together.

In one embodiment, the object is arranged close to the image sensor, and the object and the image sensor face each other with no lenses interposed between the object and the image sensor.

In one embodiment, the interval between an imaging surface of the image sensor and the object is equal to or shorter than 100 μm.

In one embodiment, each of the plurality of images includes images representing respectively different portions of the object.

In one embodiment, the object is fixed onto the image sensor, and the image forming apparatus includes a holder which holds the image sensor in an attachable and removable state.

In one embodiment, the illumination system irradiates the object with illuminating light beams coming from at least four different irradiation directions, the image sensor captures at least four different images representing respectively different image portions of the object, and the image processing section forms the high-resolution image of the object by synthesizing those at least four different images together.

In one embodiment, the image forming apparatus comprises an angle of illumination adjusting section which adjusts the angle of incidence of the light on the object, wherein the angle of illumination adjusting section adjusts the angles of incidence of the illuminating light beams on the object so that the illuminating light beams that have been sequentially emitted from the illumination system in the multiple different irradiation directions are transmitted through different portions of the object and then incident on photoelectric conversion sections of the image sensor.

In one embodiment, the angle of illumination adjusting section includes a mechanism which changes at least one of the object's orientation and position.

In one embodiment, the mechanism includes at least one of a gonio system and a moving stage.

In one embodiment, the mechanism includes an optical system which increases the degree of parallelism of the illuminating light beam.

In one embodiment, the illumination system includes an optical system which increases the degree of parallelism of the illuminating light beam.

In one embodiment, the illumination system is able to emit light beams falling within respectively different wavelength ranges.

In one embodiment, the illumination system includes a light source which sequentially moves to multiple different positions corresponding to the multiple different irradiation directions and emits the illuminating light beams from those positions one after another.

In one embodiment, the illumination system includes a plurality of light sources which are arranged at multiple different positions corresponding to the multiple different irradiation directions and emit the illuminating light beams sequentially.

An image forming method as another implementation of the present disclosure comprises: sequentially emitting illuminating light beams from multiple different irradiation directions with respect to an object and irradiating the object with the illuminating light beams; capturing a plurality of different images in the multiple different irradiation directions, respectively, using an image sensor which is arranged at a position where the illuminating light beams that have been transmitted through the object are incident; and forming a high-resolution image of the object, having a higher resolution than any of the plurality of images, by synthesizing the plurality of images together.

An image forming apparatus as still another implementation of the present disclosure comprises an illumination unit, an image sensor and a computer, wherein the computer is operative to: make the illumination unit sequentially emit illuminating light beams from multiple different irradiation directions with respect to an object and irradiate the object with the illuminating light beams; capture a plurality of different images in the multiple different irradiation directions, respectively, using the image sensor which is arranged at a position where the illuminating light beams that have been transmitted through the object are incident; and form a high-resolution image of the object, having a higher resolution than any of the plurality of images, by synthesizing the plurality of images together.

Yet another implementation of the present disclosure is a program to be used by an image forming apparatus including an illumination unit, an image sensor and a computer, wherein the program is set up to: make the illumination unit sequentially emit illuminating light beams from multiple different irradiation directions with respect to an object and irradiate the object with the illuminating light beams; capture a plurality of different images in the multiple different irradiation directions, respectively, using the image sensor which is arranged at a position where the illuminating light beams that have been transmitted through the object are incident; and form a high-resolution image of the object, having a higher resolution than any of the plurality of images, by synthesizing the plurality of images together.

An image forming apparatus as yet another implementation of the present disclosure comprises: a light source which irradiates an object with light and of which the orientation and position are fixed; a tilting mechanism which tilts the object at multiple tilt angles; an image sensor which is arranged at a position where the light that has been transmitted through the object is incident, gets tilted along with the object by the tilting mechanism, and captures a plurality of images at the multiple tilt angles; and an image processing section which forms a high-resolution image of the object, having a higher resolution than any of the plurality of images, by synthesizing the plurality of images together.

In one embodiment, the object is arranged close to the image sensor, and the object and the image sensor face each other with no lenses interposed between them.

In one embodiment, the interval between the image sensor's imaging surface and the object is equal to or shorter than 100 μm.

In one embodiment, each of the plurality of images includes images representing respectively different portions of the object.

In one embodiment, the object is fixed onto the image sensor, and the apparatus includes a holder which holds the image sensor in an attachable and removable state.

In one embodiment, the tilting mechanism includes at least one of a gonio system and a moving stage.

In one embodiment, the tilting mechanism includes an optical system which increases the degree of parallelism of the illuminating light beam.

In one embodiment, the light source includes an optical system which increases the degree of parallelism of the illuminating light beam.

An image forming method as yet another implementation of the present disclosure comprises the steps of: irradiating an object with illuminating light which has been emitted from a fixed light source while tilting the object at multiple tilt angles; capturing a plurality of images at the multiple tilt angles using an imaging device which is arranged at a position where the illuminating light that has been transmitted through the object is incident; and forming a high-resolution image of the object, having a higher resolution than any of the plurality of images, by synthesizing the plurality of images together.

Yet another implementation of the present disclosure is a program set up to make a computer perform: irradiating an object with illuminating light which has been emitted from a fixed light source while tilting the object at multiple tilt angles; capturing a plurality of different images in a multiple different irradiation directions using an image sensor which is arranged at a position where the illuminating light that has been transmitted through the object is incident; and forming a high-resolution image of the object, having a higher resolution than any of the plurality of images, by synthesizing the plurality of images together.

Yet another implementation of the present disclosure is an image sensor for use in an image forming apparatus, the apparatus comprising: a light source which irradiates an object with light and of which the orientation and position are fixed; a tilting mechanism which tilts the object at multiple tilt angles; a holder which holds the image sensor in an attachable and removable state; and an image processing section which forms, by synthesizing together a plurality of different images that have been captured by the image sensor, a high-resolution image of the object having a higher resolution than any of the plurality of images, wherein the image sensor is arranged so as to be attachable to, and removable from, the image forming apparatus, the imaging surface of the image sensor has an object supporting portion which is a region on which the object is able to be mounted, and the image sensor is arranged at a position where the light beams transmitted through the object are incident while being held by the holder onto the image forming apparatus and captures the plurality of different images at the multiple different tilt angles by getting tilted along with the object by the tilting mechanism.

In one embodiment, the image sensor is arranged on slide glass, and held by the holder onto the image forming apparatus so as to be attachable to, and removable from, the apparatus via a portion of the slide glass.

In one embodiment, an opaque region which limits an image capturing range is arranged on the object supporting portion.

An image forming apparatus, image forming method, image processing program and image sensor according to the present disclosure contributes to getting a high-resolution image with the trouble of focus adjustment saved.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image forming apparatus comprising:
a light source which irradiates an object with light and of which the orientation and position are fixed;
a tilting mechanism which tilts the object at multiple tilt angles;
an image sensor which is arranged at a position where the light that has been transmitted through the object is incident, gets tilted along with the object by the tilting mechanism, and captures a plurality of images at the multiple tilt angles; and an image processing section which forms a high-resolution image of the object, having a higher resolution than any of the plurality of images, by synthesizing the plurality of images together.

2. The image forming apparatus of claim 1, wherein the object is arranged close to the image sensor, and
the object and the image sensor face each other with no lenses interposed between the object and the image sensor.

3. The image forming apparatus of claim 2, wherein the interval between an imaging surface of the image sensor and the object is equal to or shorter than 100 μm.

4. The image forming apparatus of claim 1, wherein each of the plurality of images includes images representing respectively different portions of the object.

5. The image forming apparatus of claim 1, wherein the object is fixed to the image sensor, and
the image forming apparatus includes a holder which holds the image sensor in an attachable and removable state.

6. The image forming apparatus of claim 1, wherein the tilting mechanism includes at least one of a gonio system and a moving stage.

7. The image forming apparatus of claim 1, wherein the tilting mechanism includes an optical system which increases the degree of parallelism of the illuminating light beam.

8. The image forming apparatus of claim 1, wherein the light source includes an optical system which increases the degree of parallelism of the illuminating light beam.

9. An image forming method comprising:
irradiating an object with illuminating light which has been emitted from a fixed light source while tilting the object at multiple tilt angles;
capturing a plurality of images at the multiple tilt angles using an image sensor which is arranged at a position where the illuminating light that has been transmitted through the object is incident; and
forming a high-resolution image of the object, having a higher resolution than any of the plurality of images, by synthesizing the plurality of images together.

10. An image sensor for use in an image forming apparatus, the image forming apparatus comprising: i) a light source which irradiates an object with light and of which the orientation and position are fixed; ii) a tilting mechanism which tilts the object at multiple tilt angles; iii) a holder which holds the image sensor in an attachable and removable state; and iV) an image processing section which forms, by synthesizing together a plurality of different images that have been captured by the image sensor, a high-resolution image of the object having a higher resolution than any of the plurality of images,
the image sensor being arranged attachably to, and removably from, the image forming apparatus,
an imaging surface of the image sensor has an object supporting portion which is a region on which the object is able to be mounted, and
the image sensor is arranged at a position where the light beams transmitted through the object are incident while being held by the holder onto the image forming apparatus and captures the plurality of images at the multiple different tilt angles by getting tilted along with the object by the tilting mechanism.

11. The image sensor of claim 10, wherein the image sensor is arranged above slide glass, and held by the holder onto the image forming apparatus attachably to, and removably from, the image forming apparatus via a portion of the slide glass.

12. The image sensor of claim 10, wherein an opaque region which limits an image capturing range is arranged on the object supporting portion.

* * * * *